US008963857B2

(12) United States Patent
Kim et al.

(10) Patent No.: US 8,963,857 B2
(45) Date of Patent: Feb. 24, 2015

(54) ELECTRONIC DEVICE AND METHOD OF CONTROLLING THE SAME

(75) Inventors: Yongsin Kim, Seoul (KR); Jihwan Kim, Seoul (KR); Jihyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 13/401,135

(22) Filed: Feb. 21, 2012

(65) Prior Publication Data

US 2013/0215041 A1    Aug. 22, 2013

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

| 2011/0095974 | A1 | 4/2011 | Moriwaki | |
|---|---|---|---|---|
| 2011/0102390 | A1 | 5/2011 | Moriwaki | |
| 2011/0134144 | A1 | 6/2011 | Moriwaki | |
| 2011/0175830 | A1* | 7/2011 | Miyazawa et al. | 345/173 |
| 2011/0296334 | A1* | 12/2011 | Ryu et al. | 715/776 |
| 2012/0235894 | A1* | 9/2012 | Phillips | 345/156 |

FOREIGN PATENT DOCUMENTS

KR    10-2011-0137914 A    12/2011

* cited by examiner

*Primary Examiner* — Nicholas Lee
(74) *Attorney, Agent, or Firm* — Birch, Stewart, Kolasch & Birch, LLP

(57) ABSTRACT

According to the present invention, an electronic device is disclosed that includes a display unit including a bent state and a flat state that are distinguished from each other depending on a degree of bending, wherein the display unit is divided into at least two regions in the bent state by bending and a control unit configured to display information on the display unit according to a first video output characteristic when the display unit is in the flat state and to display information on a first region of the at least two regions according to a second video output characteristic and information on a second region of the at least two regions according to a third video output characteristic when the display unit changes from the flat state to the bent state.

8 Claims, 58 Drawing Sheets

FIG. 5
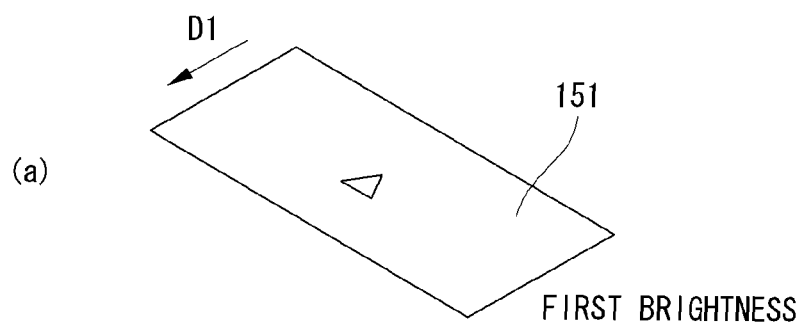
(a) FIRST BRIGHTNESS
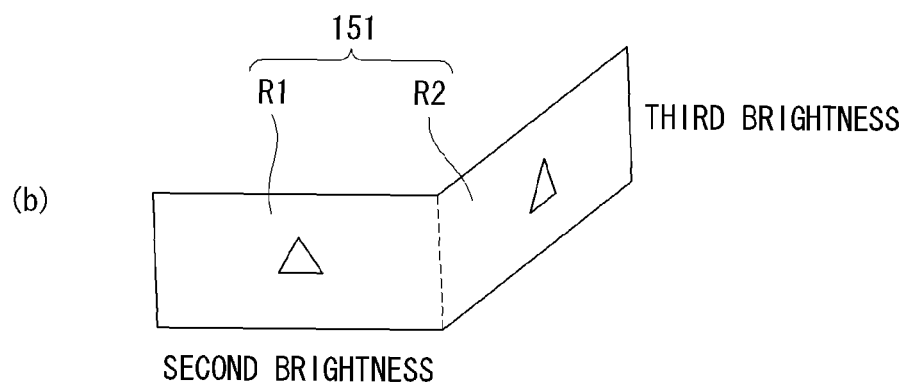
(b) SECOND BRIGHTNESS / THIRD BRIGHTNESS FIG.11
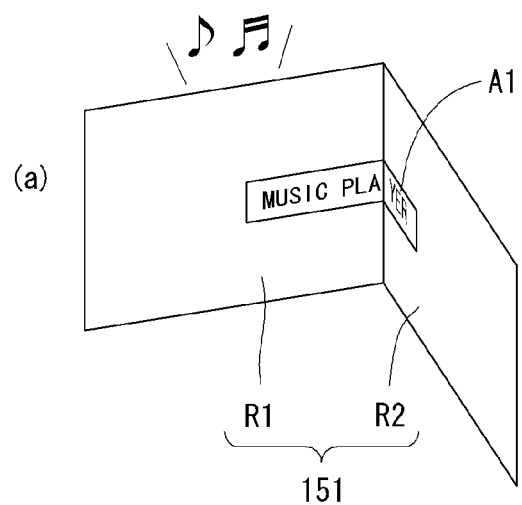
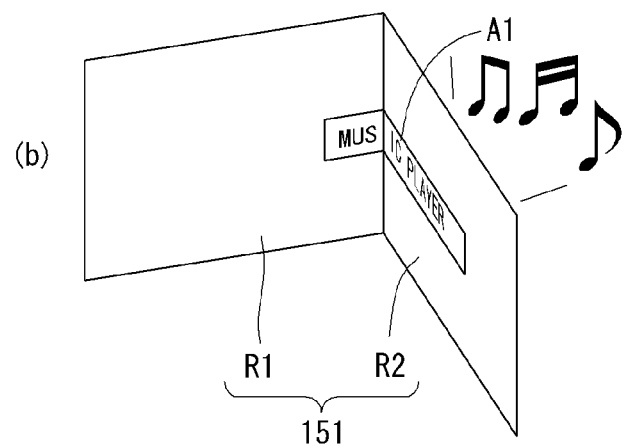

FIG.15
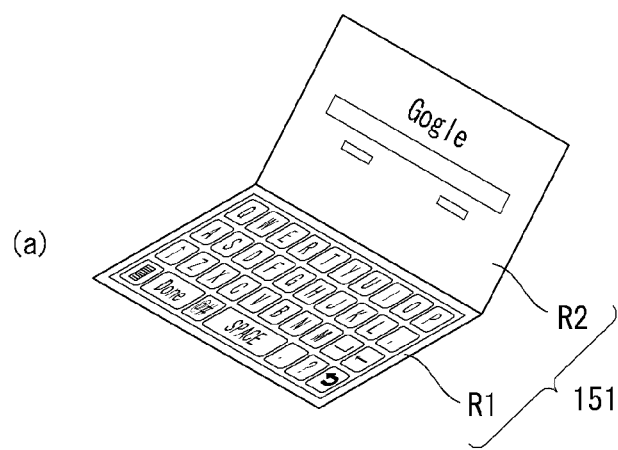
(a)
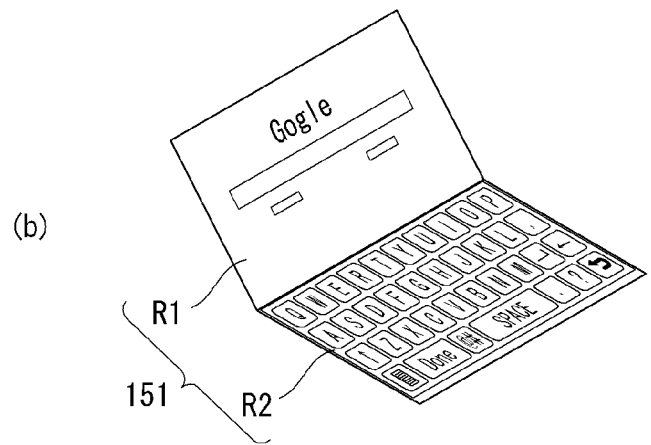
(b)

FIG.20
(a)
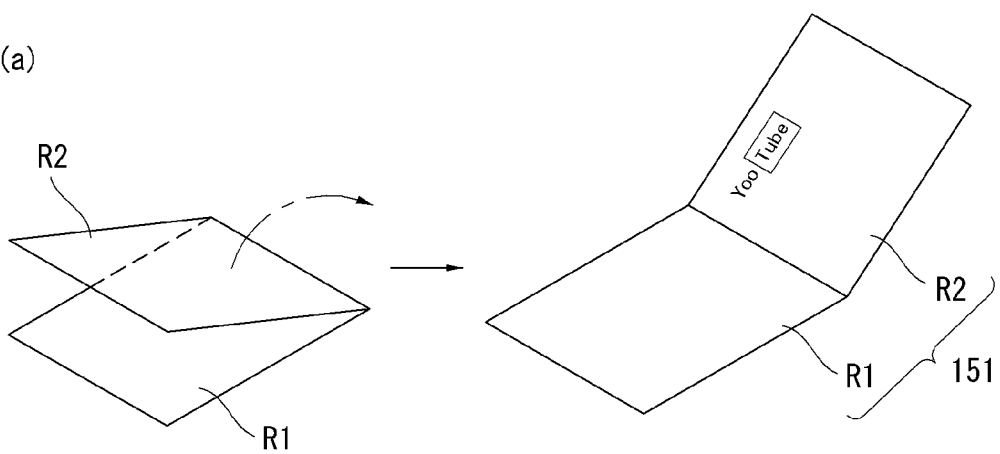
(b)
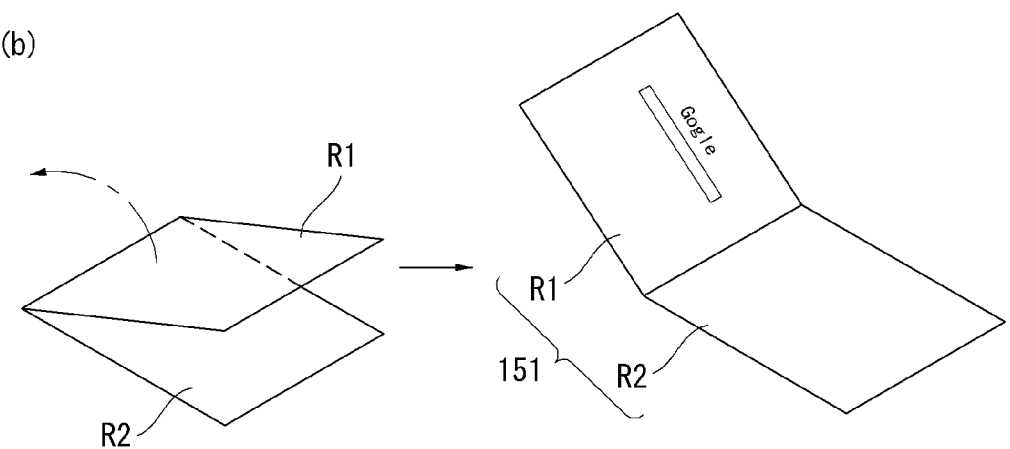

FIG.40
(a) 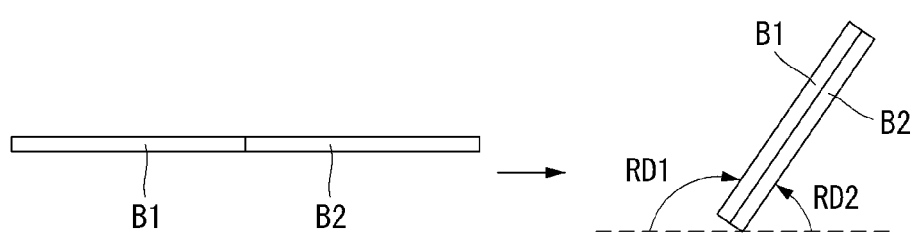
(b) 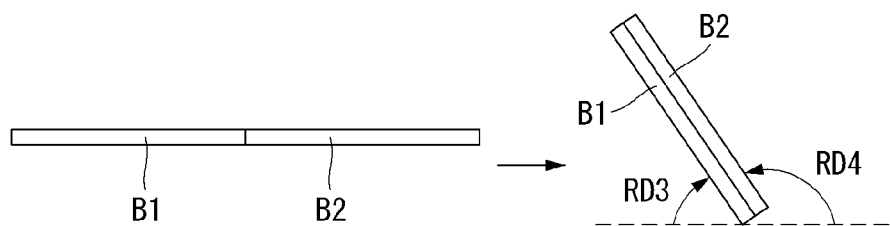

FIG.41
(a)
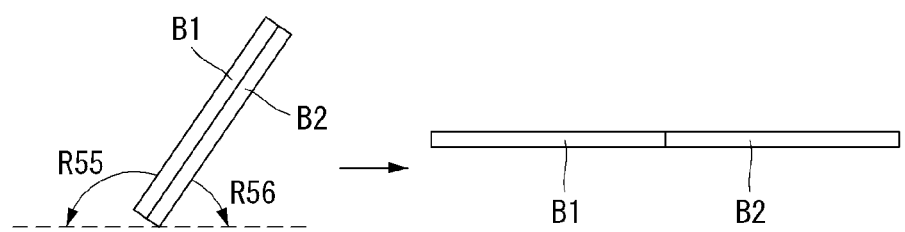
(b)
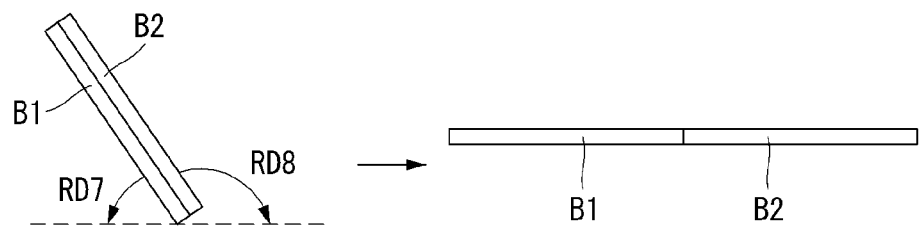

FIG. 42
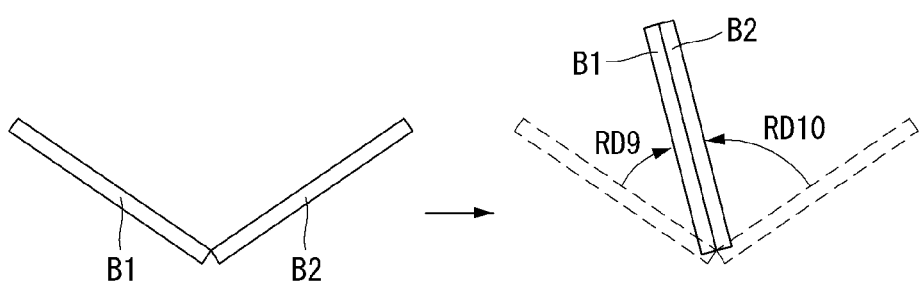
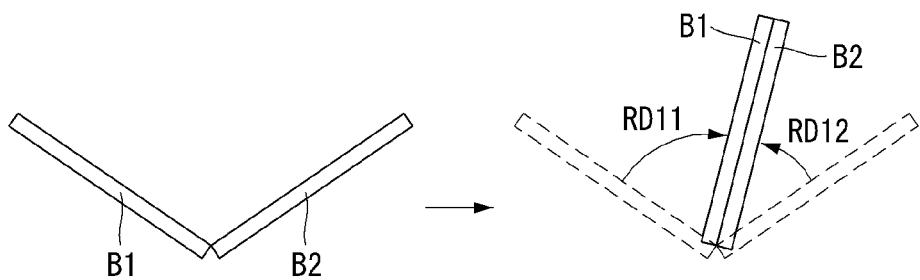

FIG. 43
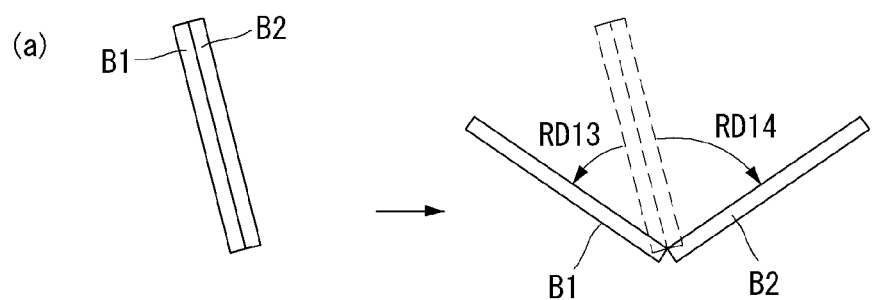
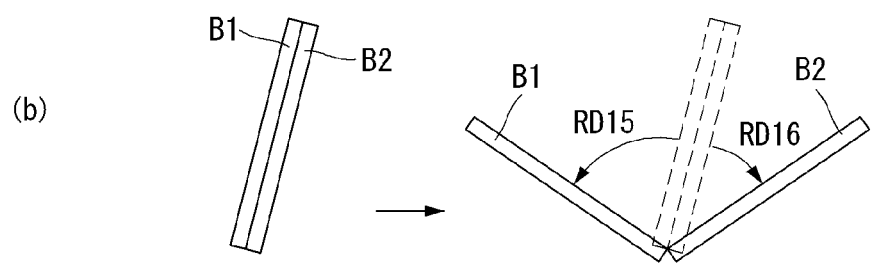

FIG. 50
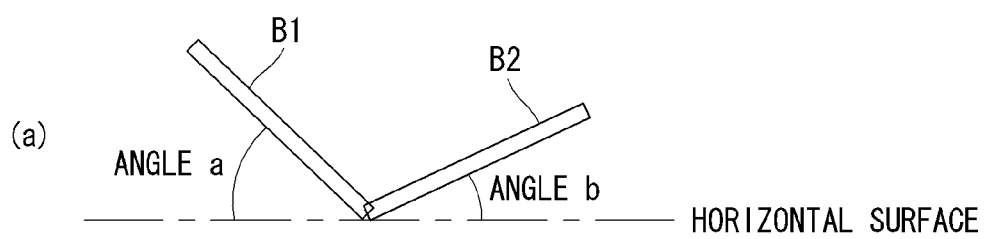
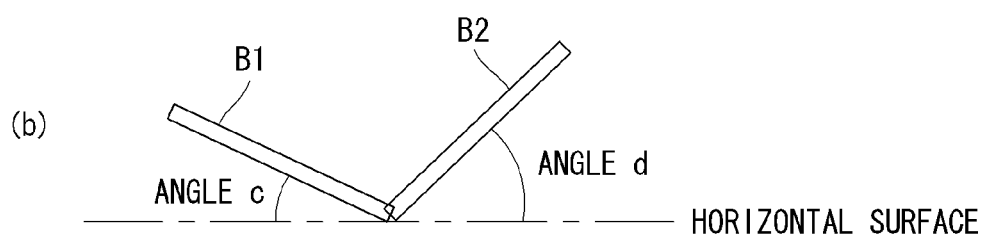

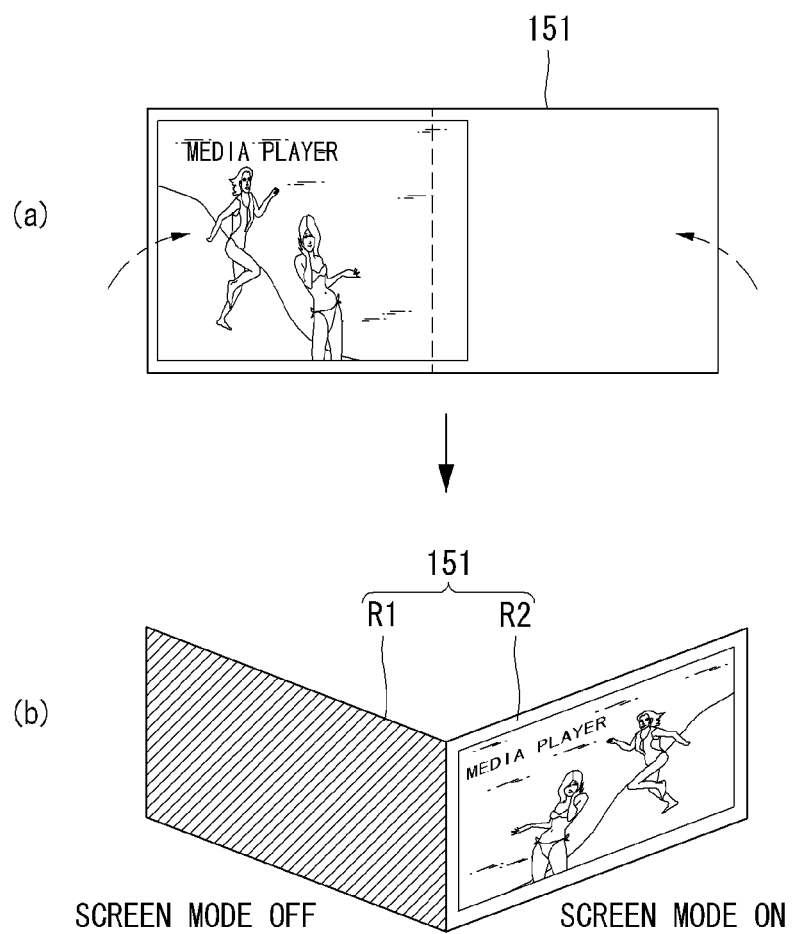

ELECTRONIC DEVICE AND METHOD OF CONTROLLING THE SAME

BACKGROUND

1. Technical Field

The present invention is directed to an electronic device and a method of controlling the electronic device, and specifically to an electronic device that includes a display unit dividable into two or more regions by a predetermined operation and a method of controlling the electronic device.

2. Related Art

According to mobility, terminals may be classified into mobile/portable terminals and stationary terminals. The mobile terminals may be classified into handheld terminals and vehicle mount terminals according to users' portability.

As terminals have various functions, such as image or movie capturing, replay of music or movie files, games, reception of broadcasting, etc. the terminals are implemented as multimedia players that may perform such multiple functions.

To support or increase various functions, the terminals may undergo changes in structure or software.

Foldable flexible displays are applied to mobile terminals. Accordingly, there is a need for intuitive user interfaces that allow users to use the flexible displays more easily.

SUMMARY

An object of the present invention is to provide an electronic device having a user interface that allows a user to use a foldable flexible display more intuitively and a method of controlling the electronic device.

The present invention is not limited to the above object and other objects may be apparently understood by one of ordinary skill from the description.

According to an embodiment of the present invention, there is provided an electronic device comprising a display unit including a bent state and a flat state that are distinguished from each other depending on a degree of bending, wherein the display unit is divided into at least two regions in the bent state by bending and a control unit configured to display information on the display unit according to a first video output characteristic when the display unit is in the flat state and to display information on a first region of the at least two regions according to a second video output characteristic and information on a second region of the at least two regions according to a third video output characteristic when the display unit changes from the flat state to the bent state.

The first video output characteristic is different from the second video output characteristic and/or the third video output characteristic.

The first, second, and third video output characteristics include at least one of brightness, color, saturation, and orientation.

The control unit is configured to display specific content on the first region depending on the second video output characteristic and to display the specific content on the second region depending on the third video output characteristic in response to a request that the specific content be displayed on the second region.

According to another embodiment of the present invention, there is provided an electronic device comprising a sound output unit, a display unit divided into at least two regions, and a control unit configured to, when content is executed, select a first region as a region associated with the executed content among the at least two regions and to output an audio of the content through the sound output unit depending on a first audio output characteristic set for the selected first region and to, when the region associated with the content changes from the first region to a second region, output the audio of the content through the sound output unit depending on a second audio output characteristic set for the second region.

The second audio output characteristic is different from the first audio output characteristic.

The control unit is configured to determine one of the at least two regions as the region associated with the content, wherein the determined region is a region on which the content was displayed in the past or is currently displayed.

The control unit is configured to, when the content is displayed on all of the at least two regions, determine a region on which the content is displayed more as the region associated with the content.

The display unit includes a bent state and a flat state that are distinguished from each other depending on a degree of bending, wherein the display unit is divided into at least two regions in the bent state by bending.

According to still another embodiment of the present invention, there is provided an electronic device comprising a display unit divided into at least two regions, and a control unit configured to change a state of a first region of the at least two regions into an idle state according to a first time condition and to change a state of a second region of the at least two regions into an idle state according to a second time condition.

The first time condition is different from the second time condition.

The first time condition is set to correspond to the first region, and the second time condition is set to correspond to the second region.

The first time condition is set depending on the type of content displayed on the first region, and the second time condition is set depending on the type of content displayed on the second region.

The controller is configured to, when at least part of the display unit is in an idle state, identify one region associated with a predetermined input among the at least two regions when the predetermined input is received and to selectively return only the identified region from the idle state to a normal state.

The predetermined input is a touch input having a specific pattern, and wherein the controller is configured to, when a touch having a first pattern corresponding to the first region is received, return the first region from the idle state to the normal state, and when a touch having a second pattern corresponding to the second region, return the second region from the idle state to the normal state.

The predetermined input is a specific key sequence, and wherein the controller is configured to, when a first key sequence corresponding to the first region is received, return the first region from the idle state to the normal state, and when a second key sequence corresponding to the second region, return the second region from the idle state to the normal state.

The predetermined input includes a specific touch input and a specific key sequence, and wherein the controller is configured to, when the specific touch input corresponding to the first region is received, return the first region from the idle state to the normal state, and when the specific key sequence corresponding to the second region, return the second region from the idle state to the normal state.

According to yet still embodiment of the present invention, there is provided an electronic device comprising a sound input unit, a display unit divided into at least two regions, and a control unit configured to receive a voice command through the sound input unit while at least one application is executed, to select one region considering voice command set values respectively set for the at least two regions, to select one or more of the at least one application considering relevancy of the at least one application for the selected region, and to control an operation of the selected one or more applications based on the voice command.

The control unit is configured to determine relevancy of the at least one application for the selected region based on a degree of display of the at least one application displayed on the selected region.

The control unit is configured to select the one or more applications further considering priority in execution of the at least one application.

According to yet still embodiment of the present invention, there is provided an electronic device comprising a voice input unit, a display unit divided into at least two or more regions, and a control unit configured to receive a voice command through the voice input unit, to determine at least one of the at least two regions considering voice command set values respectively set for the at least two regions, and to display an application on the determined at least one region according to the voice command.

The control unit is configured to determine a region activated for the voice command as the at least one region based on the voice command set values.

According to yet still embodiment of the present invention, there is provided an electronic device comprising a display unit including a bent state and a flat state that are distinguished from each other depending on a degree of bending, wherein the display unit is divided into at least two regions in the bent state by bending and a control unit configured to display first and second screens on first and second regions, respectively, of the at least two regions when the display unit is in the bent state, and when the display unit changes from the bent state to the flat state, select one of the first and second screens depending on an inclined state of the display unit, and to expand and display the selected screen on the display unit.

The control unit is configured to expand the selected screen to a first size at a first time after the display unit changes to the flat state and to expand the selected screen to a second size at a second time after the display unit changes to the flat state, wherein the second time is larger than the first time, and wherein the second size is larger than the first size.

The control unit is configured to continue to sense the inclined state of the display unit before the expansion of the selected screen is terminated.

The control unit is configured to, when the inclined state of the display unit changes while the selected screen is expanded, reselect one of the first and second screens depending on the changed inclined state, and to expand and display the reselected screen on the display unit.

The control unit is configured to reduce the other screen than the selected screen as the selected screen expands.

The control unit is configured to set an orientation of the display unit considering the inclined state and to display the selected screen according to the set orientation.

According to yet still embodiment of the present invention, there is provided an electronic device comprising a display unit including a bent state and a flat state that are distinguished from each other depending on a degree of bending, wherein the display unit is divided into at least two regions in the bent state by bending and a control unit configured to display first and second screens on first and second regions, respectively, of the at least two regions when the display unit is in the bent state, to select one of the first and second screens depending on a touch state on the display unit when the display unit changes from the bent state to the flat state, and to expand and display the selected screen on the display unit.

The control unit is configured to receive a touch input on the display unit and to determine the touch state based on at least one of a pattern of the touch input, a lasting time of the touch input, the number of times of the touch input, and a position of the touch input.

The control unit is configured to receive at least two touch inputs received from different positions of the display unit, to determine one touch input that is maintained longer among the received touch inputs, and to select one screen corresponding to the determined touch input among the first and second screens.

The control unit is configured to identify the number of times of touch inputs received from substantially the same position of the display unit and to select one screen corresponding to the position from which the touch inputs are received among the first and second screens when the number of times of the touch inputs is a predetermined number.

According to yet still embodiment of the present invention, there is provided an electronic device comprising a display unit including a bent state and a flat state, wherein the display unit is divided into at least two regions when the display unit is in the bent state and a control unit configured to obtain degrees of move of the at least two regions when the states of the display unit change, to select a specific operation depending on the obtained degrees of move, and to perform the selected specific operation.

The controller is configured to determine the degrees of move based on angles by which the at least two regions rotate when the states of the display unit change.

The control unit is configured to select the specific operation further considering whether the at least two regions become closer to or away from each other by the change in the states of the display unit.

The control unit is configured to select the specific operation further considering moving speeds of the at least two regions.

The control unit is configured to determine a combination of (a degree of move of one region, a degree of move of another region) based on the obtained degrees of move, to select a first operation as the specific operation when the combination is a first combination, and select a second operation as the specific operation when the combination is a second combination, wherein the first combination is different from the second combination, and the first operation is different from the second operation.

According to yet still embodiment of the present invention, there is provided an electronic device comprising a display unit including a bent state and a flat state, wherein the display unit is divided into at least two regions when the display unit is in the bent state and a control unit configured to select a first region of the at least two regions depending on inclined states of the at least two regions when the display unit is in the bent state and to display a virtual keyboard on the selected screen.

The control unit is configured to determine the inclined states based on degrees by which the at least two regions are inclined with respect to a horizontal surface. The control unit is configured to select as the first region a region which makes a smaller angle with the horizontal surface among the at least two regions.

The control unit is configured to display the virtual keyboard on a second region other than the first region when the region which makes the smaller angle with the horizontal surface changes from the first region to a second region.

The control unit is configured to display the virtual keyboard only when an angle between the at least two regions is within a reference range.

According to yet still embodiment of the present invention, there is provided an electronic device comprising a display unit including a bent state and a flat state, wherein the display unit is divided into at least two regions when the display unit is in the bent state and a control unit configured to display at least one item when the display unit is in the flat state, to determine relevancy of the at least one item for the at least two regions when the display unit changes to the bent state, and to change position where the at least one item is displayed based on the determined relevancy.

The control unit determines the relevancy based on the position where the at least item is displayed.

The control unit determines the relevancy based on a touch input on the display unit.

The control unit is configured to determine the relevancy based on at least one of a pattern of the touch input, a lasting time of the touch input, the number of times of the touch input, and a position of the touch input.

The present invention provides the following effects.

First, the electronic device 100 may separately set video output characteristics set for the display unit in the flat state and bent state, and may also separately set video output characteristics for the regions divided in the bent state.

Second, it can be possible to provide a user with a more convenient user interface by properly setting video output characteristics set for the display unit depending on the state of the electronic device.

Third, the electronic device 100 may be configured so that different audio output characteristics may be set for the flat state and bent state and for regions divided in the bent state.

Fourth, audio output characteristics may be properly set at a user's convenience, thus providing the user with a more convenient user interface.

Fifth, the electronic device may be configured to set different idle times for the respective regions, thus providing a user with a more convenient user interface.

Sixth, by releasing the respective regions of the display unit 151 separately from each other, the electronic device 100 may provide a user with a more convenient user interface. In other words, the electronic device 100 allows a user to set an idle release input having a higher security level to a specific region of the display unit 151 so that the user's information may be prevented from being disclosed to others against his intention.

Seventh, the electronic device 100 may provide a user with a more effective user interface by allowing different voice command set values to be set for respective regions in the display unit 151. In particular, among a few regions of the display unit, only a specific region may be set to be operated in response to a voice command so that voice control can be performed by selecting only an application displayed on the specific region while multitasking is in progress over the divided regions of the display unit, thus increasing user convenience.

Eighth, the electronic device 100 may provide a user with a more effective user interface by allowing different voice command set values to be set for respective regions in the display unit 151. In particular, in the case that among a few regions of the display unit, only a specific region may be set to be operated in response to a voice command, an application called by the voice command may be displayed on the specific region set so that the application is operable in response to the voice command, thus increasing user convenience.

Ninth, when the divided regions are combined into a full screen area, a screen to be displayed on the combined area may be easily selected. That is, a user may select his desired screen by simply unfolding the bent display unit and inclining the display unit in one direction.

Tenth, in the case that divided regions in the display unit 151 are recombined into a single region while the electronic device 100 is used, a screen to be displayed on the combined single region may be easily selected. That is, a user may select a screen desired to be expanded by simply unfolding the bent display unit and touching a portion of the display unit 151 where the screen desired to be expanded is displayed.

Eleventh, by having operations executable by the electronic device 100 correspond to a user folding and/or unfolding the display unit 151, a new user interface may be provided. Further, rather than simply having the operations to be executed in the electronic device correspond to folding and unfolding the display unit 151, the electronic device 100 may have the to-be-executed operations correspond to various operations depending on the type of region to be moved (that is, whether the first or second region is moved) and the distance of moved region when the display unit 151 is folded or unfolded, thereby providing a user interface having various combinations.

Twelfth, while using an electronic device having a flexible display dividable into at least few regions, a virtual keyboard may be displayed on one region so that information and/or commands may be easily received from a user. At this time, a region on which the virtual keyboard is to be displayed may be properly determined by sensing the inclined state of the display unit 151, thereby increasing user convenience.

Finally, the electronic device 100 may allow the screen displayed on the display unit 151 when the display unit 151 is in the flat state to be moved and displayed on a region when the display unit 151 is bent, thereby eliminating user inconvenience. Accordingly, user convenience is increased.

BRIEF DESCRIPTION OF THE DRAWING

FIG. 5 illustrates a method of controlling brightness, saturation, and color of the display unit depending on a change in state of the display unit according to the first embodiment of the present invention.

FIGS. 10 and 11 are views illustrating a method of identifying a region of a display unit, which is associated with content, according to the second embodiment of the present invention.

FIG. 15 illustrates an example of setting idle times depending on content displayed on respective regions according to the third embodiment of the present invention.

FIGS. 18 to 21 are views illustrating various types of idle release inputs according to the fourth embodiment of the present invention.

FIGS. 38 to 45 are views illustrating various examples where the display unit 151 changes its state according to the ninth embodiment of the present invention.

FIG. 50 illustrates selecting a region having a smaller angle between the region and the horizontal surface according to the tenth embodiment of the present invention.

FIGS. 57 and 58 are views illustrating a method of obtaining the relevancy considering relationships between attributes of a displayed item and various set values for regions according to the eleventh embodiment of the present invention.

DESCRIPTION OF THE EMBODIMENTS

The foregoing objects, features, and advantages of the present invention will be more apparent from the detailed description taken in conjunction with the accompanying drawings. The exemplary embodiments of the present invention will be described in greater detail with reference to the drawings. Descriptions on known functions or configurations associated with the present invention, which are determined to make the gist of the invention unnecessarily unclear, are omitted.

Hereinafter, electronic devices relating to the present invention will be described below in more detail with reference to the accompanying drawings. In the following description, suffixes "module" and "unit" are given to components of the mobile terminal in consideration of only facilitation of description and do not have meanings or functions discriminated from each other.

Figure 1:
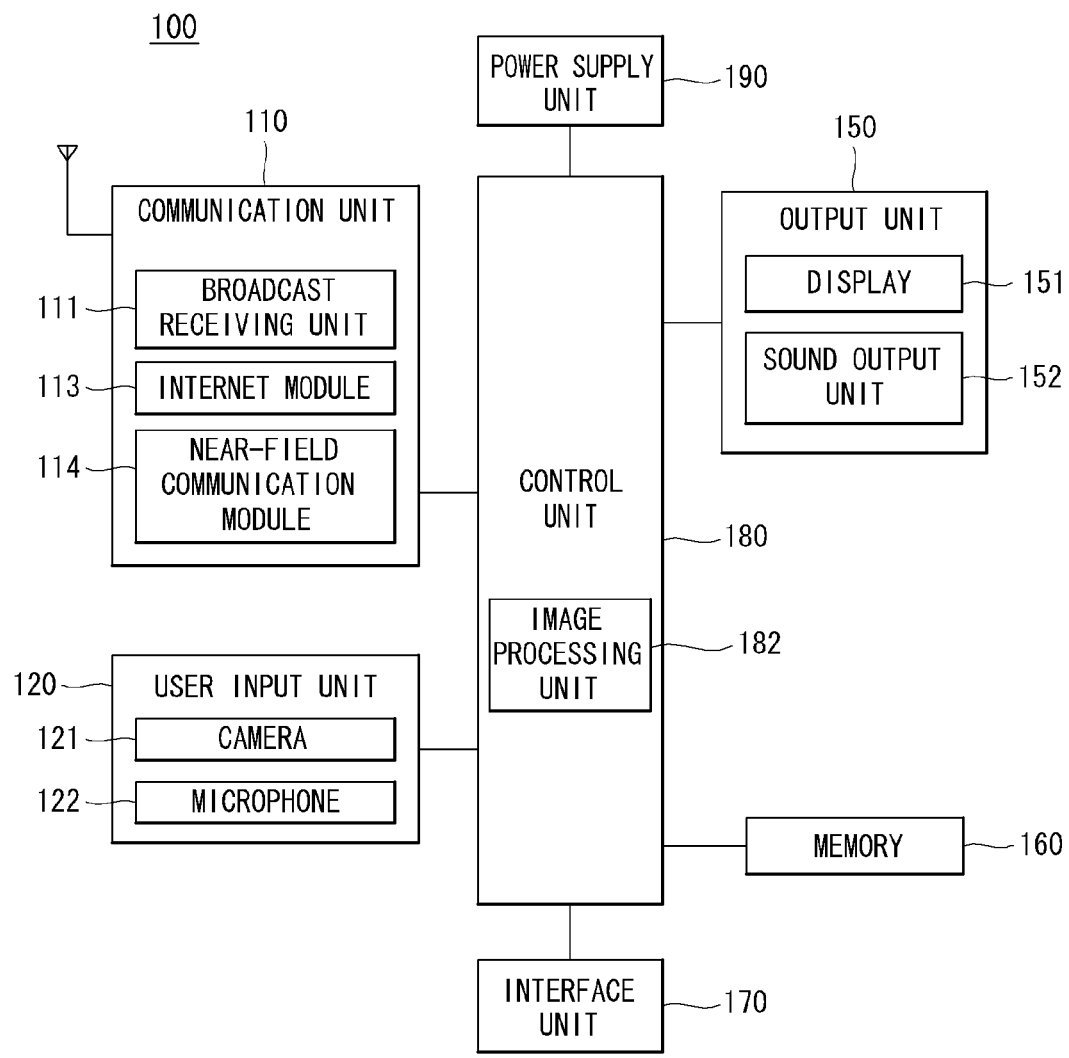
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a communication unit 110, a user input unit 120, an output unit 150, a memory 160, an interface unit 170, a control unit 180, and a power supply unit 190. The components shown in FIG. 1 may be components that may be commonly included in an electronic device. Accordingly, more or less components may be included in the electronic device 100.

The communication unit 110 may include one or more modules that enable communication between the electronic device 100 and a communication system or between the electronic device 100 and another device. For instance, the communication unit 110 may include a broadcast receiving unit 111, an Internet module 113, and a near-field communication module 114.

The broadcast receiving unit 111 receives broadcast signals and/or broadcast-related information from an external broadcast managing server through a broadcast channel.

The broadcast channel may include a satellite channel and a terrestrial channel. The broadcast managing server may refer to a server that generates broadcast signals and/or broadcast-related information and broadcasts the signals and/or information or a server that receives pre-generated broadcast signals and/or broadcast-related information and broadcasts the signals and/or information to a terminal. The broadcast signals may include TV broadcast signals, radio broadcast signals, data broadcast signals as well as combinations of TV broadcast signals or radio broadcast signals and data broadcast signals.

The broadcast-related information may refer to information relating to broadcast channels, broadcast programs, or broadcast service providers. The broadcast-related information may be provided through a communication network.

The broadcast-related information may exist in various forms, such as, for example, EPGs (Electronic Program Guides) of DMB (Digital Multimedia Broadcasting) or ESGs (Electronic Service Guides) of DVB-H (Digital Video Broadcast-Handheld).

The broadcast receiving unit 111 may receive broadcast signals using various broadcast systems. Broadcast signals and/or broadcast-related information received through the broadcast receiving unit 111 may be stored in the memory 160.

The Internet module 113 may refer to a module for access to the Internet. The Internet module 113 may be provided inside or outside the electronic device 100.

The near-field communication module 114 refers to a module for near-field communication. Near-field communication technologies may include Bluetooth, RFID (Radio Frequency Identification), IrDA (Infrared Data Association), UWB (Ultra Wideband), and ZigBee technologies.

The user input unit 120 is provided for a user's entry of audio or video signals and may include a camera 121 and a microphone 122.

The camera 121 processes image frames including still images or videos as obtained by an image sensor in a video call mode or image capturing mode. The processed image frames may be displayed by the display unit 151. The camera 121 may perform 2D or 3D image capturing or may be configured as one or a combination of 2D and 3D cameras. The image frames processed by the camera 121 may be stored in the memory 160 or may be transmitted to an outside device through the communication unit 110. According to an embodiment, two or more cameras 121 may be included in the electronic device 100.

The microphone 122 receives external sound signals in a call mode, recording mode, or voice recognition mode and processes the received signals as electrical voice data. The microphone 122 may perform various noise cancelling algorithms to remove noises created when receiving the external sound signals. A user may input various voice commands through the microphone 122 to the electronic device 100 to drive the electronic device 100 and to perform functions of the electronic device 100. Hereinafter, the microphone 122 may be also referred to as a "voice input unit".

The output unit 150 may include a display unit 151 and a sound output unit 152.

The display unit 151 displays information processed by the electronic device 100. For example, the display unit 151 displays a UI (User Interface) or GUI (Graphic User Interface) associated with the electronic device 100. The display unit 151 may be at least one of a liquid crystal display, a thin film transistor liquid crystal display, an organic light emitting diode display, a flexible display, and a 3D display. The display unit 151 may be configured in a transparent or light transmissive type, which may be called a "transparent display" examples of which include transparent LCDs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

The display unit 151 may be logically divided into two or more regions.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The sound output unit 152 may output audio data received from the communication unit 110 or stored in the memory 160. The sound output unit 152 may output sound signals associated with functions (e.g., call signal receipt sound, message receipt sound, etc.) performed by the electronic device 100. The sound output unit 152 may include a receiver, a speaker, and a buzzer.

The memory 160 may store a program for operation of the control unit 180, and may preliminarily store input/output data (for instance, phone books, messages, still images, videos, etc.). The memory 160 may store data relating to vibrations and sounds having various patterns, which are output when the touch screen is touched.

The memory 160 may include at least one storage medium of flash memory types, hard disk types, multimedia card micro types, card type memories (e.g., SD or XD memories), RAMs (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The control unit 180 controls the overall operation of the electronic device 100. For example, the control unit 180 performs control and processes associated with voice call, data communication, and video call. The control unit 180 may include an image processing unit 182 for image process. The image processing unit 182 is described below in relevant parts in greater detail.

The power supply unit 190 receives internal or external power under control of the control unit 180 and supplies the power to each component for operation of the component.

The embodiments described herein may be implemented in software or hardware or in a combination thereof, or in a recording medium readable by a computer or a similar device to the computer. When implemented in hardware, the embodiments may use at least one of ASICs (application specific integrated circuits), DSPs (digital signal processors), DSPDs (digital signal processing devices), PLDs (programmable logic devices), FPGAs (field programmable gate arrays, processors, controllers, micro-controllers, microprocessors, and electrical units for performing functions. According to an embodiment, the embodiments may be implemented by the control unit 180.

When implemented in software, some embodiments, such as procedures or functions, may entail a separate software module for enabling at least one function or operation. Software codes may be implemented by a software application written in proper programming language. The software codes may be stored in the memory 160 and may be executed by the control unit 180.

The electronic device 100 according to the present invention may include the display unit 151 implemented as a flexible display as described above.

The flexible display refers to a display apparatus that is made of a flexible material and may be thus bent or folded. In other words, the flexible display refers to an unbreakable, lightweight display apparatus that holds the display characteristics of existing flat displays but is bendable or foldable like paper since it is formed on a thin and flexible substrate. The flexible display may be also called "bendable display".

The flexible display may be implemented by TFT LCDs, OLEDs, electrophoretic, or LITI (Laser Induced Thermal Image) technologies.

The flexible display may be used as electronic paper. The electronic paper refers to a display apparatus having characteristics of general paper or inks and is also simply called "e-paper". Unlike typical flat displays with pixels illuminated with a backlight, e-paper displays display images using reflected light similarly to general paper. Once generated, an image and/text may be maintained without continuous supply of power.

When applied to mobile terminals, the flexible display may provide various shapes and functions due to its characteristics, such as flexibility, lightness, and non-fragility.

Figure 2:
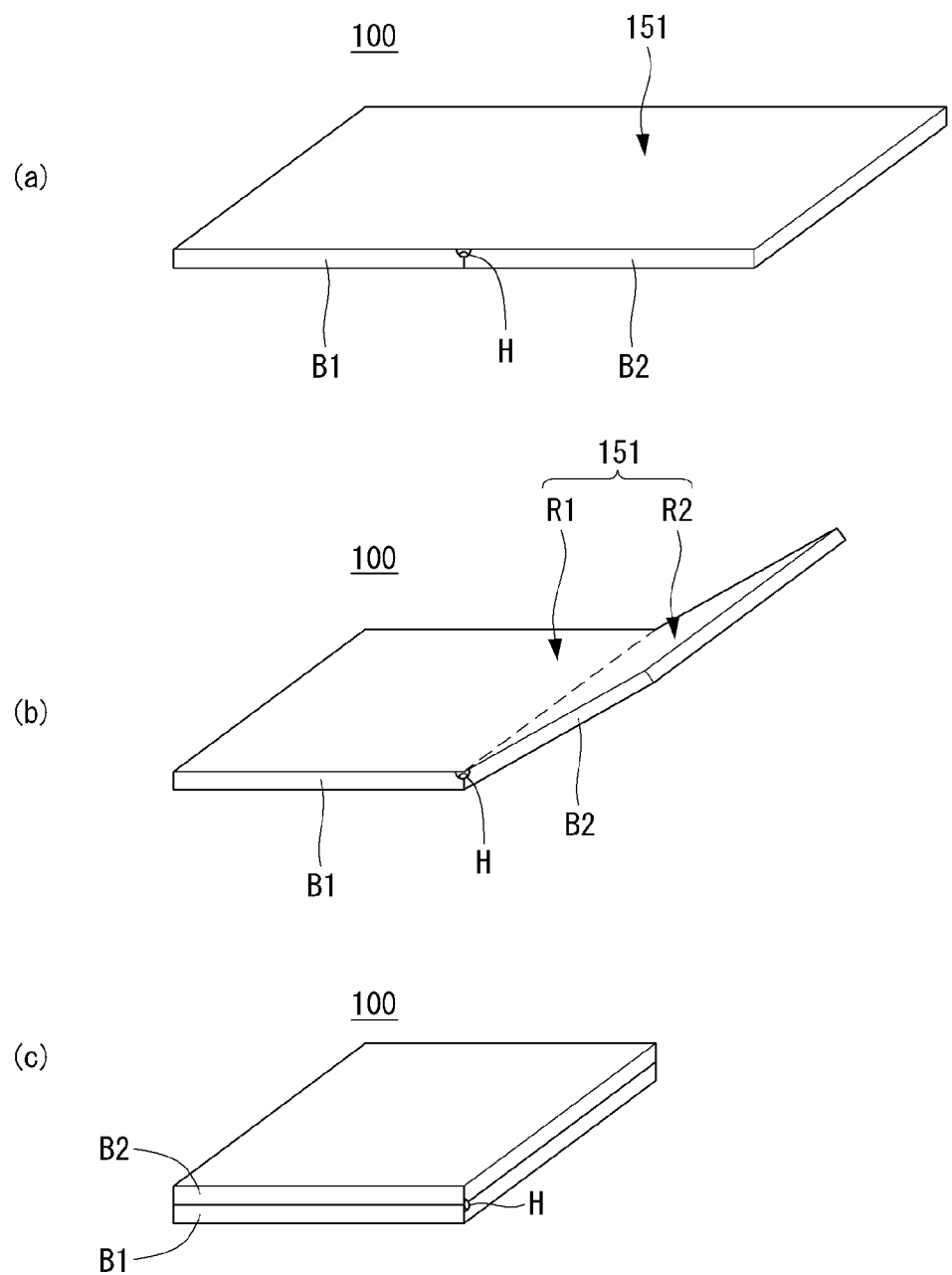
FIG. 2 is a view illustrating an electronic device having a flexible display according to an embodiment of the present invention.

FIG. 2 is a view illustrating an electronic device having a flexible display according to an embodiment of the present invention.

For an intuitive understanding of embodiments in which a flexible display is included in a mobile terminal, other addable components in the mobile terminal have been omitted from FIG. 2.

FIG. 2 illustrates an example of an electronic device having a flexible display according to embodiments of the present invention.

Referring to FIG. 2, the electronic device 100 includes two bodies B1 and B2.

The display unit 151 implemented as a flexible display may be provided at one of the two bodies B1 and B2. Different flexible displays physically separated from each other may be placed at the bodies B1 and B2, respectively. Preferably, one flexible display unit 151 may be placed at the bodies B1 and B2.

The two bodies B1 and B2 are connected to each other through a hinge H so that each body is rotatable with respect to the hinge serving as a rotational axis. That is, the bodies B1 and B2 may be coupled with each other in a foldable manner.

(a) of FIG. 2 illustrates a state where the two bodies B1 and B2 remain fully unfolded. Hereinafter, such a state is referred to as a "flat state".

(b) of FIG. 2 illustrates a state where of the two bodies B1 and B2, one body B2 rotates so that the display unit 151 is slightly bent, and (c) of FIG. 2 illustrates a state where the bodies B1 and B2 are fully folded. Hereinafter, such states that the bodies B1 and B2 are coupled while bent are referred to as a "bent state". For ease of description, such a state that the bodies B1 and B2 are fully folded as shown in (c) of FIG. 2 may also be referred to as a "folded state" or "fully folded state".

As the bodies B1 and B2 change from the flat state to the bent state, the display unit 151 may be bent as well.

Hereinafter, the terms "flat state" and "bent state" may also be used for the display unit 151 depending on whether the display unit 151 stays fully unfolded or bent. For example, the situation shown in (a) of FIG. 2 may be referred to as "the state of the display unit 151 is the flat state" or "the display unit 151 is in the flat state", and the situation shown in (b) or (c) of FIG. 2 may be referred to as "the state of the display unit 151 is the bent state" or "the display unit 151 is in the bent state".

Although it has been illustrated in FIG. 2 that two bodies are rotatably coupled to each other, the electronic device 100 does not inevitably include two bodies and as necessary may include three or more bodies. In such cases, one body may be coupled with other adjacent bodies to be rotatable with respect to each other.

According to some embodiments of the present invention, when the display unit 151 changes from the flat state into the bent state, the display unit 151 may be divided into two or more regions. A position where the display unit 151 is divided into the two or more regions may be determined depending on where the display unit 151 is bent. For example, in the case that as shown in (b) of FIG. 2 the electronic device 100 includes two bodies B1 and B2 and is bent with respect to the hinge H, the display unit 151 may be logically divided into first and second regions R1 and R2. Although not shown, in the case that the display unit 151 is bent at two positions, the display unit 151 may be divided into three regions, and in the case that the display unit 151 is bent at three positions, the display unit 151 may be divided into four regions.

The electronic device 100 may include a sensor that senses whether the display unit 151 is folded (bent state) or unfolded (flat state) (hereinafter, also referred to as "whether it is bent"). Further, the sensor may sense a position where the display unit 151 is bent (also referred to as "bending position") and how much the display unit 151 is bent (also referred to as "degree of bending"). The bending degree may be measured based on an angle between the bodies B1 and B2.

The sensor sensing whether the display unit 151 is bent may be provided in the display unit 151. One or more sensors may be provided. If two or more sensors are provided, the sensors may be placed at, at least, one edge of the display unit 151 while spaced apart from each other.

Sensors sensing whether the display unit 151 is bent may be provided at the two bodies B1 and B2.

Hereinafter, the sensor sensing whether the display unit 151 is bent may be also referred to as "bending sensor". The present invention is not limited to a specific form or method of implementing the bending machine. However, a bending machine may be preferable which may sense the degree of bending and/or bending position of the display unit 151 and may provide the sense results to the control unit 180 by electrical signals.

The electronic device 100 may include an inclination sensor that may sense a posture of the display unit 151 (hereinafter, referred to as "inclined state"). The electronic device 100 may include a plurality of inclination sensors which, when the display unit 151 is bent to be divided into a plurality of regions, may sense inclined states of the regions. That is, the plurality of inclination sensors may be provided at the regions, respectively, wherein each inclination is located at a side of each corresponding region. Further, inclination sensors may be provided at respective regions of the display unit 151 rather than the display unit 151.

The inclination sensor may be implemented as at least one or a combination of a gyroscope, an accelerometer, and a magnetic sensor.

Specifically, when including a gyroscope, the inclination sensor may obtain rotation speeds or angular speeds of the display unit 151 and/or the regions of the display unit 151 as the display unit 151 and/or the regions of the display unit 151 rotate respective of the axis. When including an accelerometer, the inclination sensor may obtain accelerations of the display unit 151 and/or the regions of the display unit 151 as the display unit 151 and/or the regions of the display unit 151 are on the move. When including a magnetic sensor, the inclination sensor may obtain orientations of the display unit 151 and/or the regions of the display unit 151 as if a compass does.

Based on at least one of the angular speeds obtained by the gyroscope, the gravity accelerations obtained by the accelerometer, and the orientations of the display unit 151 and/or the regions of the display unit 151, the control unit 180 may obtain information on movements of the display unit 151 and/or the regions of the display unit 151. For example, when the display unit 151 and/or the regions of the display unit 151 rotate with respect to an axis perpendicularly crossing the display unit 151 and/or the regions of the display unit 151, the control unit 180 may obtain inclined states of the display unit 151 and/or the regions of the display unit 151, which include degrees, speeds, and directions of inclination of the display unit 151 and/or the regions of the display unit 151.

Various methods of controlling an electronic device having a flexible display according to embodiments of the present invention are now described. For convenience of description, the control methods are implemented by the electronic device 100 described in connection with FIG. 1. However, the control methods according to the present invention are not limited as implemented by the electronic device 100 described in connection with FIG. 1.

First Embodiment

Figure 3:
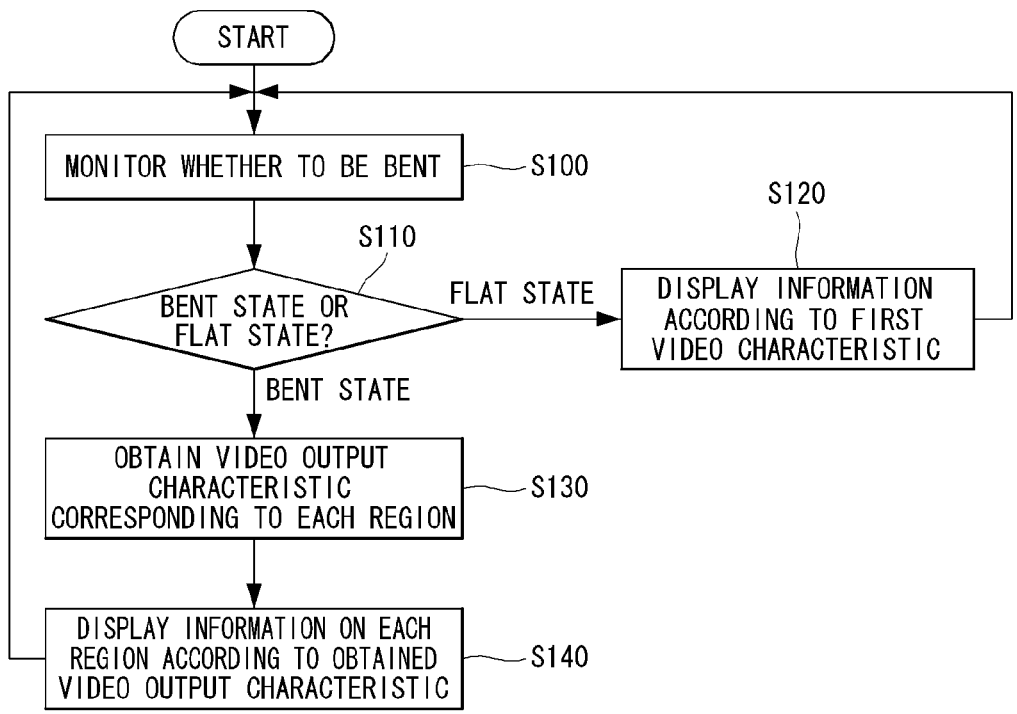
FIG. 3 is a flowchart illustrating a method of controlling an electronic device according to a first embodiment of the present invention.

FIG. 3 is a flowchart illustrating a method of controlling an electronic device according to a first embodiment of the present invention.

Referring to FIG. 3, in a method of controlling an electronic device according to the first embodiment of the present invention, the electronic device 100 may selectively perform a step of monitoring whether the display unit 151 is bent (S100), a step of determining whether the display unit 151 is in a bent state or flat state (S110), a step of, when the display unit 151 is in the bent state, obtaining a video output characteristic corresponding to each of at least two regions in the display unit 151 (S130), a step of displaying information on each region according to the obtained video output characteristic (S140), and a step of, when the display unit 151 is in the flat state, displaying information according to a video output characteristic set in the display unit 151 when the display unit 151 has the flat state. Hereinafter, each step is described in greater detail.

The electronic device 100 may monitor whether the display unit 151 is bent or not (S100) and may determine whether the display unit 151 is in a bent state or flat state (S110).

In performing step S100 and/or step S110, the electronic device 100 may determine whether the display unit 151 is bent based on a value output from the afore-described bending sensor. That is, the electronic device 100 may determine whether the display unit 151 is in the flat state or bent state based on the value output from the bending sensor, and when the display unit 151 changes its state, may determine a time that the state changes, a location where bending occurs in the display unit 151, and a degree of bending in the display unit 151.

If it is determined in step S110 that the display unit 151 is in the flat state, the electronic device 100 may display information on the display unit 151 according to a first video output characteristic set in the display unit 151.

On the contrary, if it is determined in step S120 that the display unit 151 is in the bent state, the electronic device 100 may identify output video characteristics respectively set for at least two regions in the display unit 151 which are divided by the bending (S130) and may display information on each of the regions according to the video output characteristics that may be set differently from each other for the regions (S140).

It has been already described that in the electronic device 100 according to the present invention when the display unit 151 is in the bent state the display unit 151 may be divided into at least two or more regions by bending.

Further, the electronic device 100 according to the first embodiment may set a separate video output characteristic value for each for the at least two or more regions. Further, video output characteristic values respectively set for the regions may be separately set from video output characteristic values that may be set for the entire region of the display unit 151 when the display unit 151 is in the flat state.

For instance, in the case that the display unit 151 is divided into two regions by bending, a second video output characteristic value may be set for one region and a third video output characteristic value may be set for the other region. On the other hand, the second and third video output characteristic values may be set separately from the first video output characteristic value set for the display unit 151 when the display unit 151 is in the flat state.

Such video output characteristic values may include at least one of a brightness, color, saturation, and orientation of the screen as displayed through the display unit 151.

According to the first embodiment, the electronic device 100 may, by performing the steps S100 and S110, continuously monitor whether the display unit 151 changes its state, and when sensing a change in state, may identify a video output characteristic set in the display unit 151 and suitable for the changed state and control the display unit 151 so that the display unit 151 displays information to fit the set video output characteristic.

Figure 4:
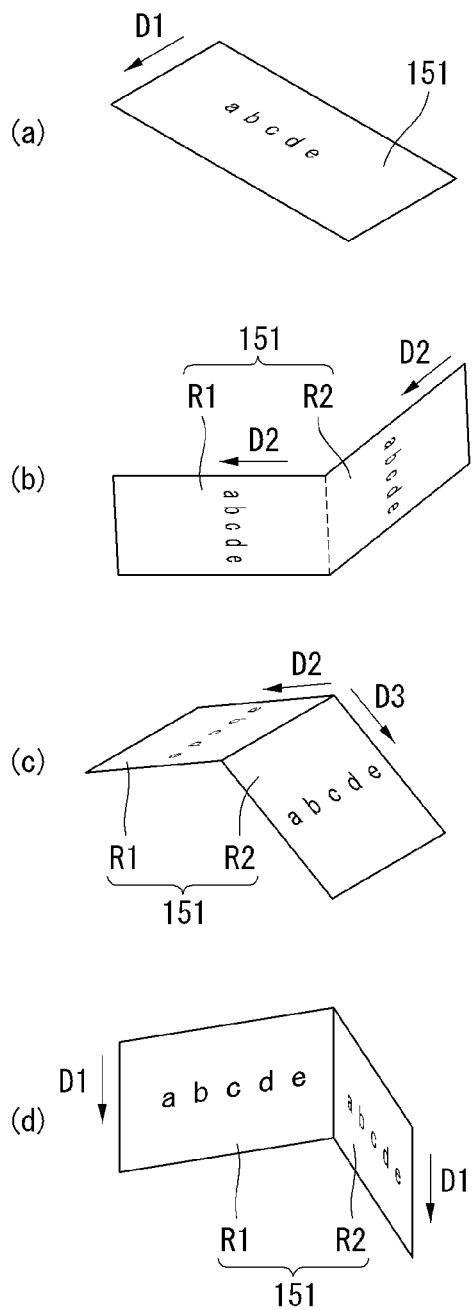
FIG. 4 illustrates a method of controlling an orientation of the display unit depending on a change in state of the display unit according to the first embodiment of the present invention.

FIG. 4 illustrates a method of controlling an orientation of the display unit depending on a change in state of the display unit according to the first embodiment.

(a) of FIG. 4 illustrates an example where when the display unit 151 is in the flat state, its orientation is set as a first direction D1 over the entire display unit 151.

As shown in (b) of FIG. 4, when the display unit 151 changes its state from the flat state to a bent state, the display unit 151 may be divided into a first region R1 and a second region R2. As described earlier, the first and second regions R1 and R2 may be set to have a separate orientation. (b) of FIG. 4 illustrates an example where the first and second regions R1 and R2 are set to have a second direction D2 different from the first direction D1.

In the example illustrated in (b) of FIG. 4, the same orientation is set for both the regions R1 and R2, however, as shown in (c) of FIG. 4, different orientations may be respectively set for the regions R1 and R2. That is, when the display unit 151 changes its state from the flat state into the bent state, the first region R1 may be set to have an orientation of the second direction D2, and the second region R2 may be set to have an orientation of a third direction D3.

Although (b) and (c) of FIG. 4 illustrate that the orientation in the flat state is different from the orientation in the bent state, the direction D1 of the orientation set in the display unit 151 in the flat state may be set to be the same as the direction D1 of the orientation set for the regions R1 and R2 in the bent state.

Meanwhile, an orientation set for each region in a bent state may be previously set by a user or may be automatically set according to a inclined state of each region.

Hereinafter, a method is specifically described in which the electronic device 100 senses a inclined state of each region and accordingly sets an orientation for each region.

As described above, the electronic device 100 may include an inclination sensor that may sense an inclined state of the display unit 151 and/or each region in the display unit 151.

As shown in (a) of FIG. 4, the display unit 151 may be bent in a flat state where the display unit 151 maintains horizontality as a whole to turn into a bent state.

For instance, as shown in (b) of FIG. 4, among first and second regions R1 and R2 that may be discerned by bending, the first region R1 may maintain horizontality while the second region R2 may turn into an inclined state with respect to horizontality. At this time, the electronic device 100 may set an orientation of the second region R2 in consideration of the inclined direction of the second region R2. That is, the electronic device 100 may set the orientation of the second region R2 so that the orientation direction of the second region R2 corresponds to a direction of gravity while the second region R2 remains inclined.

As another example, as shown in (c) of FIG. 4, in the case that the first and second regions R1 and R2, which are discerned from each other by bending, are both inclined without being left horizontal, the electronic device 100 may set orientations so that each of the regions R1 and R2 corresponds to a gravity direction. Accordingly, as shown in (c) of FIG. 4, the orientations for the first and second regions R1 and R2 may be set to have different directions.

As a still another example, as shown in (d) of FIG. 4, in the case that the first and second regions R1 and R2, which are discerned from each other by bending, both stand upright (or inclined) with respect to a horizontal surface, the electronic device 100 may set orientations for each of the regions R1 and R2 to correspond to a gravity direction so that the orientations are downwards.

Meanwhile, in automatically setting orientations for the regions R1 and R2, an orientation for one region may be set considering not only its inclined state but also an inclined state (or orientation) of the other region. For example, even when the second region R2, which has been in such a state as shown in (a) of FIG. 4, moves and the display unit 151 is thereby bent while the first region R1 remains in the horizontal state without a change in its inclined state as shown in (b), the orientation of the first region R1 may have the same direction as the orientation set for the second region R2 as the second region R2 is inclined to change its orientation.

FIG. 5 illustrates a method of controlling brightness, saturation, and color of the display unit depending on a change in state of the display unit according to the first embodiment of the present invention. Although controlling brightness is hereinafter described for convenience of description, saturation and color may be also controlled by the same or similar method to those described below.

(a) of FIG. 5 illustrates an example where when the display unit 151 is in a flat state, a first brightness value (that is, a luminance value) is set for the overall display unit 151.

As shown in (a) of FIG. 5, in the case that in the flat state having a first brightness value, the display unit 151 turns its state into a bent state as shown in (b) of FIG. 5, brightness values settable separately may be set for the regions R1 and R2, respectively, in the display unit 151, and information may be displayed on each region of the display unit 151 depending on the set brightness values.

That is, as shown in (b) of FIG. 5, the first region R1 may be set to have a second brightness value higher than a first brightness value and the second region R2 may be set to have a third brightness value lower than the first brightness value. That is, information may be displayed more brightly on the first region R1 and less brightly on the second region R2.

The brightness values set for the regions in the bent state may be previously set by a user or may be automatically and variably set depending on the amount of light flowing into each region.

A specific method of adjusting brightness of the display unit 151 depending on the amount of light incident to the display unit 151 may be as follows.

If much amount of light is incident onto the display unit 151 (that is, if the periphery of the electronic device 100 is bright), the brightness value of the display unit 151 may be set to have a higher value, and on the contrary, when little amount of light is incident onto the display unit 151 (that is, if the periphery of the electronic device 100 is dark), the brightness value of the display unit 151 may be set to have a lower value. Accordingly, in the case that the amount of light incident onto the first region R1 is different from the amount of light incident onto the second region R2, the first and second regions R1 and R2 may be set to have different brightness values, respectively. To measure the amount of light incident onto each region according to the first embodiment, the electronic device 100 may include two or more illumination sensors. The illumination sensors may be preferably arranged to be spaced apart from each other at the respective regions that are divided when the display unit 151 is bent.

Figure 6:
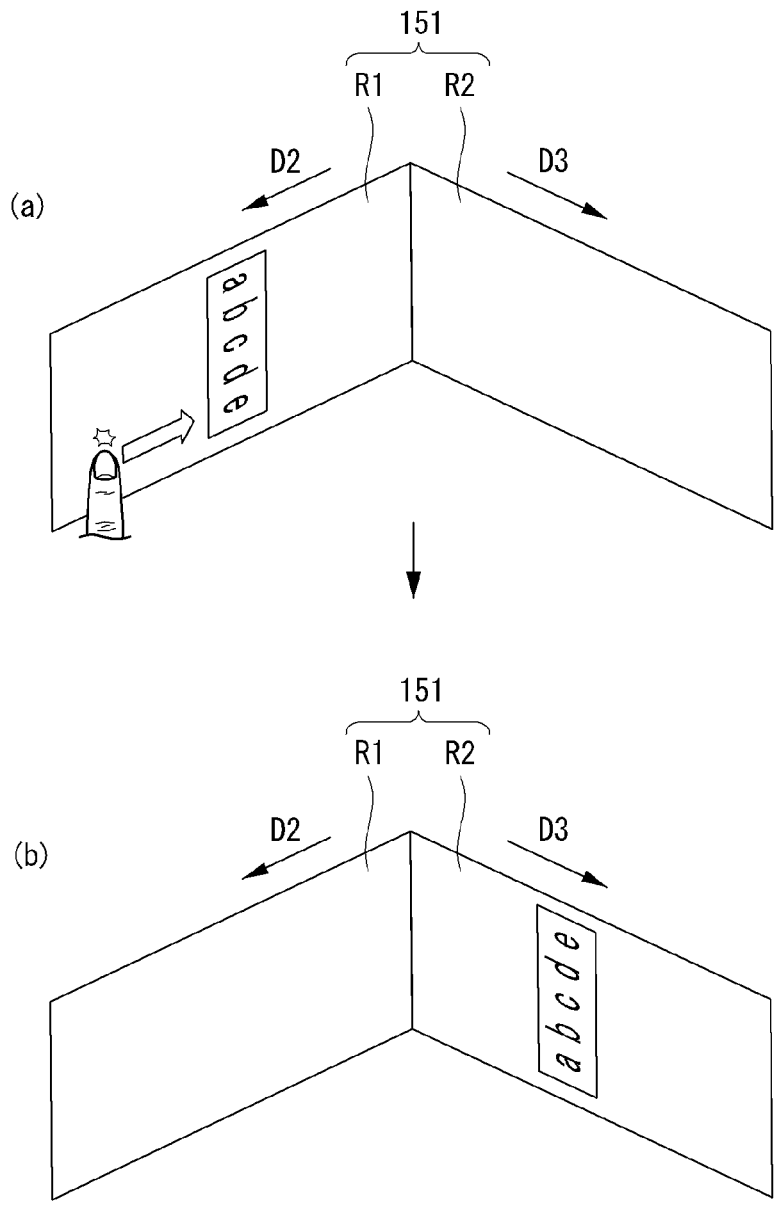
FIGS. 6 and 7 are views illustrating exemplary operations of the electronic device according to the first embodiment of the present invention.
Figure 7:
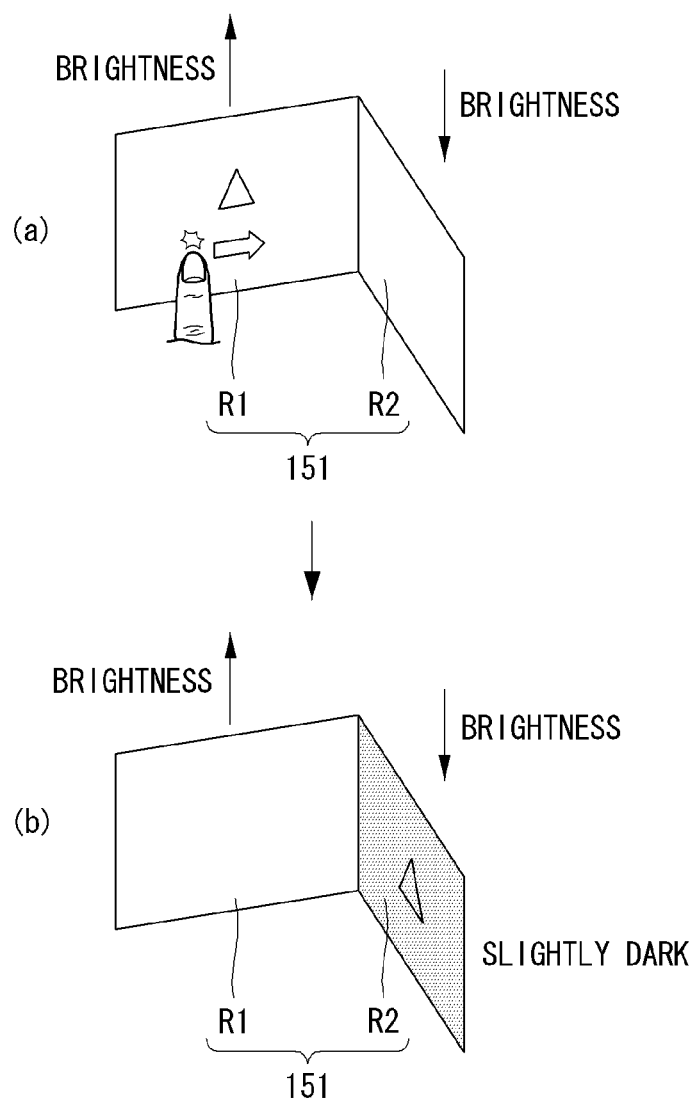

FIGS. 6 and 7 are views illustrating exemplary operations of the electronic device according to the first embodiment.

Referring to FIG. 6, when a user requests, through a touch input (for example, a flicking operation), that the electronic device 100 moves information, which has been displayed on the first region R1 along an orientation direction D2 set for the first region R1 as shown in (a) of FIG. 6, to the second region R2 so that the information is displayed on the second region R2, the information may be displayed on the second region R2 along an orientation direction D3 set for the second region R2.

Referring to FIG. 7, when a user requests, through a touch input (for example, a flicking operation), that the electronic device 100 moves information, which has been displayed on the first region R1 according to a brightness value set for the first region R1 as shown in (a) of FIG. 7, to the second region R2 so that the information is displayed on the second region R2, the information may be displayed on the second region R2 according to a brightness value (lower than the brightness value set for the first region R1) set for the second region R2. Accordingly, the information may be displayed at a lower brightness on the second region R2 than on the first region R1.

According to the first embodiment, it has been described that video output characteristics may be separately set for the display unit 151 and/or each of the regions R1 and R2.

Although it has been described in the first embodiment that bending occurs at one spot in the display unit 151 and the display unit 151 is thus divided into two regions, the first embodiment may also apply to an example where the display unit 151 is divided into three or more regions.

Further, in the case that the display unit 151 is divided into the regions by bending the display unit 151 in applying the first embodiment, at least one region may be turned off. For example, under such a circumstance as shown in (b) of FIG. 5, when the brightness set for the second region R2 is '0', only the first region R1 maintains ON while the second region R2 may be turned off. Accordingly, power consumed by the display unit 151 may be efficiently controlled.

By doing so, the electronic device 100 may separately set video output characteristics set for the display unit in the flat state and bent state, and may also separately set video output characteristics for the regions divided in the bent state.

Further, it can be possible to provide a user with a more convenient user interface by properly setting video output characteristics set for the display unit depending on the state of the electronic device.

Second Embodiment

Hereinafter, a second embodiment of the present invention is described.

Figure 8:
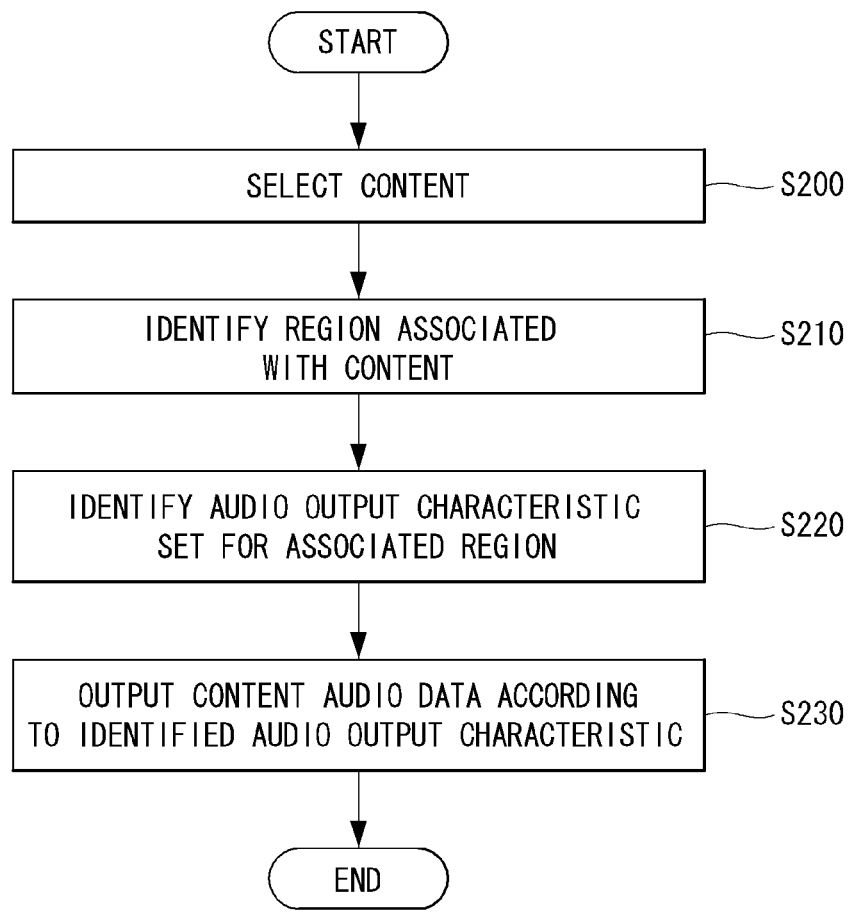
FIG. 8 is a flowchart illustrating a method of controlling an electronic device according to a second embodiment of the present invention.

FIG. 8 is a flowchart illustrating a method of controlling an electronic device according to a second embodiment of the present invention.

Referring to FIG. 8, a method of controlling an electronic device according to the second embodiment may include at least one of a step of selecting a content (S200), a step of identifying a region associated with the executed content (S210), a step of obtaining an audio output characteristic set for the associated region (S220), and a step of outputting content audio data depending on the obtained audio output characteristic (S230).

The electronic device 100 according to the second embodiment may separately set audio output characteristics for at least two or more regions. Further, an audio output characteristic value set for each region may be set separately from an audio output characteristic value that may be set when the display unit 151 is in a flat state.

Figure 9:
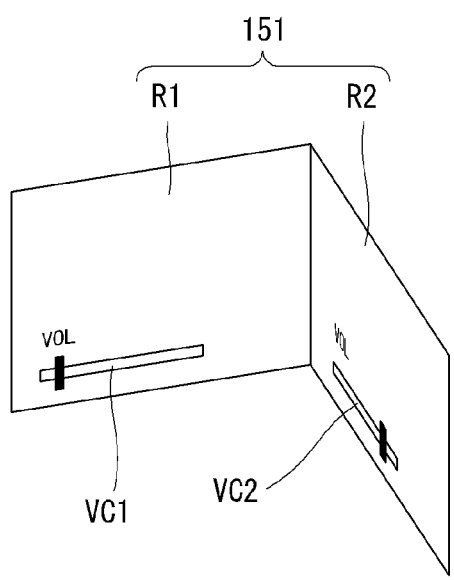
FIG. 9 illustrates setting different audio output characteristics for the regions, respectively, according to the second embodiment of the present invention.

For example, when the display unit 151 is in the flat state, a first audio output characteristic value may be set, and when the display unit 151 is divided into two regions by bending, as shown in FIG. 9, second and third audio output characteristic values VC1 and VC2 may be set for regions R1 and R2, respectively. On the other hand, the second and third audio output characteristic values VC1 and VC2 may be set separately from the first audio output characteristic value VC3 (refer to (b) of FIG. 12) that is set in the flat state.

Such audio output characteristic values may include a magnitude (i.e., a sound volume value) of a sound output through the sound output unit 152 and an equalizer set value.

At this time, the electronic device 100 may select content to be output through the output unit 150 (S200). That is, the electronic device 100 may output visual data of the content through the display unit 151 and auditory data of the content through the sound output unit 152.

The electronic device 100 may select the content in various manners. For instance, the electronic device 100 may select the content in response to a user's input. For instance, the electronic device 100 may select the content based on an operation of a system and/or an application that is executed by the electronic device 100. For instance, the electronic device 100 may select the content in response to information and/or a control signal received through another electronic device.

The content may be at least one of image data, video data, audio data, and an application.

Subsequently, the electronic device 100 may identify a region of the display unit 151 associated with the selected content (S210).

Figure 10:
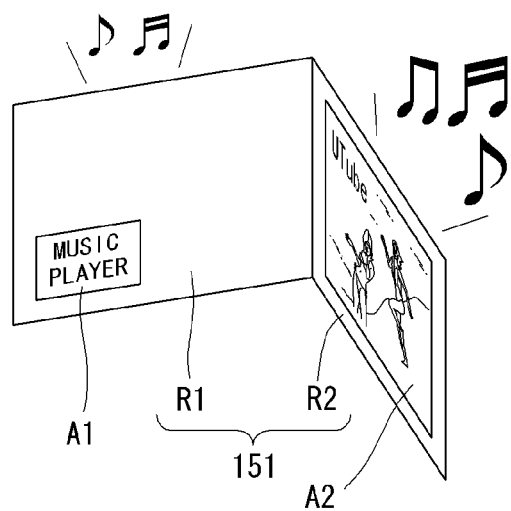

FIGS. 10 and 11 are views illustrating a method of identifying a region of a display unit, which is associated with content, according to the second embodiment of the present invention.

The electronic device 100 may identify the region of the display unit associated with the content considering a region on which the selected content is displayed.

For instance, as shown in FIG. 10, in the case that a first application A1 is displayed on a first region R1 and a second application A2 is displayed on a second region R2, the electronic device 100 may determine that the first application A1 is associated with the first region R1, and the second application A2 is associated with the second region R2.

For instance, as shown in FIG. 11, in the case that the selected content is displayed on the first and second regions R1 and R2, the electronic device 100 may determine that a region on which a larger portion of the selected content is displayed is associated with the content. That is, as shown in (a) of FIG. 11, when the first application A1 is displayed at a larger area ratio on the first region R1 than on the second region R2, the electronic device 100 may identify that the first application A1 is associated with the first region R1, and as shown in (b) of FIG. 11, when the first application A1 is displayed at a larger area ratio on the second region R2 than on the first region R1, the electronic device 100 may identify that the first application A1 is associated with the second region R2.

On the other hand, the electronic device 100, in consideration of the region displaying the selected content, may consider a region on which the content was displayed as well as a region on which the content is currently displayed. For instance, in the case that the selected content, which has been displayed on the first region R1, is displayed on neither the first region R1 nor the second region R2, the electronic device 100 may determine that the first region R1 is associated with the content. In the case that the selected content has been displayed on both the regions R1 and R2, a region associated with the selected content may be determined based on the criterion described in connection with FIG. 11.

There may be various regions why the selected content which has been displayed on the display unit 151 is not displayed any longer. For example, after requesting the display of the content, a user does not want to consume the content and thus requests termination of content display. As another example, while first content is in execution, a user may request execution of second content so that the second content is executed as a foreground while the first content is executed as a background.

Although not shown in the drawings, when the display unit 151 is in a flat state, the electronic device 100 may determine that the selected content is associated with the overall regions of the display unit 151.

When identifying a display region associated with the selected content in step S210, the electronic device 100 may obtain an audio output characteristic set in the identified display region and may output audio data of the selected content through the sound output unit 152 based on the audio output characteristic.

For instance, as shown in FIG. 9, when a second sound volume value VC1 is set in the first region R1 and a third sound volume value VC2 (VC2>VC1) is set in the second region R2, audio data may be output depending on the second sound volume value VC1 by a first application A1 (e.g., a music player) displayed on the first region R1, and audio data may be output depending on the third sound volume value VC2 by a second application A2 (e.g., a video player) displayed on the second region R2. That is, a magnitude of sound by the music player A1 may be smaller than a magnitude of sound by the video player A2.

Although not shown, in the case that the first application A1 which has been displayed on the first region R1 is shifted and displayed on the second region R2 in response to a user's request and/or an operation of a system of the electronic device 100 or another application, a sound volume of the audio data output by the first application A1 may be changed from the second sound volume value VC1 to the third sound volume value VC2.

Figure 12:
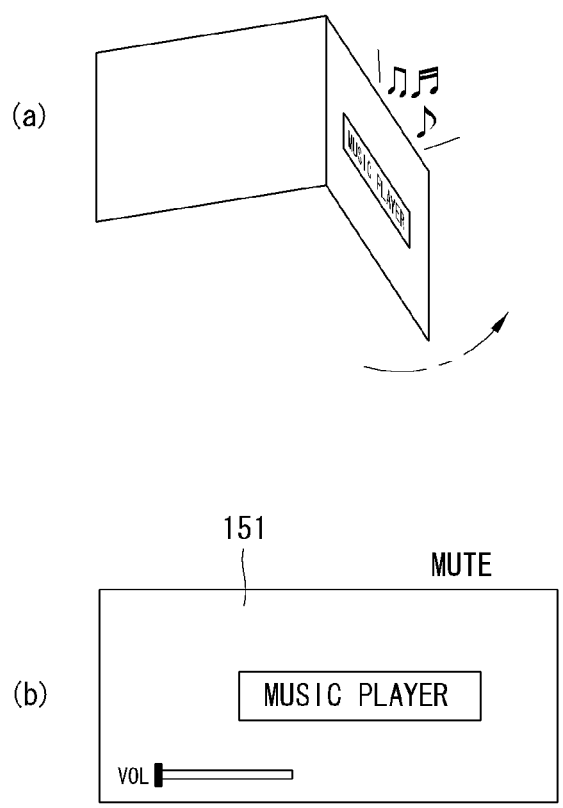
FIG. 12 illustrates setting different audio output characteristics when the display unit is in the flat state and bent state according to the second embodiment of the present invention.

As shown in FIG. 12, in the case that the display unit 151 turns into a flat state while the first application A1 is displayed on the second region R2, a sound volume of the audio data output by the first application A1 may be changed from the third sound volume value VC2 to the first sound volume value VC3. (b) of FIG. 12 illustrates an example where the volume value set for the display unit 151 is '0' (i.e., 'MUTE') when the display unit 151 is in the flat state. In the case that the state shown in (a) of FIG. 12 changes into the state shown in (b) of FIG. 12, the music player A1 outputs the second sound volume value VC3, and when the display unit 151 is changed into the flat state, the music player A1 may be muted.

By doing so, the electronic device 100 may be configured so that different audio output characteristics may be set for the flat state and bent state and for regions divided in the bent state.

Further, audio output characteristics may be properly set at a user's convenience, thus providing the user with a more convenient user interface.

Third Embodiment

Hereinafter, a third embodiment of the present invention is described.

An electronic device 100 according to the third embodiment may set time condition values (hereinafter, "idle time") that are separately set for each of at least two or more regions so that each region may enter into an idle state. An idle time set for each region may be a value separately set from an idle time that may be set when the display unit 151 is in a flat state. To reduce power consumption and/or prevent physical deterioration of the display unit 151, the electronic device 100 stops operation of the display unit 151 or outputs a predetermined screen (screensaver) on the display unit 151 when no input is received for a predetermined time which is hereinafter referred to as an "idle time", wherein such a state that the display unit 151 stops operating or outputs the predetermined screen is referred to as an "idle state".

According to the third embodiment, when the display unit 151 is in the flat state, a first idle time may be set for the display unit 151, and when the display unit 151 is divided into two regions by bending, second and third idle times may be set for the divided regions, respectively. The second and third idle times may be separately set from the first idle time that is set in the flat state.

Figure 13:
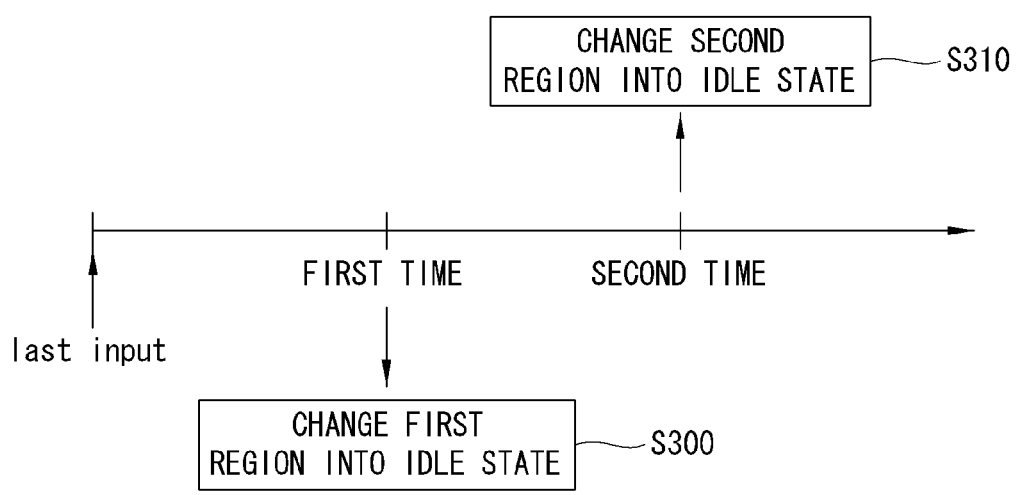
FIGS. 13 and 14 are views illustrating a method of controlling an electronic device according to the third embodiment of the present invention.
Figure 14:
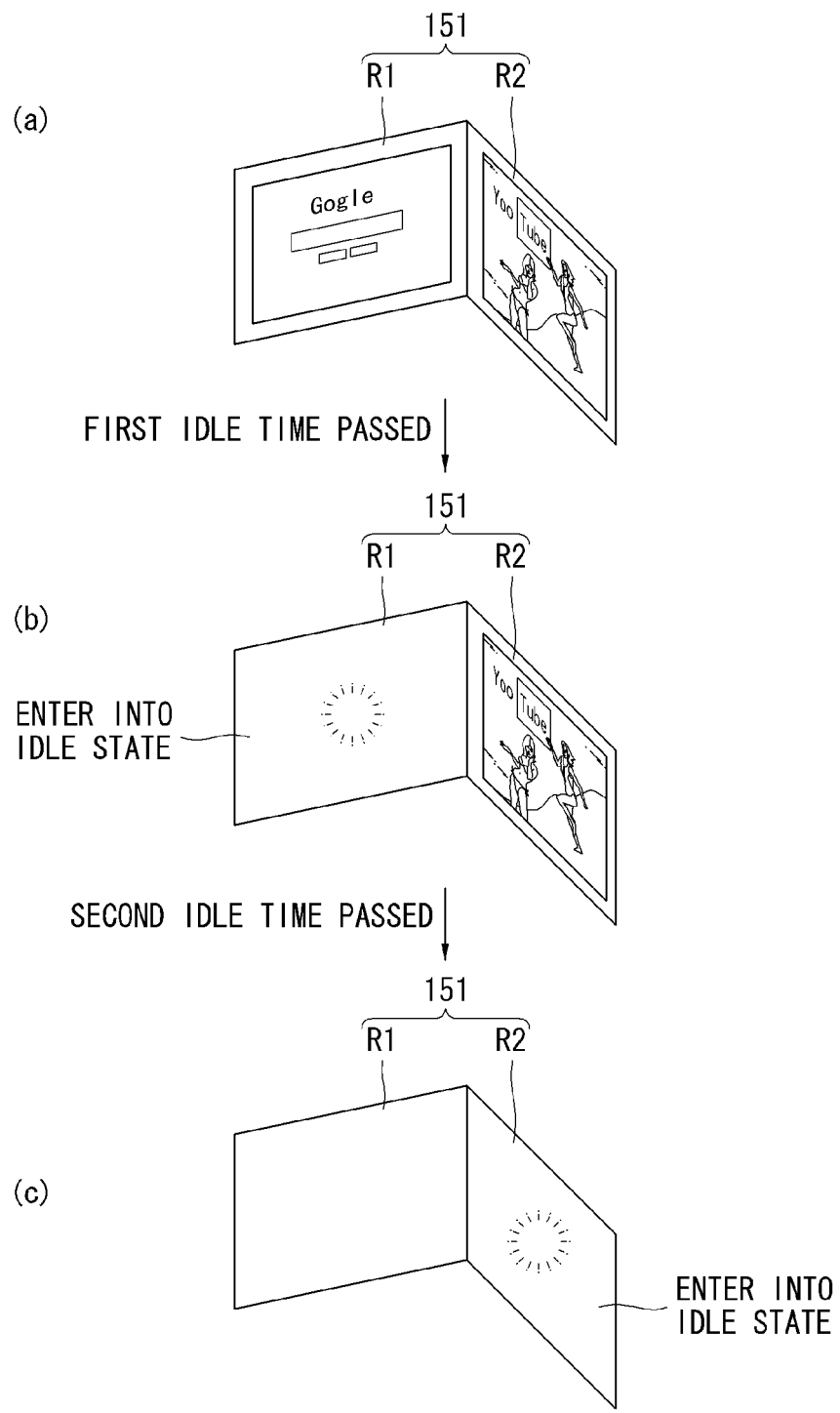

FIGS. 13 and 14 are views illustrating a method of controlling an electronic device according to the third embodiment.

It is assumed that at the time of a last input as shown in FIG. 13, the electronic device 100 displays a webpage on a first region R1 of the display unit 151 as shown in (a) of FIG. 14 and displays a screen playing video content on a second region R2 of the display unit 151.

When the second idle time set for the first region R1 after the last input passes, the electronic device 100 may change the first region R1 into the idle state as shown in (b) of FIG. 14 (S300). Further, when after the third idle time set for the second region R2 after the last input passes, the electronic device 100 may change the second region R2 into the idle state as shown in (c) of FIG. 14 (S310).

The idle times set for respective regions may be preset by a user or may be automatically set in consideration of the type and/or attribute of contents displayed on the regions.

FIG. 15 illustrates an example of setting idle times depending on content displayed on respective regions according to the third embodiment.

Referring to (a) of FIG. 15, a virtual keyboard is displayed on the first region R1, and a webpage is displayed on the second region R2. Referring to (b) of FIG. 15, a webpage is displayed on the first region R1, and a virtual keyboard is displayed on the second region R2.

The electronic device 100 may identify an idle time corresponding to the virtual keyboard and an idle time corresponding to the webpage (for example, idle time corresponding to a web browser for displaying the webpage), and may control when each region enters into the idle time based on idle times corresponding to contents (i.e., applications) displayed on the respective regions. That is, in the case that ten minutes of idle time correspond to the virtual keyboard and eight minutes of idle time correspond the webpage (or web browser), in the example shown in (a) of FIG. 15, the second region R2 enters into the idle state eight minutes after the last input, and the first region R1 enters into the idle state ten minutes after the last input. On the contrary, in the example shown in (b) of FIG. 15, the first region R1 enters into the idle state eight minutes after the last input and the second region R2 enters into the idle state ten minutes after the last input.

As such, the electronic device may be configured to set different idle times for the respective regions, thus providing a user with a more convenient user interface.

Fourth Embodiment

Hereinafter, a fourth embodiment of the present invention is described.

Figure 16:
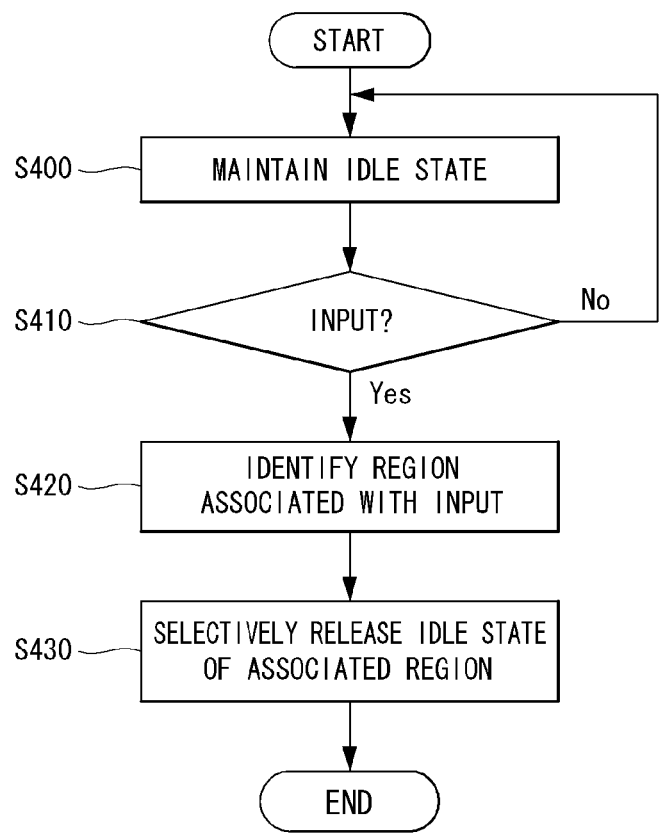
FIG. 16 is a flowchart illustrating a method of controlling an electronic device according to the fourth embodiment of the present invention.

FIG. 16 is a flowchart illustrating a method of controlling an electronic device according to the fourth embodiment.

Referring to FIG. 16, the controlling method according to the fourth embodiment may include at least one of a step of maintaining at least part of the display unit 151 in the idle state (S400), a step of monitoring whether a predetermined input is received from a user (S410), a step of, when the predetermined input is received from the user, identifying a region of the display unit, which is associated with the received input (S420), and a step of selectively changing the identified region from the idle state back to a normal state (S430). Hereinafter, each step is described in further detail.

The electronic device 100 may maintain at least part of the display unit 151 in the idle state according to a predetermined algorithm (S400). For example, as described in the third embodiment, the electronic device 100 may control the display unit 151 so that the whole or part of the display unit 151 enters into the idle state and maintain the idle state as long as the predetermined input is not received from the user.

The electronic device 100 may monitor whether the predetermined input (hereinafter, referred to as "idle release input") is received from the user (S410).

When the idle release input is not received from the user, the electronic device 100 may maintain the idle state of the display unit 151. However, when the idle release state is received from the user, the electronic device 100 may identify a region associated with the received idle release input (S420). Accordingly, the electronic device 100 may selectively change the region associated with the received idle release input from the idle state back to the normal state (S430).

Figure 17:
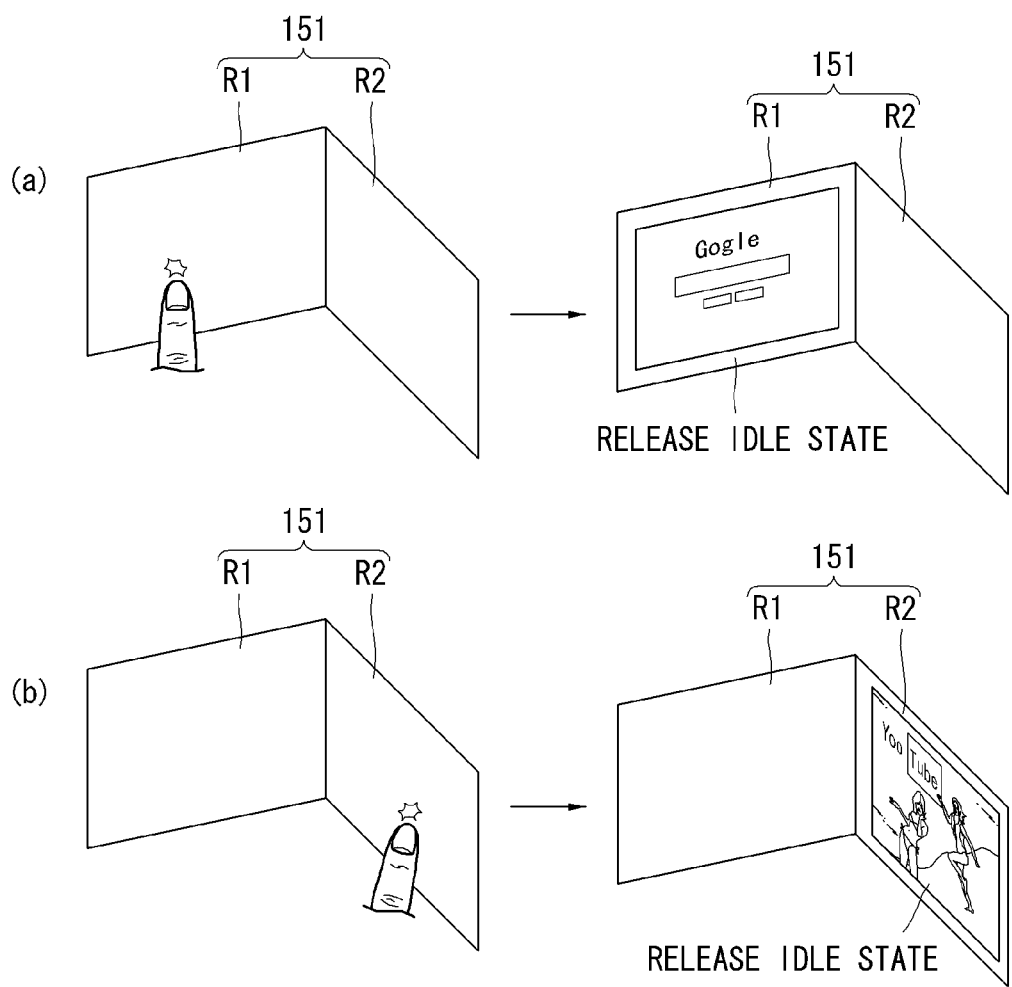
FIG. 17 illustrates an example of selectively releasing the idle state of the display unit according to the fourth embodiment of the present invention.

FIG. 17 illustrates an example of selectively releasing the idle state of the display unit according to the fourth embodiment, wherein in the case that the idle release input is a touch input, a region is selectively released from the idle state in response to the touch input.

Referring to (a) of FIG. 17, when receiving a touch input while the display unit 151 is in the idle state, the electronic device 100 may recognize such an input as the idle release input and accordingly determine a first region R1 on which the touch input is received as a region associated with the touch input. As a consequence, the first region R1 may be released from the idle state and change back to the normal state, so that a screen (first webpage screen—hereinafter, screens having "Gogle" written thereon are referred to as the first webpage screen) that had been displayed on the first region R1 before entering into the idle state may be displayed.

On the contrary, as shown in (b) of FIG. 17, when the user's touch input is received on the second region R2, the electronic device 100 may determine that the idle release input (i.e., touch input) is associated with the second region R2 and accordingly may release the second region R2 from the idle state to change back to the normal state.

Various types of idle release inputs other than the mere touch input may be used. For example, the idle release input may include at least one of an input of a specific key, a specific key sequence, a touch having a specific pattern, and bending operation (for example, unfolding the display unit bent (folded) into the flat state or vice versa).

FIGS. 18 to 21 are views illustrating various types of idle release inputs according to the fourth embodiment.

Figure 18:
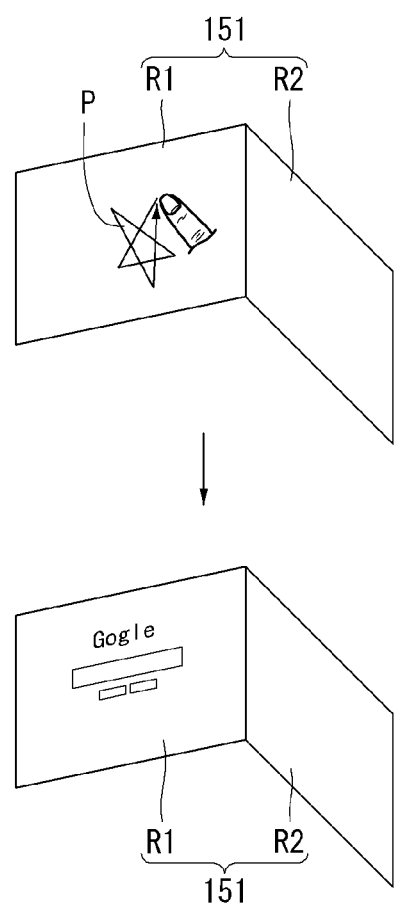

The idle release input may be a touch input having a predetermined pattern. That is, the electronic device 100 may have different unique patterns correspond to respective regions of the display unit 151 for the idle release input, and when receiving a specific pattern of input, may release a region corresponding to the specific pattern. For example, as shown in FIG. 18, when receiving a touch input (idle release input) having a star shape on the first region R1 while the first region R1 corresponds to a star pattern as the specific pattern, the electronic device 100 may determine that the first region R1 is associated with the idle release input and may change the first region R1 back to the normal state.

Figure 19:
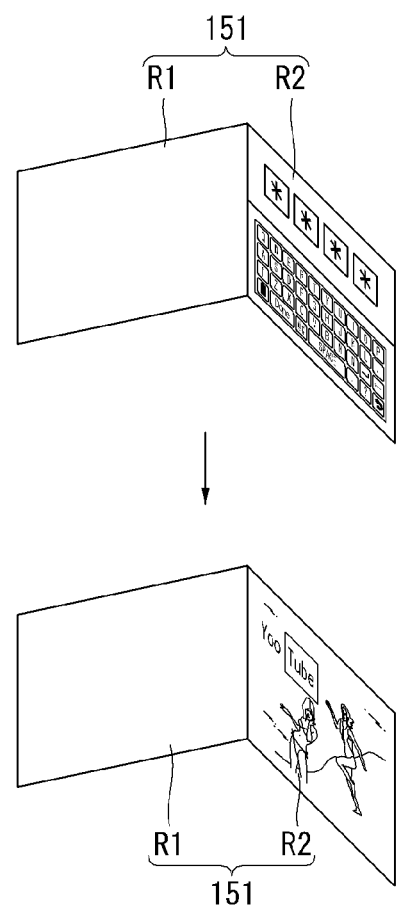
Figure 21:
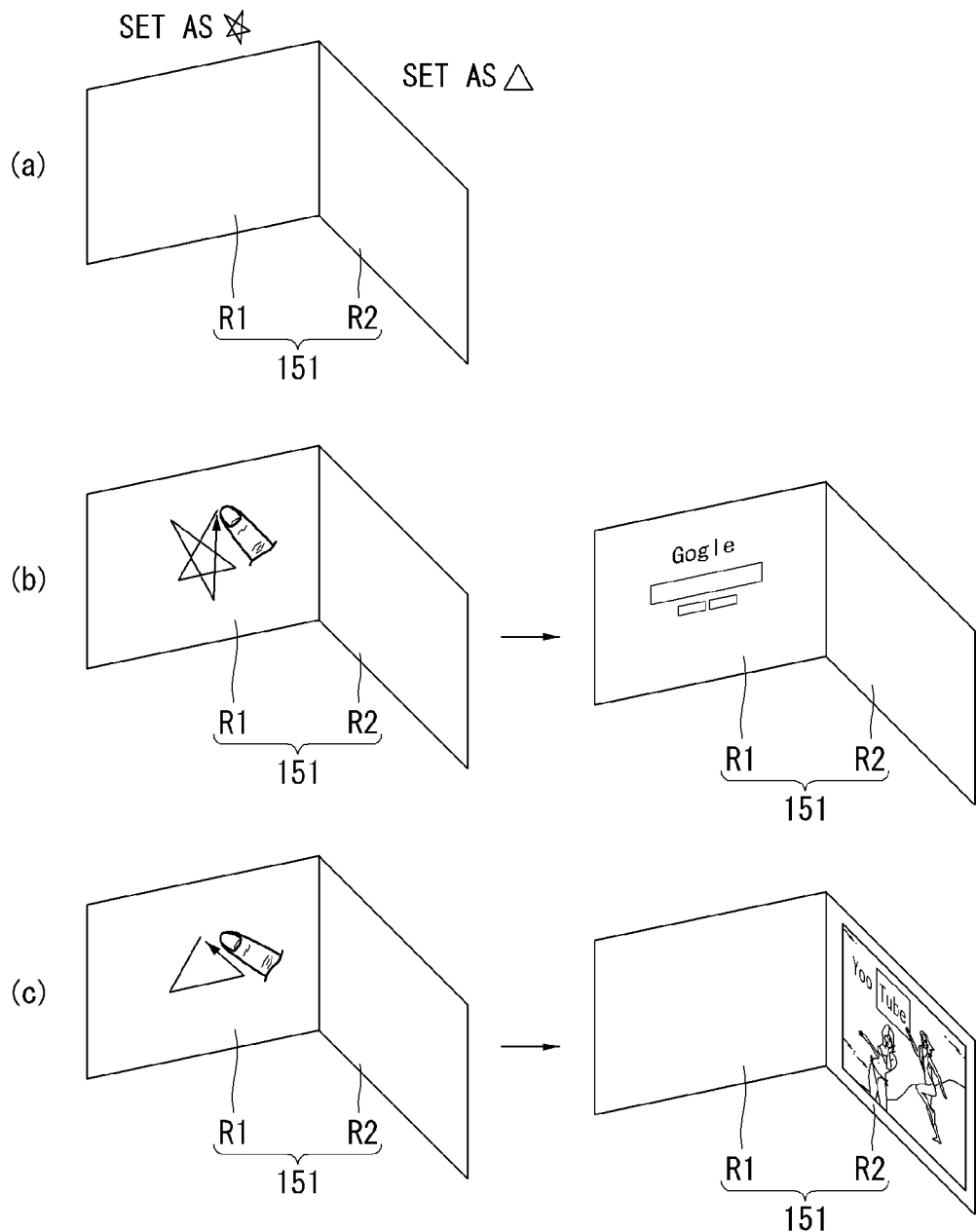

The idle release input may be a predetermined specific key sequence. That is, the electronic device 100 may have different unique key sequences correspond to respective regions of the display unit 151 as a password for the idle release input, and when receiving a specific key sequence corresponding to a region, may release the corresponding region from the idle state. For example, as shown in FIG. 19, when a predetermined key sequence is received on the second region R1 from a user, the electronic device 100 may determine that the second region R2 is associated with the idle release input and may change the second region R2 back to the normal state so that a screen (second webpage screen—hereinafter, screens having "YooTube" put thereon in the drawings are referred to as the second webpage screen) which had been displayed on the second region R2 before entry into the idle state may be displayed on the second region R2.

The idle release input may be a bending operation. When the idle release input is a bending operation, the electronic device 100, in determining a region associated with the idle release input, may consider which region is moved upon bending. For example, when the second region R2 is moved upon bending as shown in (a) of FIG. 20, the electronic device 100 may determine that the second region R2 is associated with the idle release input and may release the second region R2 from the idle state. Similarly, when it is the first region R1 which is moved when the display unit 151 is bent as shown in (b) of FIG. 20, the electronic device 100 may determine that the first region R1 is associated with the idle release input and may release the first region R1 from the idle state to change back to the normal state. On the other hand, in the case that the idle release input is a bending operation, other than a region moved upon bending is determined to be associated with the idle release input, a region with no move when bent may be determined to be associated with the idle release input.

To determine a region associated with the idle release input, it is not necessary for the electronic device 100 to consider a region receiving the idle release input. For example, in the case that, as shown in (a) of FIG. 21, a star-shaped specific pattern corresponds to the first region R1 as the idle release input and a triangular specific pattern corresponds to the second region R2 as the idle release input, when a star-shaped specific pattern is received on the first region R1 as shown in (b) of FIG. 21, the first region R1 is released from the idle state as described above. However, although the triangular specific pattern is received on the first region R1, when the triangular pattern corresponds to the second region R2, the second region R2 may be released from the idle state.

By releasing the respective regions of the display unit 151 separately from each other, the electronic device 100 may provide a user with a more convenient user interface. In other words, the electronic device 100 allows a user to set an idle release input having a higher security level to a specific region of the display unit 151 so that the user's information may be prevented from being disclosed to others against his intention.

Fifth Embodiment

A fifth embodiment is hereinafter described.

Figure 22:
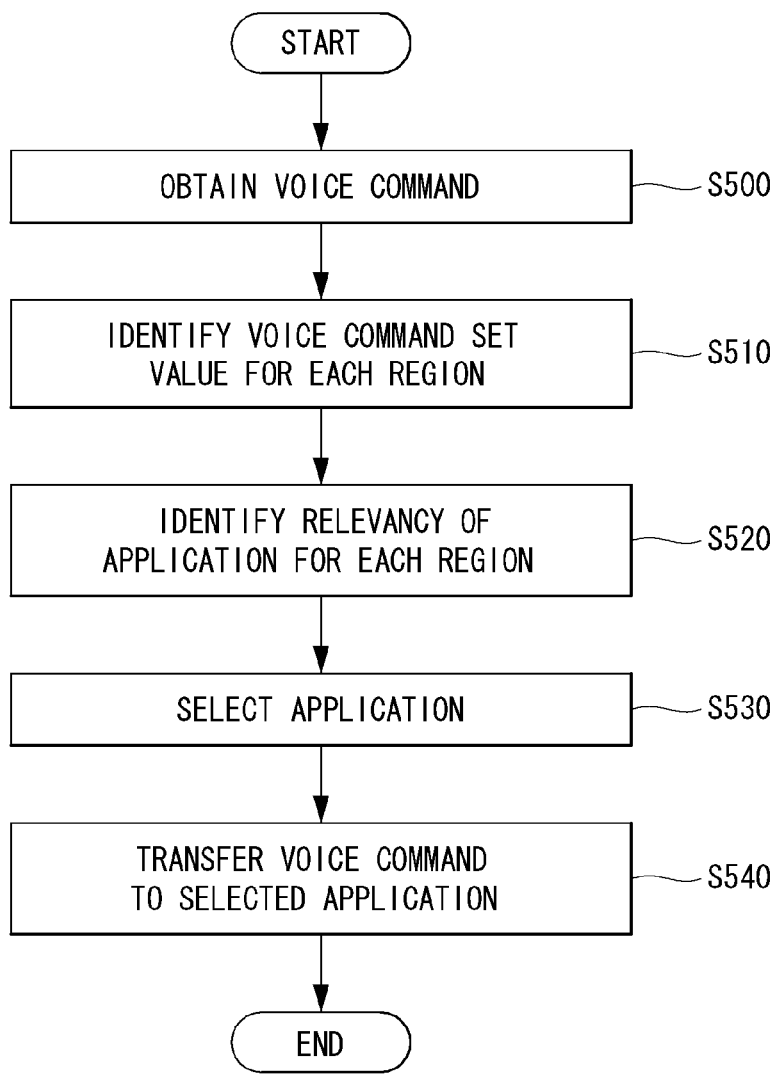
FIG. 22 is a flowchart illustrating a method of controlling an electronic device according to a fifth embodiment of the present invention.

FIG. 22 is a flowchart illustrating a method of controlling an electronic device according to a fifth embodiment of the present invention.

Referring to FIG. 22, the control method according to the fifth embodiment includes at least one of a step of obtaining a voice command when at least one application is in execution (S500), a step of selecting a region considering voice command set values for respective regions (S510), a step of identifying relevancy of the at least one application for the selected region (S520), a step of selecting some of the at least one application based on the identified relevancy (S530), and a step of transferring the voice command to the selected application(s) (S540). Hereinafter, each step is described in greater detail.

While at least one application is executed, the electronic device 100 may obtain a voice command (S500). The voice command may be input through the microphone 122 (voice input unit).

The electronic device 100 may receive a user's voice through the microphone 122 in the electronic device 100. The electronic device 100 may obtain a user's voice by receiving an input from a microphone in a second electronic device through the communication unit 110. For example, the second electronic device may include a remote controller and mobile terminal present outside the electronic device 100. For ease of description, it is described that the electronic device 100 receives a user's voice or voice command through the microphone 122 in the electronic device 100, but the present invention is not limited thereto. For example, an embodiment in which the electronic device 100 receives a voice command obtained by other electronic devices also belongs to the scope of the present invention.

The electronic device 100 may recognize a voice input from the microphone 122 and may control all applications (e.g., broadcast programs, videos, still images, web browsers, etc.) executable by the electronic device 100 based on a result of the voice recognition.

The electronic device 100 may provide a user with a feedback associated with a process of controlling the application based on the input voice command. Various feedback means may be used. For example, for the control process based on the voice command, the electronic device 100 may provide a visual feedback through the display unit 151 and an auditory feedback through the sound output unit 152. Besides, tactile means may be used for a feedback. Accordingly, a user may notice that the electronic device 100 is being controlled by his voice command.

When receiving a user's voice command, the electronic device 100 may identify a voice command set value for each region and may select one region in consideration of the identified voice command set value (S510).

It has been described above that when the display unit 151 is in a bent state, the display unit 151 may be divided into at least two or more regions.

The electronic device 100 according to the fifth embodiment may set different voice command set values for the at least two or more regions, respectively. The "voice command set value" refers to a value set on whether to allow the electronic device 100 and/or an application in execution or installed in the electronic device 100 to operate by a voice command with respect to a corresponding region or the entire display unit 151. For example, the voice command set value may be set as "activated" or "inactivated" over each region of the display unit 151 and/or the entire display unit 151.

When the display unit 151 is in the flat state, voice command set values set for the regions may be set separately from a voice command set value that may be set for the entire display unit 151.

For example, in the case that the display unit 151 is divided into two regions by bending, one region may be set to have a voice command set value of "activated", and the other region may be set to have a voice command set value of "inactivated". On the other hand, when in the flat state, a voice command set value for the display unit 151 may be separately set as "activated" or "inactivated" regardless of the values set for the regions.

Figure 23:
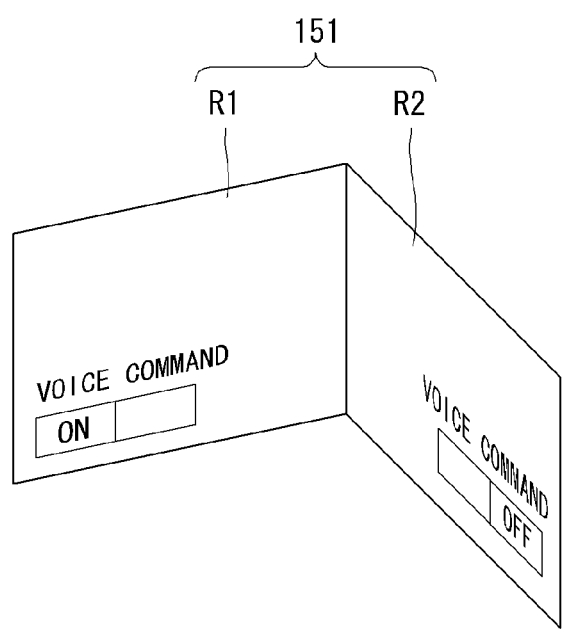
FIG. 23 illustrates an example where according to the fifth embodiment different voice command set values are set for respective regions.

FIG. 23 illustrates an example where according to the fifth embodiment different voice command set values are set for respective regions. As shown in FIG. 23, according to the fifth embodiment, different voice command set values may be set for regions R1 and R2, respectively, of the display unit 151. In FIG. 23, the first region R1 is set to have a voice command set value of "activated" and the second region R2 is set to have a voice command set value of "inactivated".

In performing step S510, the electronic device 100 may select a region whose voice command set value is set as "activated". That is, under the circumstance shown in FIG. 23, the electronic device 100 may select the first region in step S510.

Subsequently, the electronic device 100 may identify relevancy of the at least one application for the selected region (S520).

The relevancy of the application may be determined based on a degree by which the application is displayed on the selected region.

Figure 24:
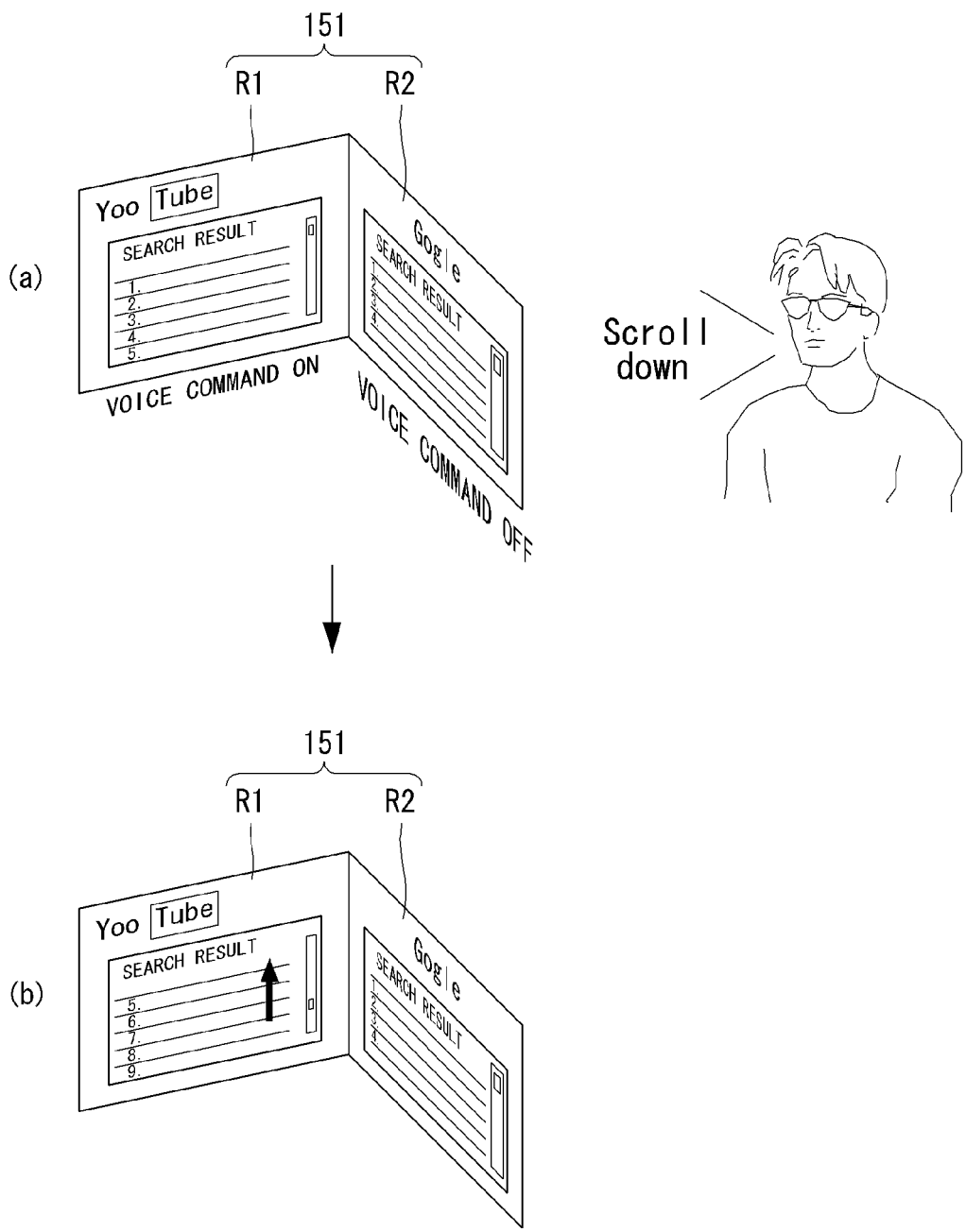
FIG. 24 illustrates an example of selectively operating an application by a voice command according to the fifth embodiment of the present invention.

FIG. 24 illustrates an example of selectively operating an application by a voice command according to the fifth embodiment.

Referring to (a) of FIG. 24, a second webpage is displayed on the first region R1 and a first webpage is displayed on the second region R2. Under the situation shown in FIG. 24, the electronic device 100, in performing step S520, may identify that an application outputting the second webpage has higher relevancy and an application outputting the first webpage has lower relevancy with respect to the region selected in step S510 (first region in the example shown in FIG. 23).

Identifying the relevancy of application for the selected region may be performed similarly to identifying relevancy of a region for content as described in connection with FIG. 11. That is, when the specific application is displayed on both the first and second regions R1 and R2 in such a manner that the display of the application occupies a larger area on the first region R1 than the second region R2, it may be determined that the specific application has higher relevancy for the first region R1 and lower relevancy for the second region R2.

Subsequently, the electronic device 100 may select some of the at least one application based on the identified relevancy (S530).

In selecting some application, the electronic device 100 may select an application having higher relevancy for the selected region (i.e., first region R1). That is, while performing step S530, the electronic device 100 may select an application that is outputting the second webpage which is an application with higher relevancy for the first region R1.

On the other hand, in performing step S530, the electronic device 100 may preferably select one application.

For example, when two applications are in execution—one application (application X) is displayed only on the first region and the other application (application Y) is displayed on the first region R1 by ⅔ and second region R2 by ⅓, the electronic device 100 may bestow higher relevancy for the application X displayed only on the first region R1 and may select only the application X in step S530.

As another example, in the case that two executing applications are both displayed only on the first region R1, the electronic device 100 may provide higher relevancy to an application executed more recently between the two applications, thereby selecting only the more recently executed application. Or in consideration of an execution priority determined by the control unit 180 (e.g., CPU) of the electronic device 100, only an application having a higher priority may be selected between the two applications. Further, in the case that one application cannot be operated by a voice command and the other application can be operated by a voice command, the voice command operable application only may be selected.

Subsequently, the electronic device 100 may transfer the voice command to the selected application (S540). Accordingly, the application receiving the voice command may perform an operation based on the voice command.

For example, as shown in (b) of FIG. 24, the application (e.g., web browser) displayed and executed on the first region R1 may scroll down the second webpage according to a user's voice command "Scroll down".

The electronic device 100 may provide a user with a more effective user interface by allowing different voice command set values to be set for respective regions in the display unit 151. In particular, among a few regions of the display unit, only a specific region may be set to be operated in response to a voice command so that voice control can be performed by selecting only an application displayed on the specific region while multitasking is in progress over the divided regions of the display unit, thus increasing user convenience.

Sixth Embodiment

A sixth embodiment of the present invention is hereinafter described.

Figure 25:
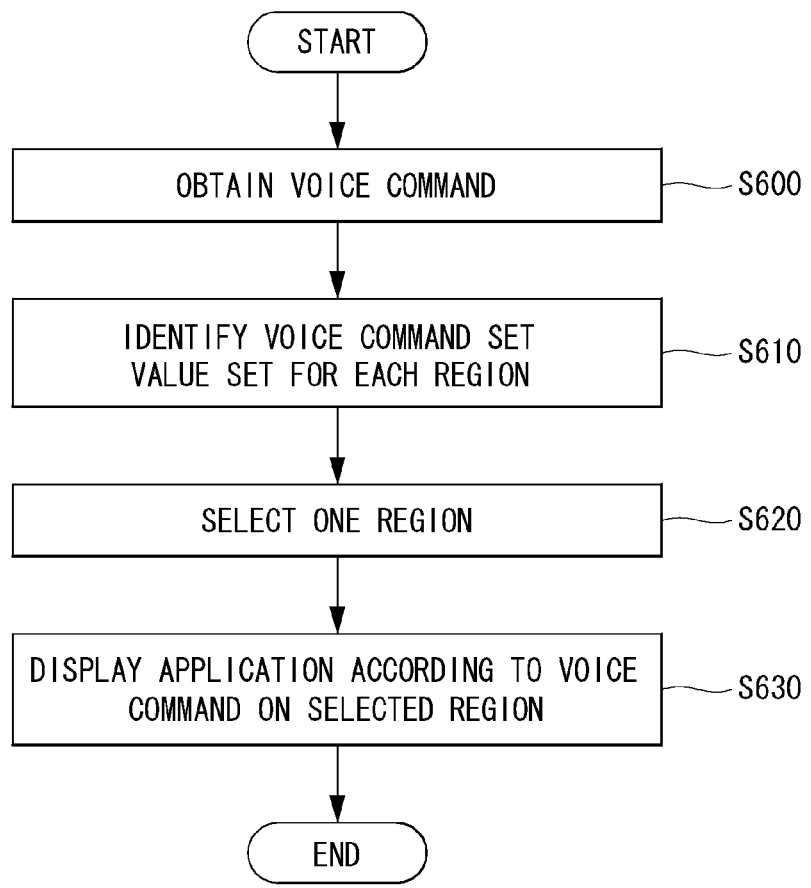
FIG. 25 is a flowchart illustrating a method of controlling an electronic device according to a sixth embodiment of the present invention.

FIG. 25 is a flowchart illustrating a method of controlling an electronic device according to a sixth embodiment of the present invention.

Referring to FIG. 25, the control method according to the sixth embodiment may include at least one of a step of obtaining a voice command (S600), a step of identifying voice command set values set for respective regions (S610), a step of selecting one region based on the identified voice command set values (S620), and a step of displaying an application according to the voice command on the selected region (S630). Steps S600 and S610 are the same or similar to steps S500 and S510 in the fifth embodiment, and detailed descriptions thereof are omitted. Hereinafter, steps S620 and S630 are described.

The electronic device 100 may select one region among two or more regions of the 151 based on voice command set values identified in step S610 (S620). That is, the electronic device 100 may select one region having a voice command set value set as "activated" among the regions in the display unit 151. For example, in the case that as shown in FIG. 23, the first region R1 is set to have a voice command set value of "activated" and the second region R2 is set to have a voice command set value set of "inactivated", the electronic device 100 may select the first region R1.

Subsequently, the electronic device 100 may display an application according to the voice command on the selected region (S630). That is, the electronic device 100 may select an application associated with the input voice command and may display the application on the selected region.

Figure 26:
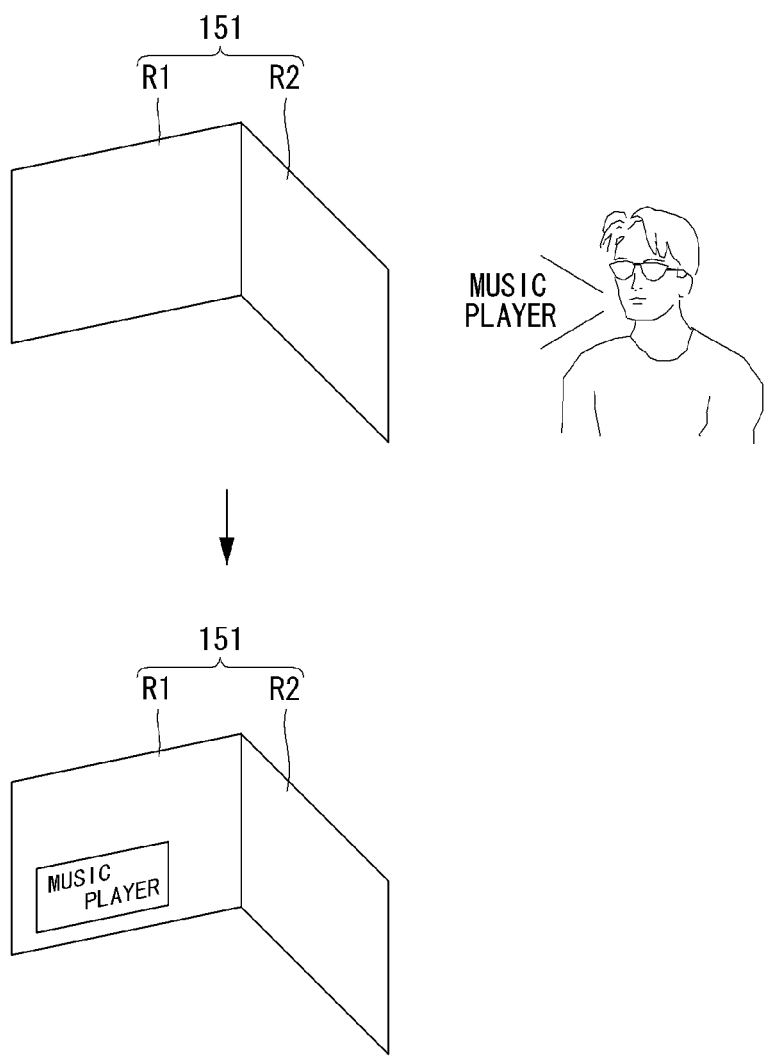
FIG. 26 illustrates an example where the electronic device 100 is operated according to the sixth embodiment of the present invention.

FIG. 26 illustrates an example where the electronic device 100 is operated according to the sixth embodiment. Referring to FIG. 26, the electronic device 100 may display a music player on the first region R1 whose voice command set value is set as "activated" in response to a user's voice command "MUSIC PLAYER".

If the applications has not been executed until the voice command is input, the application may be executed while step S630 is performed at the same time. That is, the application associated with the voice command is executed in step S630 and an execution screen of the application may be displayed on the selected region.

In the case that the application has been displayed not on the foreground but on the background so that the applications is not displayed on the display unit 151 when the voice command is input, the application may be displayed on the selected region in step S630.

In the case that the application has been executed and simultaneously displayed on the other region than the selected region when the voice command is input, the application may be relocated and displayed on the selected region in step S630.

The input voice command may include a name of the application or command language for a specific operation of the application.

The electronic device 100 may provide a user with a more effective user interface by allowing different voice command set values to be set for respective regions in the display unit 151. In particular, in the case that among a few regions of the display unit, only a specific region may be set to be operated in response to a voice command, an application called by the voice command may be displayed on the specific region set so that the application is operable in response to the voice command, thus increasing user convenience.

Seventh Embodiment

A seventh embodiment is hereinafter described.

Figure 27:
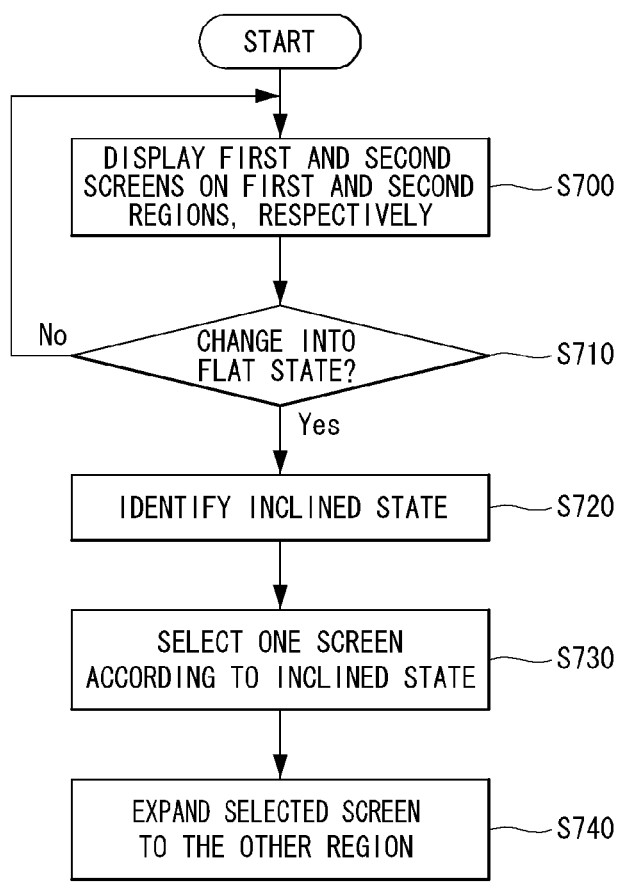
FIG. 27 is a flowchart illustrating a seventh embodiment of the present invention.

FIG. 27 is a flowchart illustrating a seventh embodiment of the present invention, and FIGS. 28 to 31 are views exemplifying the seventh embodiment.

Referring to FIG. 27, the control method according to the seventh embodiment includes at least one of a step of displaying first and second screens on first and second regions, respectively (S700), a step of determining whether a state of the display unit changes into a flat state (S710), a step of, when changing into the flat state, identifying an inclined state of the display unit (S720), a step of selecting one of the first and second screens depending on the inclined state (S730), and a step of expanding and displaying the selected screen onto the other screen (S740). If it is determined in step S710 that the state of the display unit 151 does not change into the flat state, the process returns to step S700 so that the regions may display the screens, respectively. Hereinafter, each step is described in greater detail.

Figure 28:
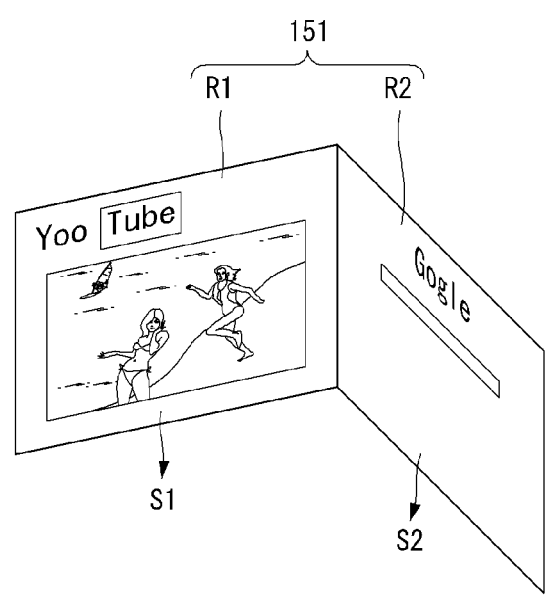
FIGS. 28 to 31 are views exemplifying the seventh embodiment.
Figure 29:
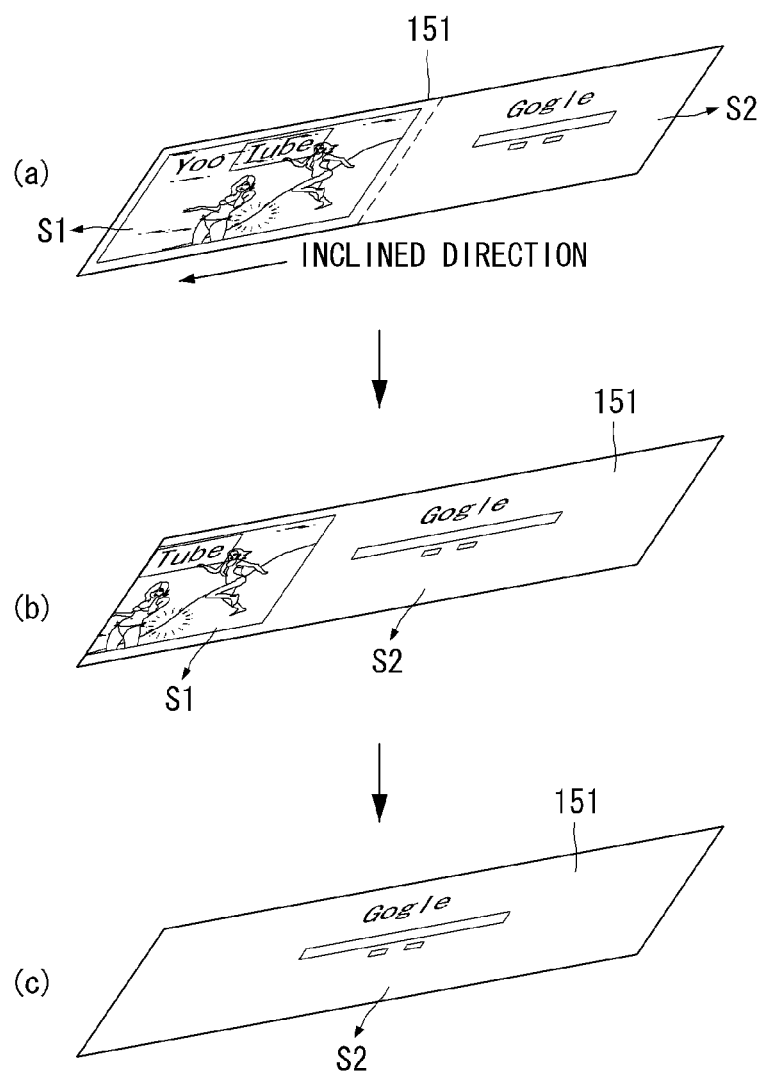

The electronic device 100 may separately display screens respectively corresponding to regions of the display unit 151 (S700). That is, the display unit 151 may be divided into at least two or more regions by bending and the electronic device 100 may display different screens on the regions, respectively. For example, as shown in FIG. 28, the electronic device 100 may display a second webpage screen S1 on the first region R1 and a first webpage screen S2 on the second region R2.

The display unit 151 may change back from the bent state into the flat state by an external force exerted by a user. The electronic device 100 may keep monitoring whether the display unit 151 changes into the flat state (S710). In performing step S710<the electronic device 100 may sense a change in state of the 151 based on a value output from the aforedescribed bending sensor.

If the display unit 151 changes its state from the bend state into the flat state, the electronic device 100 may sense an inclined state of the display unit 151 (S720). In particular, when the display unit 151 is in the bent state, the display unit 151 may sense the inclined state of both ends of the display unit 151, which respectively correspond to the first and second regions R1 and R2. For example, the electronic device 100 may determine whether a direction of gravity is oriented from one end corresponding to the first region R1 toward the other end corresponding to the second region R2 or vice versa. For purposes of illustration, an inclined state where the gravity direction is oriented from one end corresponding to the first region R1 toward the other end corresponding to the second region R2 (as shown in (a) of FIG. 31) is hereinafter referred to as "inclined toward the first region R1" and its opposite inclined state (as shown in (b) of FIG. 31) is referred to as "inclined toward the second region R2".

Subsequently, the electronic device 100 may select one of the first and second screens according to the inclined state (S730). For example, the electronic device 100 may select the screen displayed on the other region than the region toward which the display unit 151 is inclined. That is, when the display unit 151 changes into the flat state while as shown in FIG. 28 the first region R1 displays the second webpage S1 and the second region R2 displays the first webpage S2 and the display unit 151 is inclined toward the first region R1 as shown in (a) of FIG. 29, the electronic device 100 may, in step S730, select the first webpage screen S2 displayed on the second region R2 other than the first region R1.

Subsequently, the electronic device 100 may expand and display the selected screen on the other region (S740). That is, in the example described above, the electronic device 100 may expand the selected first webpage screen S2 from the second region R2 on which the screen S2 has been displayed to the first region R1 and display the screen S2 on the first region R1 as well. Accordingly, the first webpage screen S2 may be expanded and displayed over the entire display unit 151 which is in the flat state.

In performing step S740, the electronic device 100 may control the display unit 151 so that the selected first webpage screen S2 gradually expands to the first region R1. For example, rather than expanding and displaying the selected first webpage screen S2 on the first region R1 while simultaneously performing steps S700 and S730, the electronic device 100 may provide such an animation effect that the first webpage screen S2 is slidingly expanded from the second region R2 to the first region R1 as shown in (b) and (c) of FIG. 29. That is, the electronic device 100 may expand the selected screen (i.e., the first webpage screen) to a first size at a first time after the display unit 151 has changed into the flat state and may expand the selected screen to a second size (second size>first size) at a second time (second time>first time) after the display unit 151 has changed into to the flat state.

As the first webpage S2 expands in step S740, the second webpage screen S1 which has been displayed on the region (i.e., first region) toward which the display unit 151 is inclined is gradually pushed out and ends up not displayed on the display unit 151 any longer.

Figure 30:
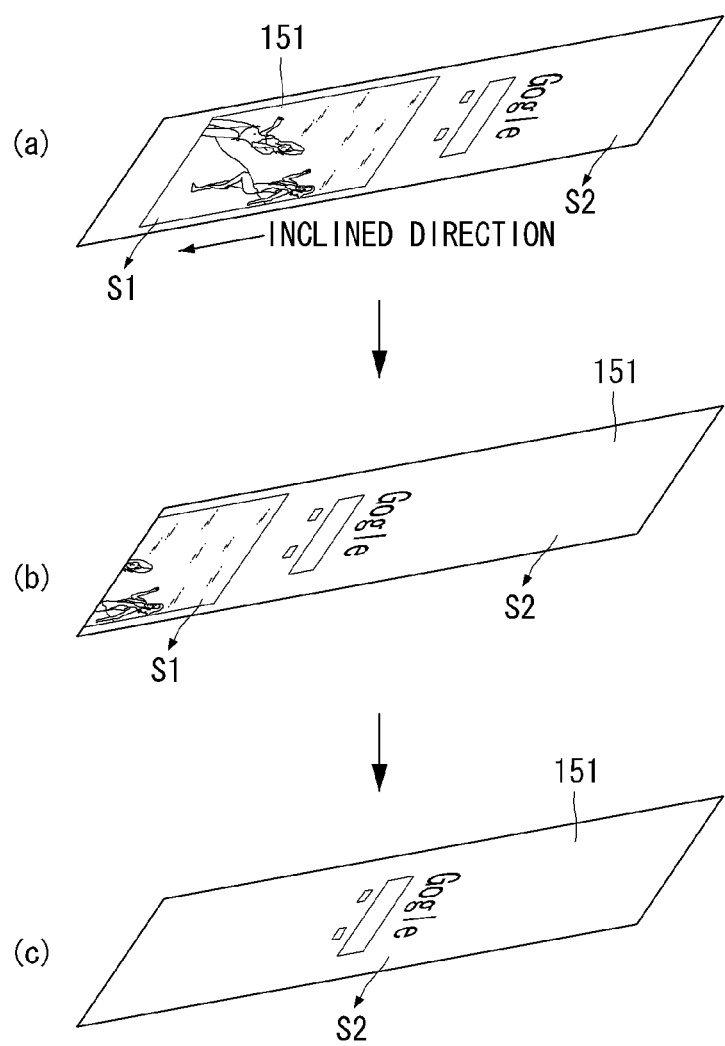

On the other hand, the electronic device 100, in step S740, may sense an inclined state of the display unit 151 and vary the orientation of the display unit 151 depending on the inclined state. For example, as shown in FIG. 30, the orientation of the display unit 151 is changed to the inclined direction so that the first webpage screen S2 and/or second webpage screen S1 may be displayed according to the changed orientation. Although it has been illustrated in FIG. 30 that the orientation of the display unit 151 has changed before the first webpage screen S2 expands to the other region (i.e., first region), the orientation is not necessary changed before the second webpage screen expands. For example, after the selected first webpage screen fully expands (for example, after the second webpage screen does not show up on the display unit 151 any longer), the orientation of the display unit 151 may vary.

In performing step S740, the electronic device 100 may keep sense the inclined state of the display unit 151. That is, while performing step S740, the electronic device 100 may continue to perform step S720. Before expanding the selected screen to fully cover the other region, the electronic device 100 may continuously sense whether the inclined direction of the display unit 151 changes.

When sensing in step S740 that the inclined direction of the display unit 151 changes, the electronic device 100 may perform step S730. That is, when the inclined direction of the display unit 151 changes, the electronic device 100 may select again, in step S730, the screen displayed on the other region than the region toward which the display unit 151 is inclined and may expand and display the selected screen on the other region.

Figure 31:
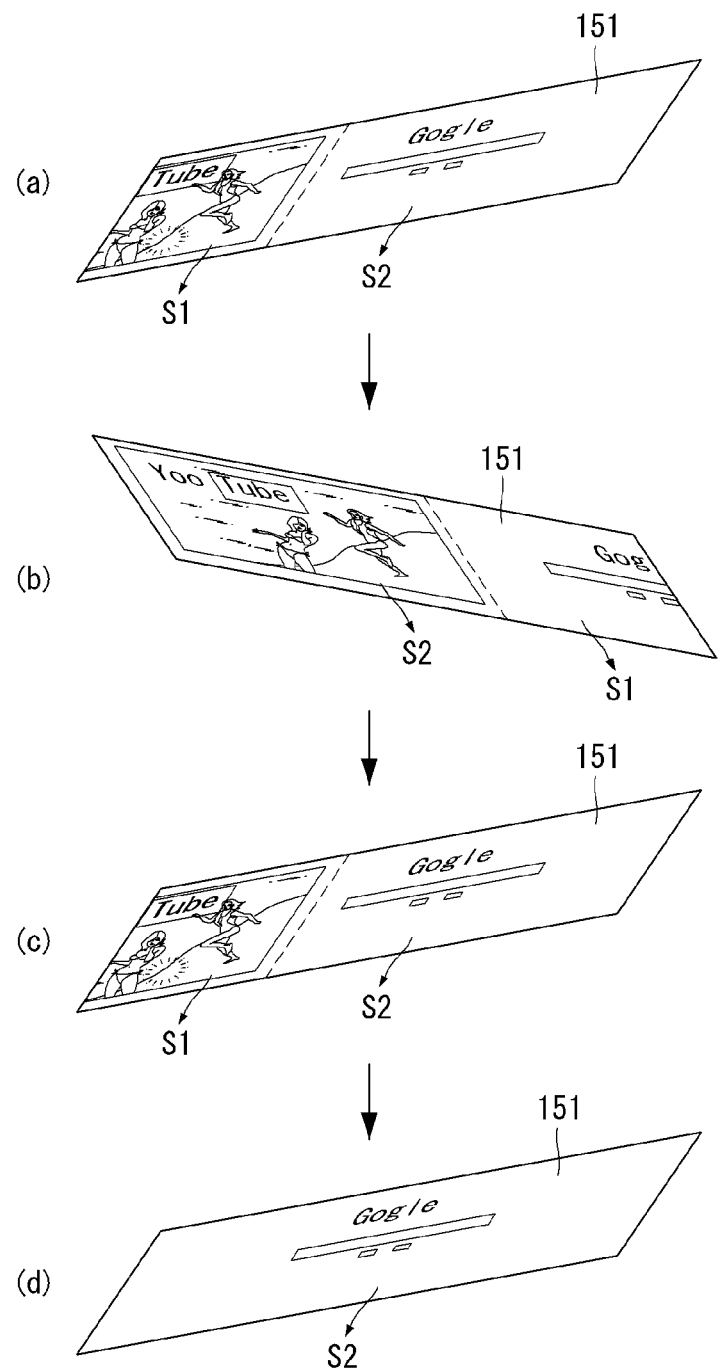

For example, the electronic device 100 may expand the first webpage screen S2 displayed on the second region R2 to the first region R1 while the display unit 151 is inclined toward the first region R1 as shown in (a) of FIG. 31. In the case that as shown in (b) of FIG. 31, the display unit 151 is inclined toward the second region R2 before the first webpage screen S2 is fully expanded to the first region R1, the electronic device 100 may expand the second webpage screen S1 displayed on the first region R1 to the second region R2. If the display unit 151 is inclined back to the first region R1 before the second webpage screen S1 is fully expanded to the second region R2, the first webpage screen S2 may be expanded to the first region R1 as shown in (c) and (d) of FIG. 31.

According to the seventh embodiment, the electronic device 100 does not need to select the screen displayed on the other region than the region toward which the display unit 151 is inclined in performing step S730, and may select the screen displayed on the region toward which the display unit 151 is inclined.

By doing so, when the divided regions are combined into a full screen area, a screen to be displayed on the combined area may be easily selected. That is, a user may select his desired screen by simply unfolding the bent display unit and inclining the display unit in one direction.

Eighth Embodiment

An eighth embodiment of the present invention is hereinafter described.

The eighth embodiment is directed toward a method of selecting a screen to be displayed on an area into which divided regions are combined, wherein the method according to the eighth embodiment differs from a method of selecting a screen to be displayed on an a combined area by the method according to the seventh embodiment.

Figure 32:
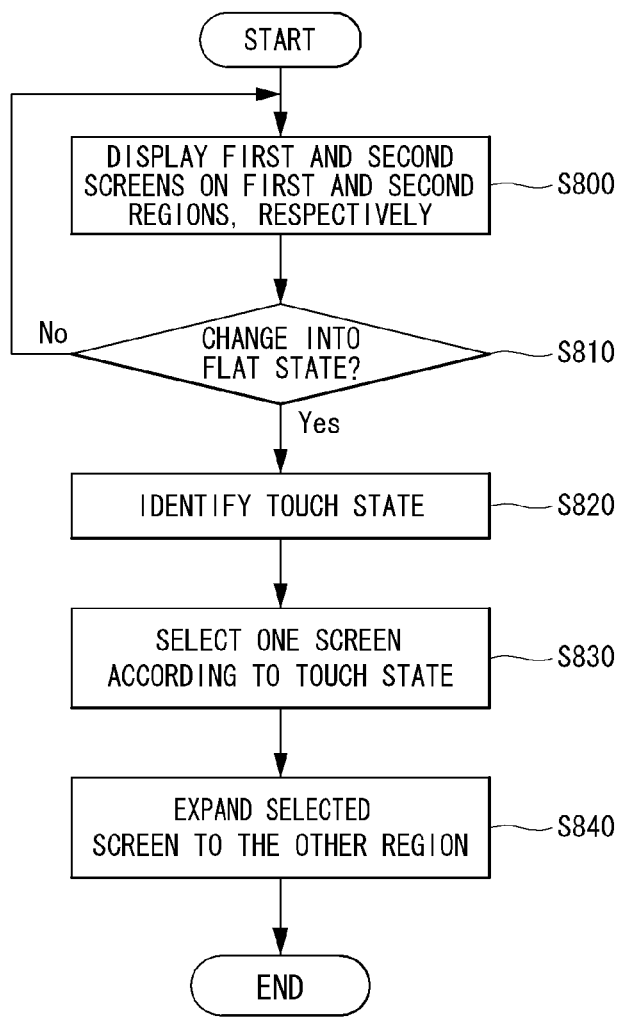
FIG. 32 is a flowchart illustrating a method of controlling an electronic device according to an eighth embodiment of the present invention.

FIG. 32 is a flowchart illustrating a method of controlling an electronic device according to an eighth embodiment of the present invention.

Referring to FIG. 32, the control method according to the eighth embodiment includes at least one of a step of displaying first and second screens on first and second regions, respectively (S810), a step of determining whether the display unit 151 changes into a flat state (S810), a step of, when the display unit 151 changes into the flat state, identifying a touch state on the display unit 151 (S820), a step of selecting one of the first and second screens depending on the touch state (S830), and a step of expanding and displaying the selected screen on the other region (S840). If it is determined in step S810 that the display unit 151 does not change into the flat state, the process may return to step S800 to continue to display the screens on the respective regions. Steps S800 and S810 are the same or similar to steps S700 and S710 according to the seventh embodiment, and detailed description thereof are omitted. Hereinafter, steps S820, S830, and S840 are described in greater detail.

When sensing in step S810 that the display unit 151 changes into the flat state, the electronic device 100 may identify a touch state on the display unit 151 (S820) and may select one of the first and second screens depending on the identified touch state (S830).

The electronic device 100 may identify the touch state on the display unit 151 by various methods. For example, the electronic device 100 may perform the identification of the touch state by verifying a first touch condition on which region is touched in the display unit 151 (that is, verify the position of a touch input), a second touch condition on what pattern a touch should have, a third touch condition on how long a touch input should last (that is, verify time during which the touch input lasts), and a fourth touch condition on how many times touch inputs occur, or a combination of at least one thereof. Hereinafter, for purposes of illustration, some possible examples for identifying the touch state are described.

Figure 33:
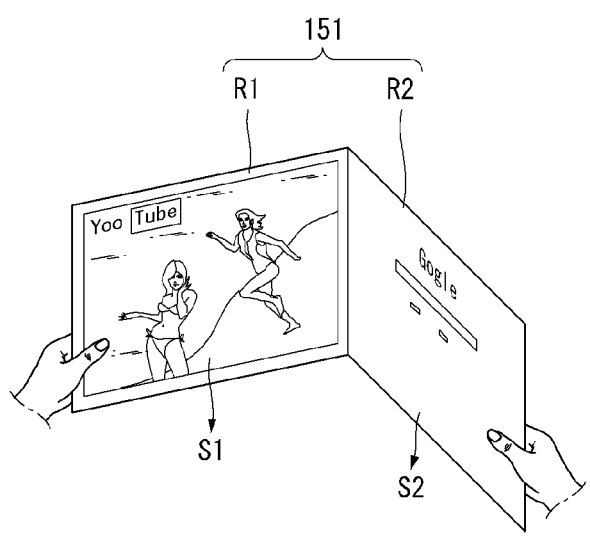
FIGS. 33 and 34 are views illustrating an example of identifying a touch state by an electronic device according to the eighth embodiment of the present invention.
Figure 34:
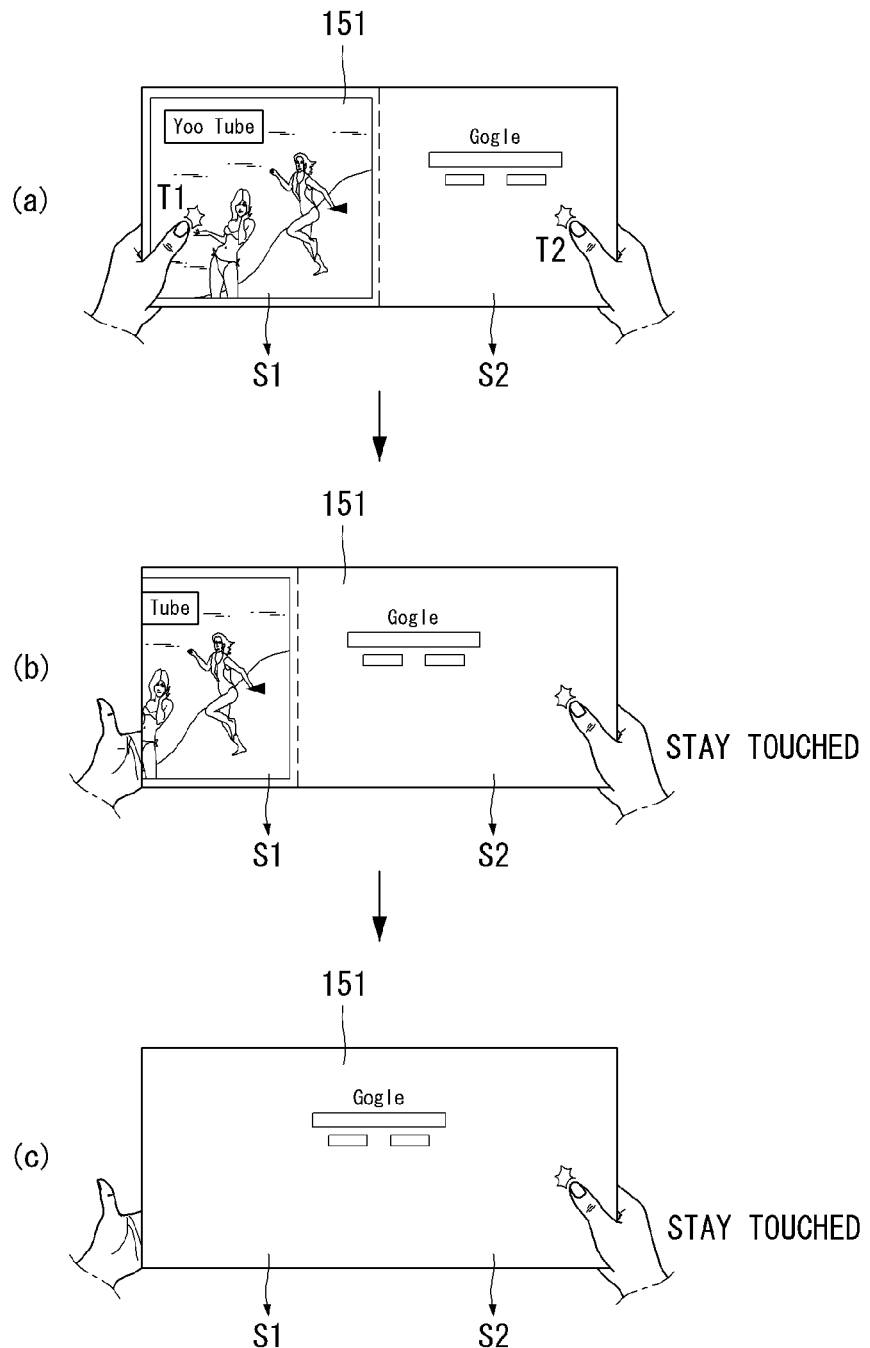

FIGS. 33 and 34 are views illustrating an example of identifying a touch state by an electronic device according to the eighth embodiment of the present invention.

First, as shown in FIG. 33, a user may hold the electronic device 100 when the display unit 151 stays bent. That is, the user grips the first region with his left hand and the second region R2 with his right hand. As a consequence, the user's left thumb is naturally brought in touch with part of the first region R1, and his right thumb is naturally brought in touch with part of the second region R2. Subsequently, the user, as shown in (a) of FIG. 34, may change the display unit 151 from the bent state into a flat state. After or while changing the display unit 151 into the flat state, the user may release the left grip (that is, release the touch on the first region R1) while maintaining the right grip (that is, maintaining the touch on the second hand R2). While the display unit 151 changes from the bent state into the flat state, the electronic device 100 may, in step S830, select the first webpage screen S2 displayed on the second region R2 on which the touch is maintained.

That is, the electronic device 100 may identify the region on which the touch is maintained when the display unit 151 changes from the bent state into the flat state and may thus select the screen displayed on the region that maintains the touch.

Although it has been described in connection with FIGS. 33 and 34 that touch inputs occur both on the first region R1 and on the second region R2 when the display unit 151 stays bent, the touch input does not necessarily occur on both the regions R1 and R2. For example, while bent, one region may be touched and the touch may remain when the display unit 151 changes into the flat state.

Further, in the example described in connection with FIGS. 33 and 34, when the display unit 151 changes from the bent state into the flat state, the screen displayed on the region maintaining the touch is selected. On the contrary, however, the screen displayed on the other region than the region maintaining the touch may also be selected while the display unit 151 changes into the flat state.

Figure 35:
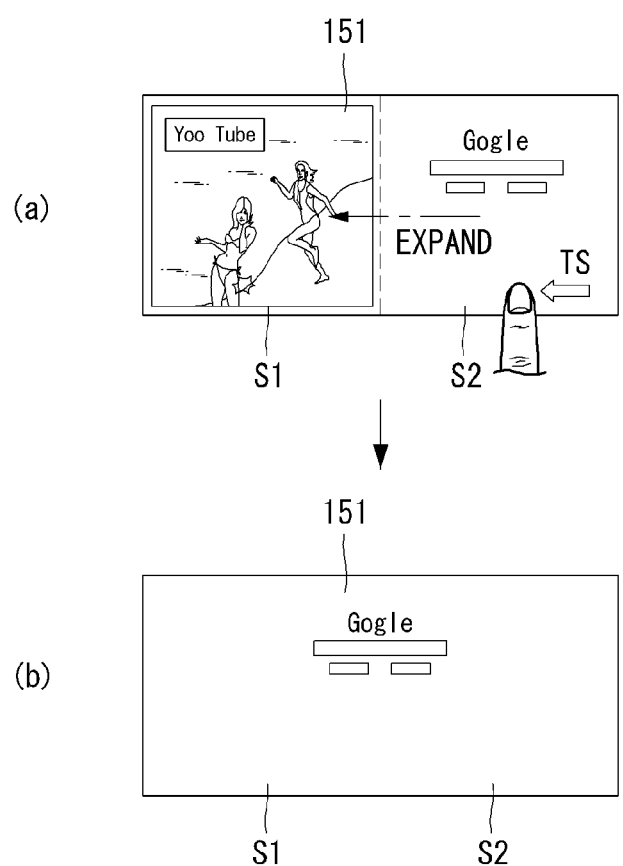
FIG. 35 illustrates another example of identifying a touch state by an electronic device according to the eighth embodiment of the present invention.

FIG. 35 illustrates another example of identifying a touch state by an electronic device according to the eighth embodiment of the present invention.

When a touch input having a predetermined patter is received after, while, or before the display unit 151 changes into the flat state, the electronic device 100 may identify a region on which the touch input is received and may select a screen displayed on the identified region.

For example, when as shown in FIG. 35, a touch stroke TS having a predetermined pattern is received on the second region R2 from a user after the display unit 151 changes into the flat state, the electronic device 100 may select the first webpage screen S2 that has been displayed on the second region R2.

Although it has been described in connection with FIG. 35 that the screen displayed on the region receiving an input having a predetermined pattern is selected, the screen displayed on the other region than the region receiving the input may be selected as well.

The predetermined pattern may be different from the pattern shown in FIG. 35.

Figure 36:
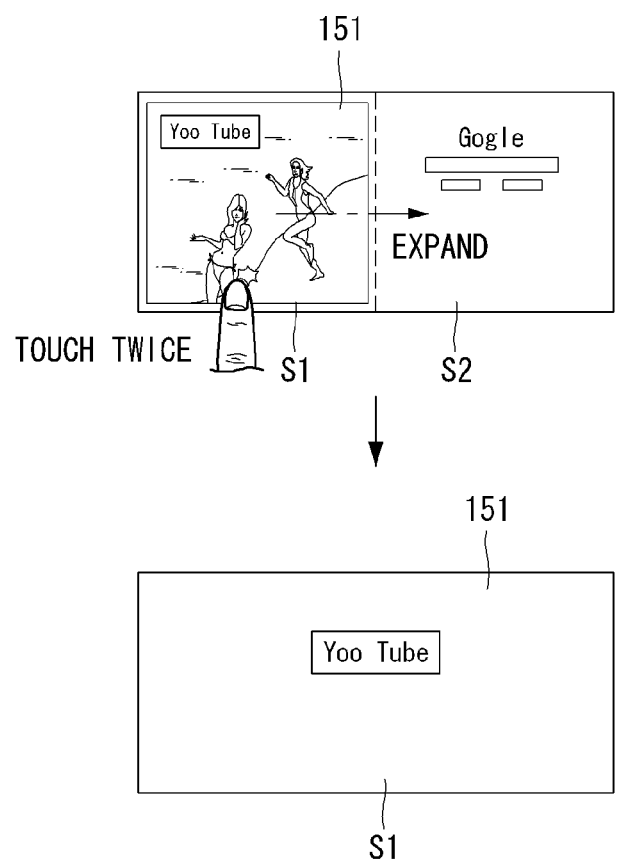
FIG. 36 illustrates another example of identifying a touch state by an electronic device according to the eighth embodiment of the present invention.

FIG. 36 illustrates another example of identifying a touch state by an electronic device according to the eighth embodiment of the present invention.

When a predetermined number of times of touch input are made after, while, or before the display unit 151 changes into the flat state, the electronic device 100 may identify the region on which the touch input is made and may select a screen displayed on the identified region.

For example, when two times of touch input are received on the first region from a user after the display unit 151 changes into the flat state as shown in FIG. 36, the electronic device 100 may select the second webpage screen S1 that has been displayed on the first region R1.

Although it has been described in connection with FIG. 36 that the screen displayed on the region on which a predetermined number of times of touch input are made is selected, the screen displayed on the other region than the region receiving the touch input may be also selected.

The predetermined number of times may be three or more as well as two as illustrated in FIG. 35.

Turning back to FIG. 32, as described above, after one screen is selected, the electronic device 100 may expand and display the selected screen on the other region (S840).

For example, under the circumstance shown in (a) of FIG. 34, according to those described above, the first webpage screen S2 displayed on the second region R2 may be selected, and the selected screen may be expanded and displayed on the first region R1 as shown in (b) and (c) of FIG. 34. In this case, as shown in (b) and (c) of FIG. 34, the first webpage screen S2 may be gradually expanded.

As another example, under the situation shown in FIG. 35, as described above, the first webpage screen S2 displayed on the second region R2 may be selected and the selected screen may be expanded and displayed on the first region R1 as shown in FIG. 35. In this case, the selected first webpage screen S2 may be gradually expanded.

As still another example, under the situation shown in FIG. 36, as described above, the second webpage screen S1 displayed on the first region R1 may be selected and the selected screen may be expanded and displayed on the second region R2 as shown in FIG. 36. In this case, the selected second webpage screen S1 may be gradually expanded.

On the other hand, in the case that a touch input having a predetermined pattern or a predetermined number of times of touch input is made on the other region before the selected screen is fully expanded to the other region while the electronic device 100 performs step S840, the electronic device 100 may monitor the touch state and reselect a screen to be expanded.

In the case that divided regions in the display unit 151 are recombined into a single region while the electronic device 100 is used, a screen to be displayed on the combined single region may be easily selected. That is, a user may select a screen desired to be expanded by simply unfolding the bent display unit and touching a portion of the display unit 151 where the screen desired to be expanded is displayed.

Ninth Embodiment

Hereinafter, a ninth embodiment of the present invention is described.

Figure 37:
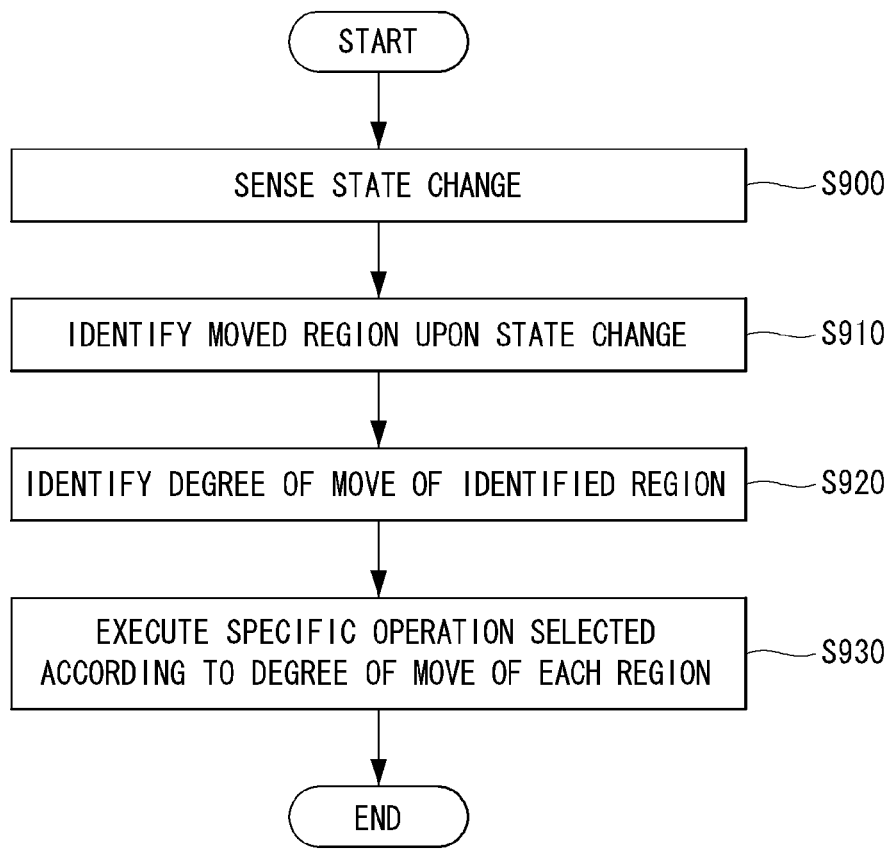
FIG. 37 is a flowchart illustrating a method of controlling an electronic device according to a ninth embodiment of the present invention.

FIG. 37 is a flowchart illustrating a method of controlling an electronic device according to a ninth embodiment of the present invention.

Referring to FIG. 37, the control method according to the ninth embodiment includes a step of sensing a change in state of the display unit 151 (S900), a step of, among at least two regions of the display unit 151, identifying a region moved when the state change is made (S910), a step of identifying a degree of move of the identified region (S920), and a step of executing a specific operation selected depending on the degree of move of the identified region (S930). Hereinafter, each step is described in greater detail.

The electronic device 100 may sense a change in state of the display unit 151 (S900). For example, the electronic device 100 may sense whether the display unit 151 changes from a bent state to a flat state, from the flat state to the bent state, from the bent state to a fully folded state, from the fully folded state to the bent state, from the flat state to the fully folded state, or from the fully folded state to the flat state.

Figure 38:
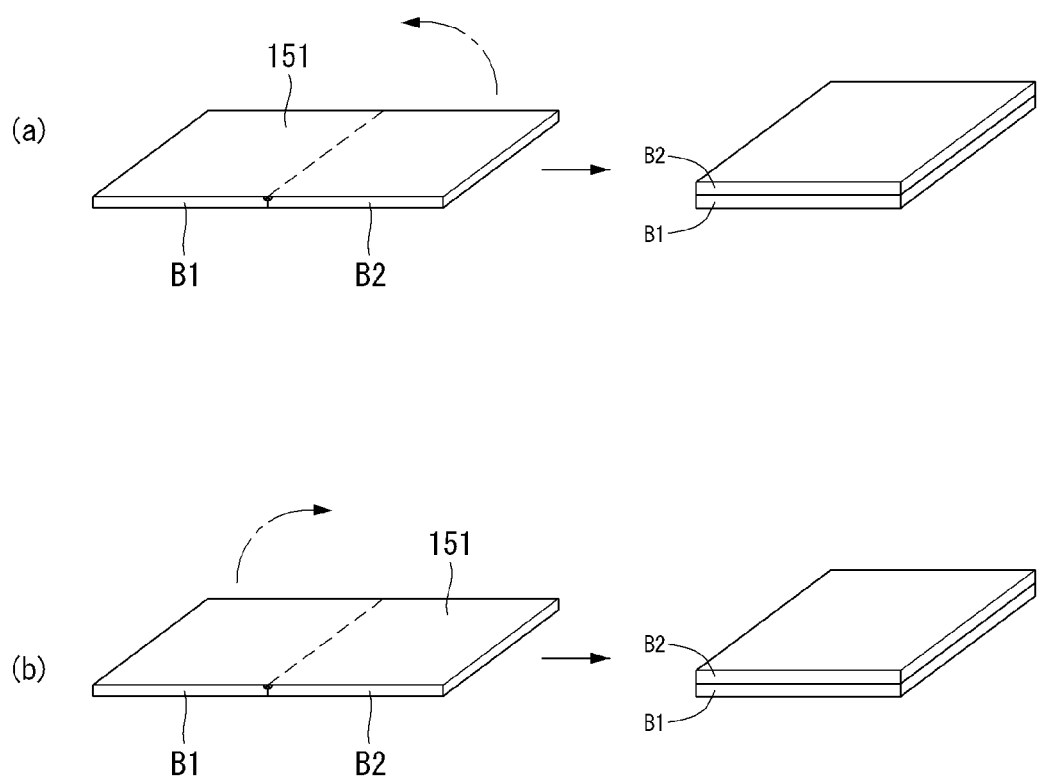
Figure 39:
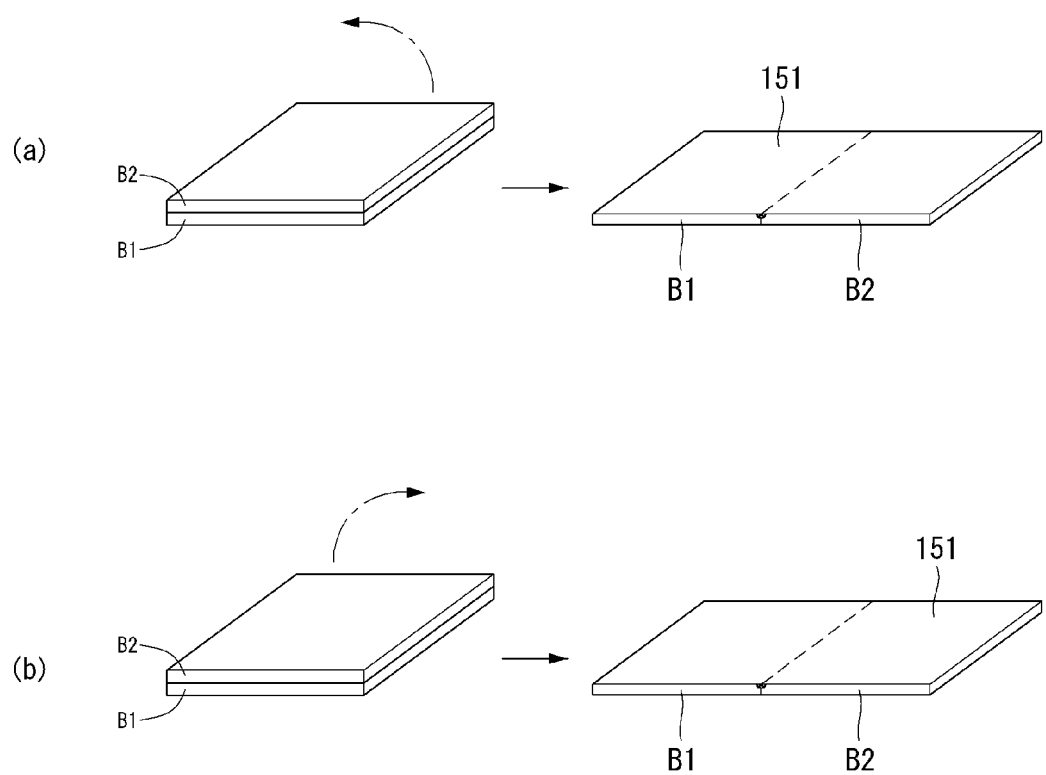
Figure 44:
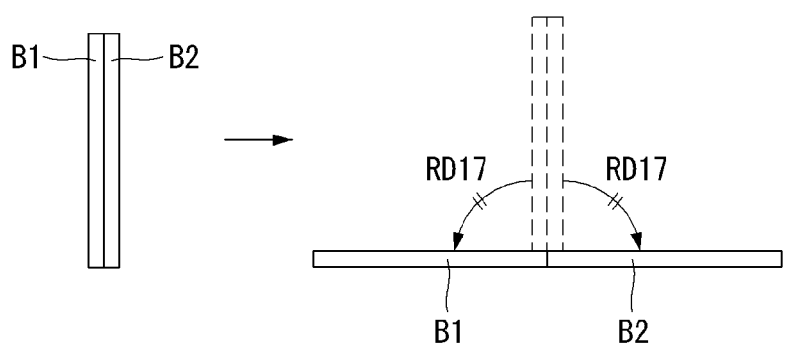
Figure 45:
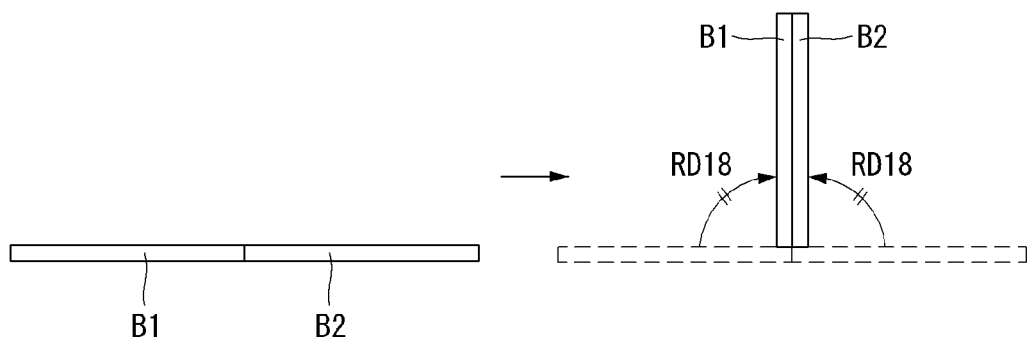

FIGS. 38 to 45 are views illustrating various examples where the display unit 151 changes its state according to the ninth embodiment of the present invention. In particular, FIGS. 38, 40, and 45 illustrate some examples where the display unit 151 changes from a flat state to a fully folded state, and FIGS. 39, 41, and 44 illustrate other examples where the display unit 151 changes from the fully folded state to the flat state. FIG. 42 illustrates an example where the display unit 151 changes from a bent state to the fully folded state, and FIG. 43 illustrates an example where the display unit 151 changes from the fully folded state to the bent state.

In step S900, the electronic device 100 may sense a change in state of the display unit 151 based on a signal output from the afore-described bending sensor.

In step S900, the electronic device 100 may also sense the state change of the display unit 151 depending on signals output from the afore-described inclination sensors instead of the bending sensor.

Further, in step S900, the electronic device 100 may also sense the state change of the display unit 151 depending on a signal output from a contact sensor provided at each body B1 or B2 that is brought in contact with the display unit 151. The contact sensor provided at each body B1 or B2 may be designed to sense that side surfaces of the bodies B1 and B2 contact each other when the display unit 151 is in the flat state and are spaced apart from each other when the display unit 151 is in the bent or fully folded state.

Subsequently, among at least two regions of the display unit 151, the electronic device 100 may identify a region moved while the state change is made (S910).

For example, when the display unit 151 changes from the flat state to the fully folded state, the electronic device 100 may identify that the second region R2 and/or second body B2 is moved as shown in (a) of FIG. 38 or that the first region R1 and/or first body B1 is moved as shown in (b) of FIG. 38.

As another example, when the display unit 151 changes from the fully folded state to the flat state, the electronic device 100 may identify that the first region R1 and/or first body B1 is moved as shown in (a) of FIG. 39 or that the second region R2 and/or second body B2 is moved as shown in (b) of FIG. 39.

As still another example, when the display unit 151 changes from the flat state to the fully folded state, the electronic device 100 may identify that both the first body B1 and second body B2 are moved (or the first and second regions R1 and R2 are both moved) as shown in FIG. 40, and when the display unit 151 changes from the fully folded state to the flat state, the electronic device 100 may identify that both the first body B1 and second body B2 are moved (or the first and second regions R1 and R2 are both moved) as shown in FIG. 41.

In performing step S910, the electronic device 100 may identify whether each region R1 or R2 of the display unit 151 and/or each body B1 or B2 is moved based on signals output from the afore-described inclination sensors.

On the other hand, the electronic device 100 may identify a degree of move of the identified region (S920).

For example, under the circumstance shown in (a) of FIG. 38, the electronic device 100 may identify a degree of move of the second region R2 and/or second body B2. That is, in the situation shown in (a) of FIG. 38, the second region R2 and/or second body B2 rotates by 180° as the display unit 151 changes from the flat state to the fully folded state, wherein the degree of move may be determined as 180°. On the contrary, under the situation shown in (b) of FIG. 38, the first region R1 and/or first body B1 may be determined to rotate by 180°.

As another example, the electronic device 100 may identify the situation shown in (a) of FIG. 39 as the first region R1 and/or first body B1 having rotated by 180° and the situation shown in (b) of FIG. 39 as the second region R2 and/or second body B2 having rotated by 180°.

As still another example, under the situation shown in FIG. 40, the electronic device 100 may identify that the first body B1 and/or first region R1 has moved by a first rotation degree RD1 and the second body B2 and/or second region R2 has moved by a second rotation degree RD2.

Subsequently, as yet still another example, under the circumstance shown in FIG. 41, the electronic device 100 may identify that the first body B1 and/or first region R1 has moved by a third rotation degree RD3 and the second body B2 and/or second region R2 has moved by a fourth rotation degree RD4.

In performing step S920, the electronic device 100 may identify the degree of move (rotation degree) of each region R1 or R2 of the display unit 151 and/or each body B1 or B2 depending on signals output from the afore-described inclination sensors.

The electronic device 100 may perform a specific operation selected according to the degree of move of the identified region (S930).

In performing step S930, the electronic device 100 selects an operation to be executed according to the degree of move of the region. The operation to be executed may be previously stored in the electronic device 100 in such a manner to correspond to the degree of move of the region. On the other hand, the correspondence between the degree of move of the region and operation stored in the electronic device 100 may be set or varied by a user.

Various correspondences may be present between the to-be-executed operation and the degree of move of the region. For example, in the case that the operation is OP, the degree of move of the first region R1 and/or first body B1 is RDa, and the degree of move of the second region R2 and/or second body B2 is RDb, OP may be defined as a function having RDa and RDb as input variables (OP=F(RDa, RDb)). Since RDa and RDb each may have a value between 0 and 180°, countless to-be-executed operations may correspond to combinations of RDa and RDb.

For ease of users' manipulation, the electronic device may be designed so that combinations of (RDa, RDb) are limited to discrete, specific ones, such as (0, 180), (90, 90), or (180, 0). For example, when a combination of (RDa, RDb) is (0, 180) (e.g., when only the first region is moved as shown in (b) of FIG. 38 or (a) of FIG. 39), the combination may correspond to a first operation, when a combination of (RDa, RDb) is (90, 90) (e.g., when the first and second regions are moved by substantially the same degree as shown in FIG. 44), the combination may correspond to a second operation, and when a combination of (RDa, RDb) is (180, 0) (e.g., when only the second region is moved as shown in (a) of FIG. 38 or (b) of FIG. 39), the combination may correspond to a third operation.

The combinations (RDa, RDb) may be determined by other methods than those described above in consideration of a designer's convenience in design and user's convenience in manipulation. For example, combinations (RDa, RDb), such as (0, 180), (60, 120), (120, 60), or (180, 0) may be used as well.

Or, combinations (RDa, RDb), such as (0, 180), (30, 90), (90, 30), (90, 90), or (180, 0), may also be used. Combinations (RDa, RDb), such as (0, 180), (90, 90), and (180, 0) may refer to a situation where a change in state occurs between the flat state and fully folded state, and combinations (RDa, RDb), such as (30, 90) and (90, 30) may refer to a situation where a change in state occurs between the bent state and the flat state. For example, a situation where a sum of RDa and RDb is 180 may mean that there is a state change between the fully folded state and flat state, and a situation where a sum of RDa and RDb is smaller than 180 may mean that there is a state change between the bent state and flat state as shown in FIGS. 42 and 43.

The to-be-executed operation may be determined further in consideration of not only the degree of move of each region but also whether the regions have become close to or away from each other due to the change in state. In such a case, the correspondences may be increased two times or more compared to when the degree of move of the region is only considered.

For example, an operation corresponding to a situation where (RDa, RDb) is (0, 180) while the flat state changes into the fully folded state (that is, the regions are closer to each other by the state change) may differ from an operation corresponding to a situation where (RDa, RDb) is (0, 180) while the fully folded state changes into the flat state (that is, the regions are away from each other by the state change).

In other words, in the case that only the first region undergoes 180° rotation, a situation where the flat state changes into the fully folded state as shown in (b) of FIG. 38 may correspond to, for example, an operation of turning off the electronic device 100 and a situation where the fully folded state changes into the flat state as shown in (a) of FIG. 39 may correspond to, for example, an operation of turning on the electronic device 100.

In performing step S930, the electronic device 100 may select the specific operation further in consideration of a moving speed of the identified region. For example, assuming that only the first region is moved by 180° when the flat state changes into the bent state, an operation corresponding to a situation where the first region is moved at a first speed may differ from an operation corresponding to a situation where the first region is moved at a second speed.

The to-be-executed operation may include operation of the application installed in the electronic device 100 as well as operation executed by the electronic device 100.

Although it has been described according to the ninth embodiment that the first region R1 and/or first body B1 and the second region R2 and/or second body B2 may rotate between 0 and 180°, the present invention is not limited thereto. For example, the first and second regions R1 and R2 may also rotate between 0 and 360°.

When the operation of the electronic device 100 is controlled with the limited, discrete combinations (RDa, RDb), a distance of each region rotated by a user's manipulation may be slightly different from a value set in the electronic device 100.

For preparation for such cases, the electronic device 100 may have a critical range for each predetermined combination. When a distance moved by a user's manipulation belongs to its corresponding critical range, the electronic device 100 may determine a combination corresponding to the critical range and may execute an operation corresponding to the combination. For example, in the case that combinations (0, 180) and (180, 0) are only set in the electronic device 100, when RDa and RDb become 20 and 160, respectively, by a user's manipulation, the electronic device 100 may determine that the user's manipulation corresponds to the combination (0, 180).

As such, by having operations executable by the electronic device 100 correspond to a user folding and/or unfolding the display unit 151, a new user interface may be provided. Further, rather than simply having the operations to be executed in the electronic device correspond to folding and unfolding the display unit 151, the electronic device 100 may have the to-be-executed operations correspond to various operations depending on the type of region to be moved (that is, whether the first or second region is moved) and the distance of moved region when the display unit 151 is folded or unfolded, thereby providing a user interface having various combinations.

Tenth Embodiment

Hereinafter, a tenth embodiment of the present invention is described.

Figure 46:
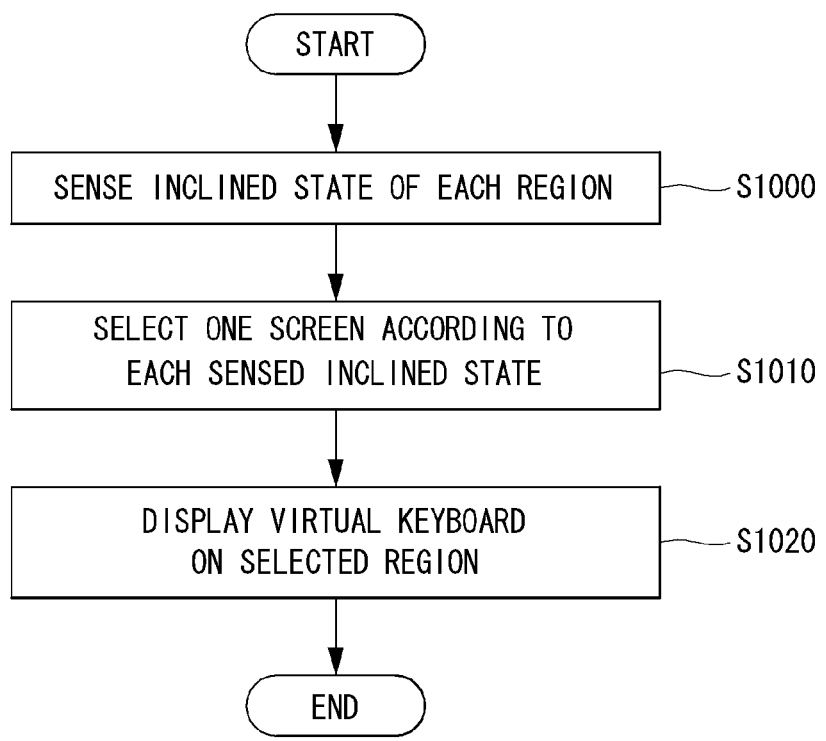
FIG. 46 is a flowchart illustrating a method of controlling an electronic device according to a tenth embodiment of the present invention.

FIG. 46 is a flowchart illustrating a method of controlling an electronic device according to a tenth embodiment of the present invention.

Referring to FIG. 46, the control method according to the tenth embodiment includes a step of sensing an inclined state of each region (S1000), a step of sensing one region according to each inclined state (S1010), and a step of displaying a virtual keyboard on the selected region (S1020). Hereinafter, each step is described in greater detail.

The electronic device 100 may sense inclined states of regions of the display unit 151 (S1000). The inclined states may be sensed by the afore-described inclination sensor.

In sensing the inclined states of the regions, the electronic device 100 may sense a state in which each region is inclined with respect to a specific absolute reference surface or a relative reference surface. For example, a state (e.g., an angle between each region and horizontal surface) of each region inclined with respect to a surface perpendicular to the direction of gravity (that is, horizontal surface) may be sensed or a state (e.g., an angle between two regions) of a region inclined with respect to another region may be sensed as well.

In step S1000, when an angle between the first and second regions R1 and R2 is not within a predetermined reference range, the electronic device 100 may skip steps S1010 and S1020 and perform step S1000, thereby monitoring the inclined state of each region.

Figure 47:
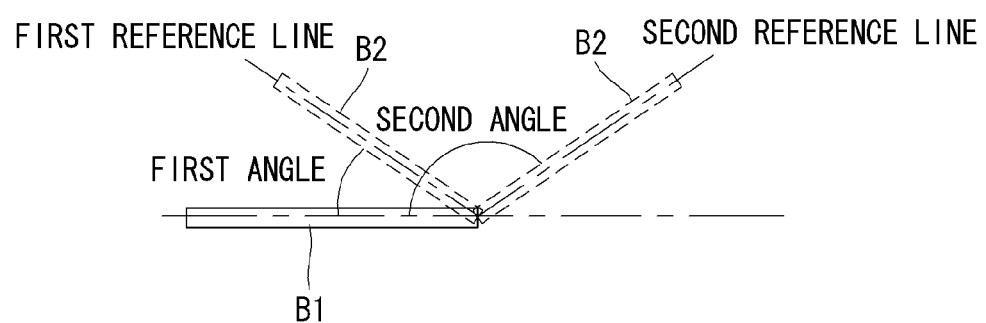
FIG. 47 is a view illustrating reference range for angles made by regions in describing a method of controlling an electronic device according to the tenth embodiment of the present invention.

FIG. 47 is a view illustrating reference range for angles made by regions in describing a method of controlling an electronic device according to the tenth embodiment.

Referring to FIG. 47, it is shown that the second region R2 and/or second body B2 is rotated respective of the first region R1 and/or first body B1. Assuming that an angle between the first region R1 and/or first body B1 and the second region R2 and/or second body B2 is 'a', only when a condition 'first angle<a<second angle' is met, steps S1010 and S1020 may be performed, and when a is not more than the first angle or not less than the second angle, steps S1010 and S1020 may be skipped and step S1000 may be performed.

Subsequently, the electronic device 100 may select one region according to the sensed inclined states (S1010) and may display a virtual keyboard on the selected region (S1020).

The selection by the electronic device 100 may be done by various standards.

Figure 48:
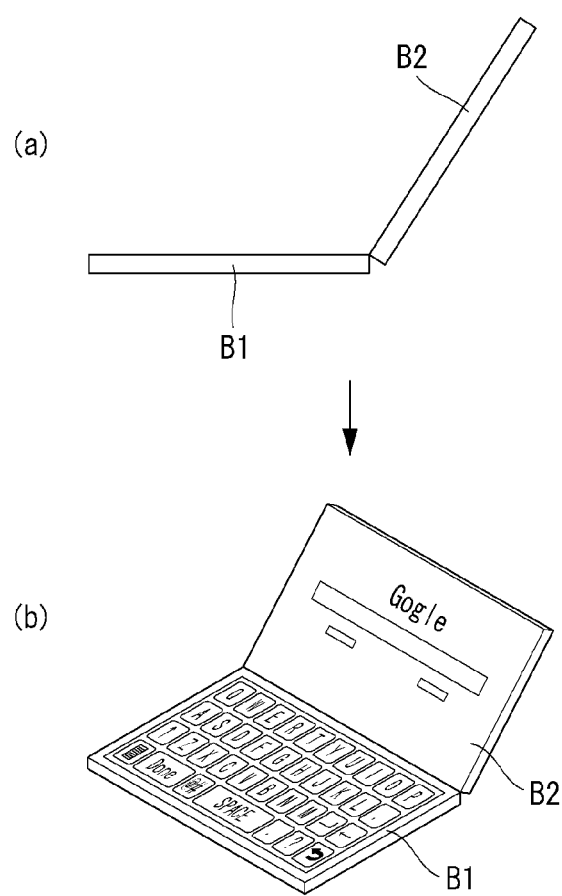
FIGS. 48 and 49 illustrate selection of a region parallel with the horizontal surface according to the tenth embodiment of the present invention.
Figure 49:
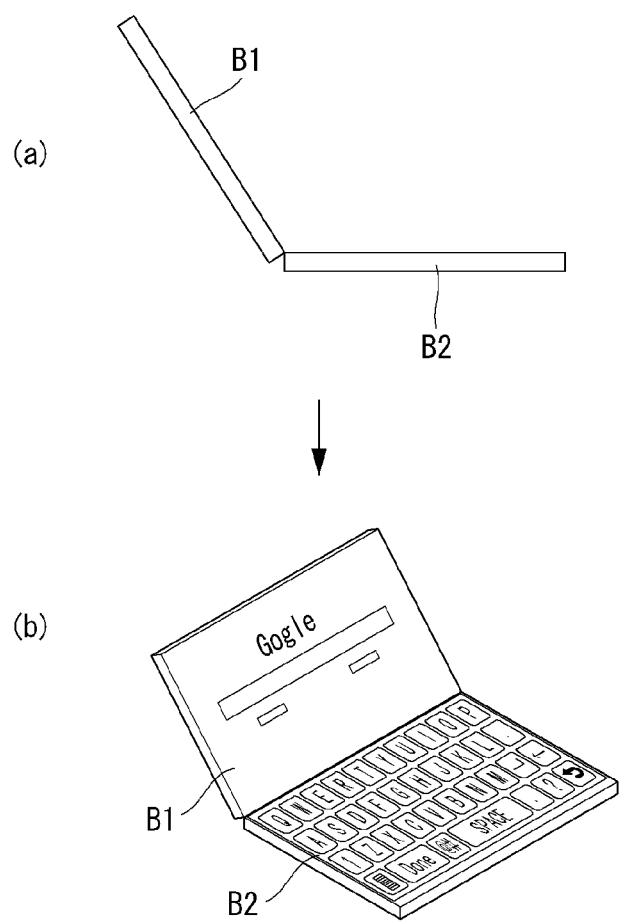

For example, the electronic device 100 may select a region arranged to be parallel with the horizontal surface. FIGS. 48 and 49 illustrate selection of a region parallel with the horizontal surface according to the tenth embodiment. Referring to (a) of FIG. 48, the first region R1 and/or first body B1 is arranged in parallel with the horizontal surface, and the second region R2 and/or second body B2 is arranged inclined with the horizontal surface. That is, in the situation shown in (a) of FIG. 48, the electronic device 100 may, in step S1010, select the first region R1 parallel with the horizontal surface.

(b) of FIG. 48 illustrates screens displayed on the respective regions R1 and R2 with the electronic device 100 placed as shown in (a) of FIG. 48, wherein the selected first region R1 displays a qwerty type virtual keyboard according to step S1020. On the contrary, (a) of FIG. 49 illustrates an example where the second region R2 is arranged in parallel with the horizontal surface. When the electronic device 100 is placed as shown in (a) of FIG. 49, the virtual keyboard may be displayed not on the first region R1 but on the second region R2.

As another example, among at least two regions, the electronic device 100 may select a region having a smallest angle between the region and the horizontal surface. FIG. 50 illustrates selecting a region having a smaller angle between the region and the horizontal surface according to the tenth embodiment. Referring to (a) of FIG. 50, the first region R1 and/or first body B1 makes an angle a with the horizontal surface, and the second region R2 and/or second body B2 makes an angle b with the horizontal surface, where angle b<angle a.

The electronic device 100 may select the second region R2 having a smaller angle with respect to the horizontal surface in step S1010 and may display a virtual keyboard on the second region R2. In the case that as shown in (b) of FIG. 50 an angle (angle c) between the first region R1 and/or first body B1 and the horizontal surface is smaller than an angle (angle d) between the second region R2 and/or second body B2, the electronic device 100 may select the first region R1 and display a virtual keyboard on the first region R1.

Figure 51:
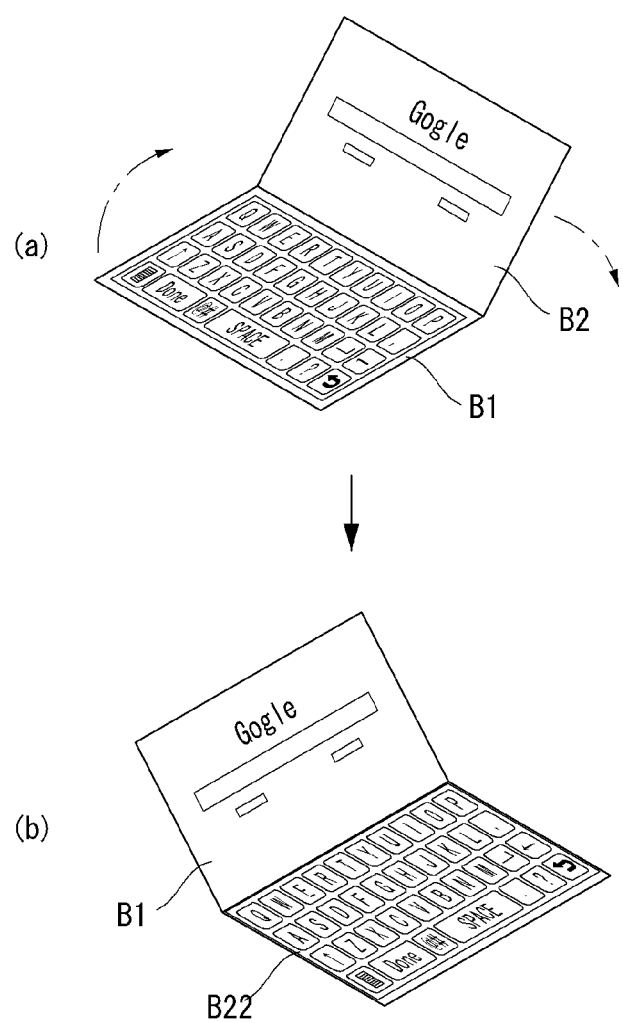
FIG. 51 illustrates an example of controlling an electronic device according to the tenth embodiment of the present invention.

FIG. 51 illustrates an example of controlling an electronic device according to the tenth embodiment of the present invention.

In the case that as shown in (a) of FIG. 51 the first region R1 and/or first body B1 is parallel with the horizontal surface and the second region R2 and/or second body B2 is inclined with the horizontal surface, a virtual keyboard may be displayed on the first region R1 according to the tenth embodiment. Accordingly, a screen other than the virtual keyboard may be displayed on the second region R2. For example, as shown in (a) of FIG. 51, a first webpage screen may be displayed on the second region R2.

Under the circumstance above, an external force (e.g., a force exerted by a user) may cause the electronic device 100 to be rearranged as shown in (b) of FIG. 51—that is, the second region R2 and/or second body B2 is arranged parallel with the horizontal surface, and the first region R1 and/or first body B1 is arranged inclined with the horizontal surface. That is, the inclined states of the regions R1 and R2 may be varied due to an external surface.

In such a case, the electronic device 100 may keep monitoring the inclined states of the regions R1 and R2 and when the inclined states of the regions change as shown in (b) of FIG. 51 may reselect a region on which the virtual keyboard is to be displayed and may display the virtual keyboard on the reselected region. For example, in the circumstance shown in (b) of FIG. 51, the electronic device 100 may display the virtual keyboard on the second region R2. In the situation shown in (a) of FIG. 51, the screen that has been displayed on the second region R1 may be shifted and displayed on the first region R1. As described in the first embodiment, the orientation set for the first region R1 may be changed to correspond to the direction of gravity and accordingly the orientation set for the second region R2 may be changed as well.

As such, while using an electronic device having a flexible display dividable into at least few regions, a virtual keyboard may be displayed on one region so that information and/or commands may be easily received from a user. At this time, a region on which the virtual keyboard is to be displayed may be properly determined by sensing the inclined state of the display unit 151, thereby increasing user convenience.

Although it has been described in the tenth embodiment that a virtual keyboard is displayed on the selected region, the present invention is not limited thereto. For example, other screens through which a user may enter information and/or commands may also be displayed on the selected region. For example, when a user executes a game application using the electronic device 100, the electronic device 100 may display a game play screen on an inclined region and a screen for entry, such as a virtual joystick for playing game, on a region parallel with the horizontal surface.

Eleventh Embodiment

Hereinafter, an eleventh embodiment of the present invention is described.

Figure 52:
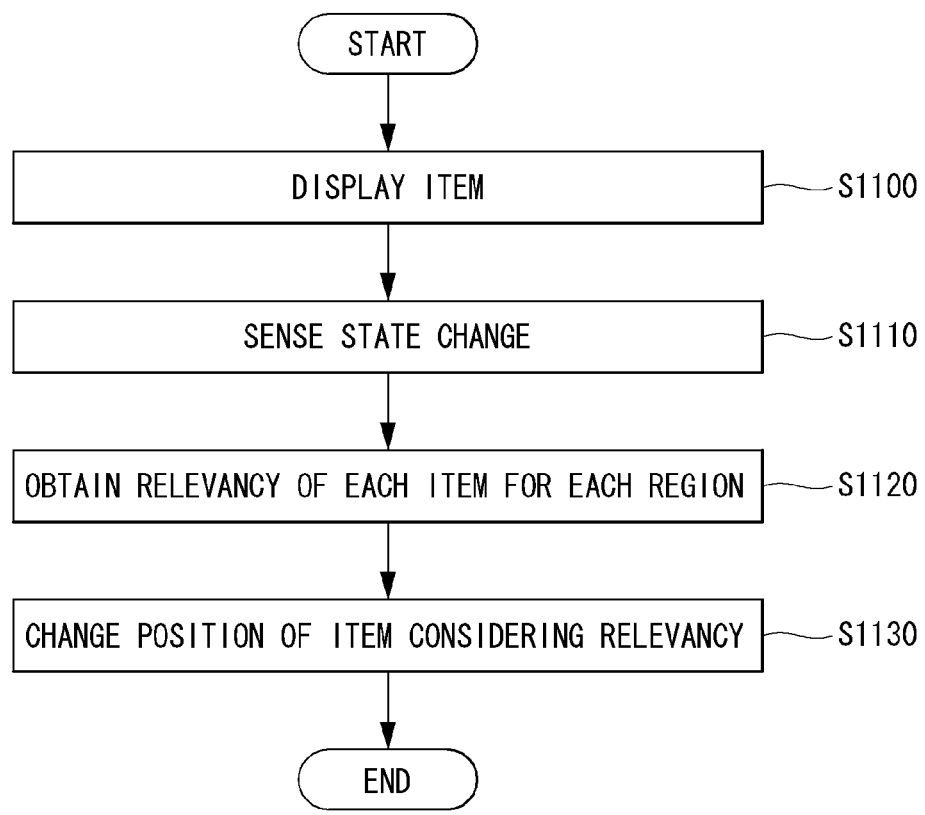
FIG. 52 is a flowchart illustrating a method of controlling an electronic device according to an eleventh embodiment of the present invention.

FIG. 52 is a flowchart illustrating a method of controlling an electronic device according to an eleventh embodiment of the present invention.

Referring to FIG. 52, the control method according to the eleventh embodiment may include a step of displaying at least one item on the display unit 151 when the display unit 151 is in a flat state (S1100), a step of sensing a change in state of the display unit 151 (S1110), a step of obtaining relevancy of the at least one item for each region (S1120), and a step of changing the location of the at least one item in consideration of the obtained relevancy (S1130). Hereinafter, each step is described in greater detail.

When the display unit 151 is in the flat state, the electronic device 100 may display at least one item on the display unit 151 (S1100). The at least one item may include an icon, a widget, an execution screen of an application, and content. While the at least one item is displayed on the display unit 151, a region occupied by the item may be generated. For example, at least part of the display unit 151 may be allocated for displaying the item and this part is hereinafter referred to as an "item occupied region".

While displaying the at least one item on the display unit 151, the electronic device 100 may sense a change in state of the display unit 151 (S1110). For example, the electronic device 100 may sense that the display unit 151 changes from the flat state to a bent state. The state change of the display unit 151 may be sensed by the afore-described bending sensor. As the display unit 151 changes into the bent state, the display unit 151 may be partitioned into at least two regions as described above. Hereinafter, for purposes of illustration, the display unit 151 is divided into two regions by bending according to the eleventh embodiment. However, this is merely an example, and the display unit 151 may be divided into three or more regions as well.

The electronic device 100 may obtain relevancy of the at least one item displayed on the display unit 151 in the flat state with respect to each of the regions divided when the display unit 151 is bent (S1120).

The relevancy of the item for each region may be obtained by various methods. Hereinafter, such various methods of obtaining the relevancy are described.

First, the relevancy between items and the regions may be obtained in consideration of a relationship in location between the items and the regions. For example, the relevancy may be obtained considering which region the items are displayed on.

Figure 53:
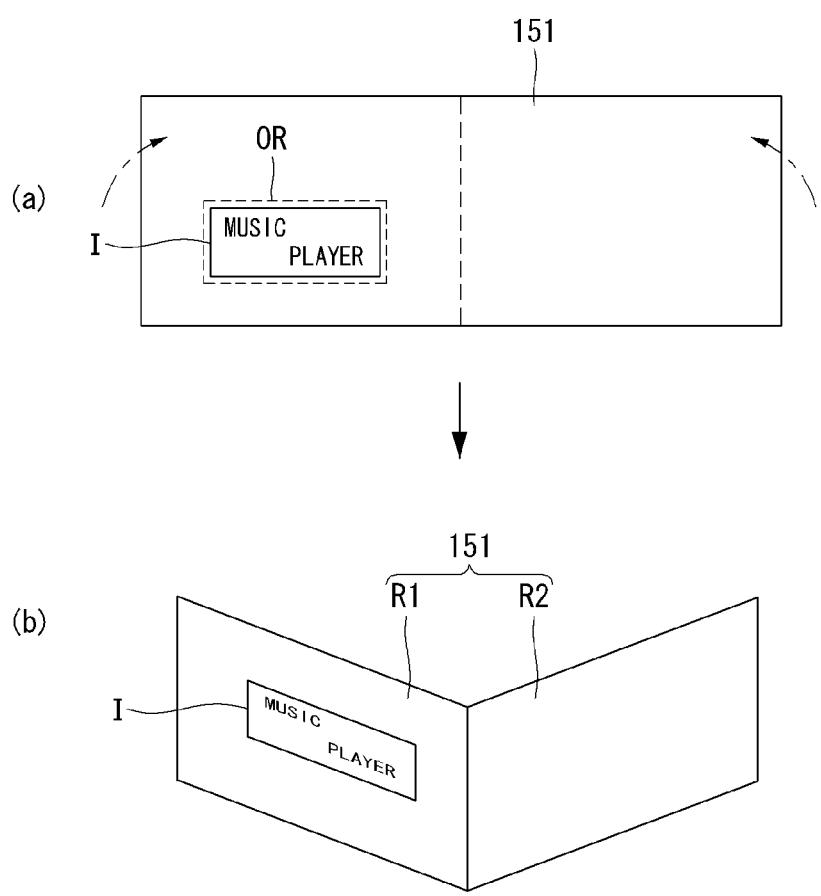
FIGS. 53 to 55 are views illustrating a method of obtaining relevancy between items and regions based on a relationship in location according to the eleventh embodiment of the present invention.
Figure 54:
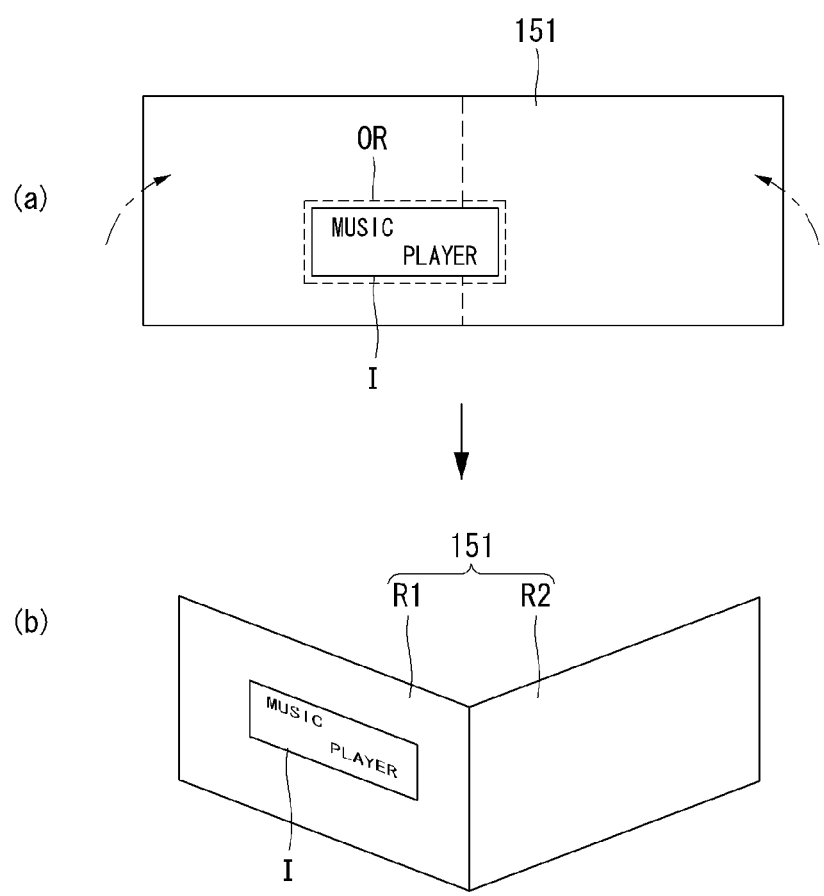
Figure 55:
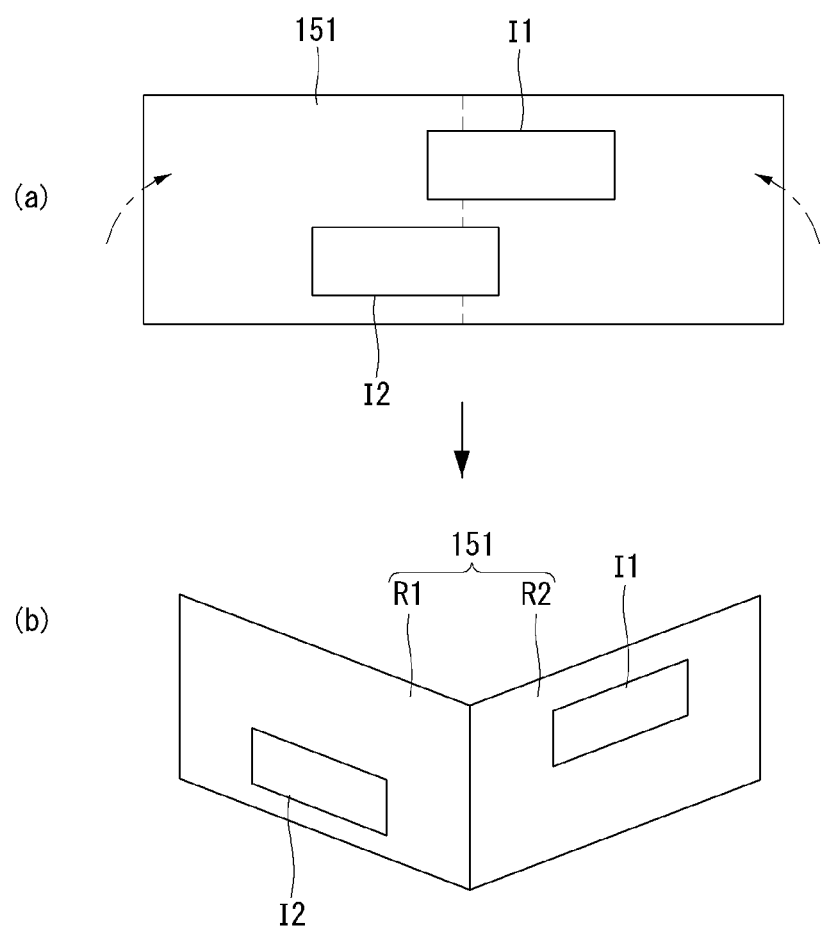

FIGS. 53 to 55 are views illustrating a method of obtaining relevancy between items and regions based on a relationship in location according to the eleventh embodiment of the present invention.

Referring to (a) of FIG. 53, an item I is displayed on the display unit 151 which is in the flat state. The item I occupies part of the display unit 151, which is an item occupied region OR. When the display unit 151 is divided into two regions by bending, the item I may be displayed on the first region R1. That is, the item I is displayed only on the first region R1 but not on the second region R2. The electronic device 100 may determine such a situation as the item I being associated with the first region R1. That is, the electronic device 100 may determine that the item I has higher relevancy for the first region R1 and lower relevancy for the second region R2. On the contrary, when the item I is displayed only on the second region R1, the electronic device 100 may determine that the item is associated with the second region R2.

On the other hand, rather than being displayed only on one region, the item I may be displayed on a bending line BL, which is a border line between the two regions when the display unit 151 is divided into the two regions by bending, as shown in (a) of FIG. 54. That is, the item I may be displayed on both the regions R1 and R2. Under this situation, the electronic device 100 may select a region on which more part of the item I is displayed and may determine the selected region as being associated with the item I. Accordingly, in the case that the item I is displayed more on the first region R1 than on the second region R2 as shown in (a) of FIG. 54, the electronic device 100 may determine that the item is associated with the first region R1. That is, the electronic device 100 may determine that the item I has higher relevancy for the first region R1 and lower relevancy for the second region R2.

When two items I1 and I2 are displayed on the display unit 151 as shown in (a) of FIG. 55, the electronic device 100 may also obtain relevancy of the items I1 and I2 for the regions. Since the item I1 is displayed more on the second region R2 than on the first region R1, the first item I1 may be determined to be associated with the second region R2, and since the opposite situation applies to the second item I2, the second item I2 may be determined to be associated with the first region R1. When three or more items are displayed on the display unit 151, it may be also possible to determine regions associated with the items.

In step S1120, when the display unit 151 changes from the flat state to the bent state, the electronic device 100 may provide relevancy of the item for the regions depending on a touch state on the display unit 151.

Figure 56:
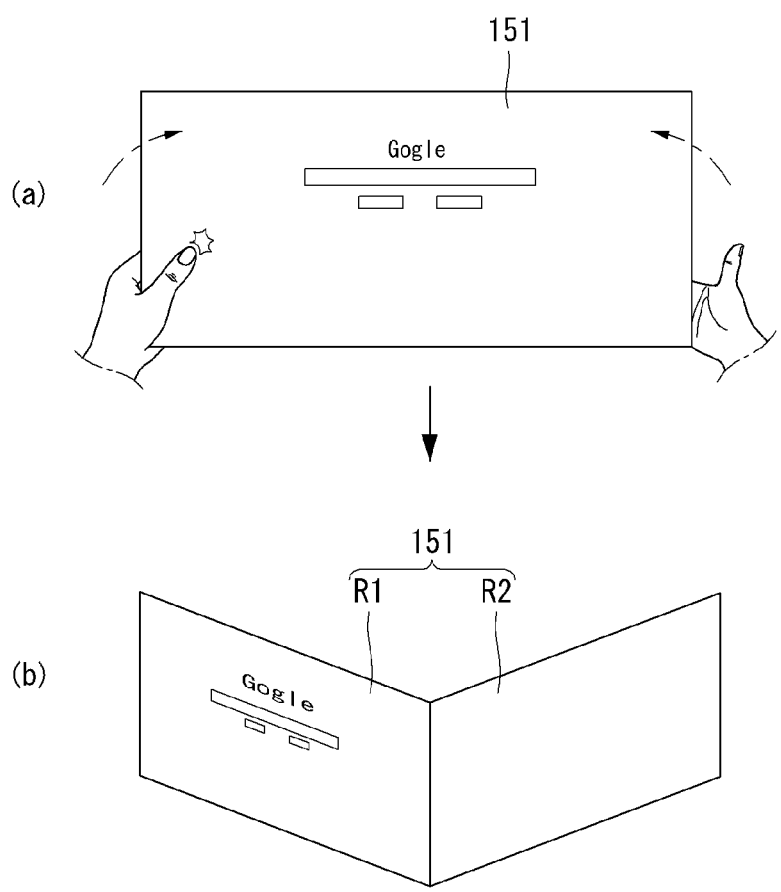
FIG. 56 illustrates a method of obtaining relevancy between items and regions depending on a touch state on the display unit 151 according to the eleventh embodiment of the present invention.

FIG. 56 illustrates a method of obtaining relevancy between items and regions depending on a touch state on the display unit 151 according to the eleventh embodiment of the present invention. Referring to (a) of FIG. 56, the first webpage screen (i.e., item) is displayed on the display unit 151.

Under the situation shown in (a) of FIG. 56, when the display unit 151 changes into the bent state, the electronic device 100 may identify which region is touched. Subsequently, the electronic device 100 may determine that the item (i.e., first webpage screen) is associated with the touched region. That is, under the situation shown in (a) of FIG. 56, the electronic device 100 may determine that the first webpage screen is associated with the first region R1.

When two or more items are displayed on the display unit 151, the electronic device 100 may determine that all of the items are associated with the touch region. On the other hand, the touch is not limited to a simple touch input, and rather may include a touch stroke having a predetermined pattern. The touch may include one or two or more touch inputs.

Further, in step S1120, the electronic device 100 may determine the relevancy taking into consideration relationships between attributes of the displayed item and various set values for the regions. As described in connection with the above embodiments, the electronic device 100 may set different video output characteristics, audio output characteristics, idle times, voice command set values and the like for the respective regions of the display unit 151. In performing the control method of the electronic device according to the eleventh embodiment, the relevancy may be determined depending on the relationships between the attributes of the displayed item and the set values for the regions.

Figure 57:
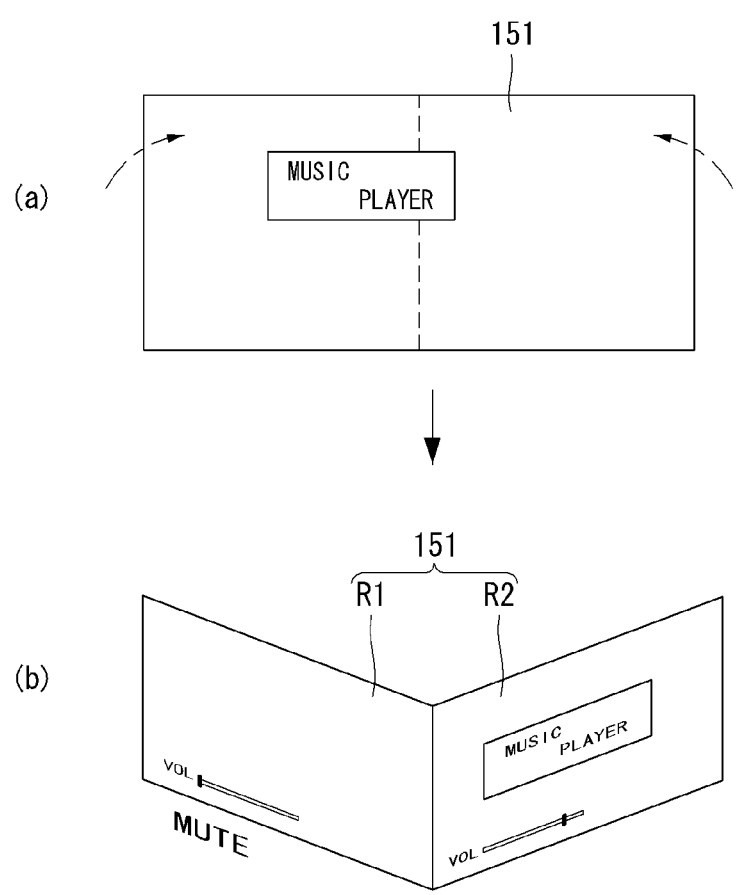

FIGS. 57 and 58 are views illustrating a method of obtaining the relevancy considering relationships between attributes of a displayed item and various set values for regions according to the eleventh embodiment of the present invention.

First, referring to FIG. 57, while a music player (i.e., item) is displayed on the display unit 151 which is in the flat state as shown in (a) of FIG. 57, the display unit 151 may be bent to be divided into two regions R1 and R2 as described above. In the case that, as shown in (b) of FIG. 57, a sound volume value which is an audio output characteristic is set as "0" in the region R1, and the sound volume value is set as a value other than "0" in the second region R2, the music player may be determined to be associated with the second region R2. That is, the electronic device 100 may judge that it is necessary to output sounds based on the attribute of the music player and may determine a region that may output sounds as associated with the music player.

Referring to FIG. 58, while a video player (i.e., item) is displayed on the display unit 151 which is in the flat state as shown in (a) of FIG. 58, the display unit 151 may be bent to be divided into two regions R1 and R2. In the case that, as shown in (b) of FIG. 58, an screen On/Off set value which is a video output characteristic is set as "OFF" in the first region R1 and set as "ON" in the second region R2, the video player may be determined to be associated with the second region R2. That is, the electronic device 100 may judge that it is necessary to output images based on the attribute of the video player and may determine a region that may output images as associated with the video player.

Turning back to FIG. 52, the electronic device 100 may vary the location of the at least one item considering the obtained relevancy (S1130).

The electronic device 100 may control the display unit 151 so that the at least one item may be shifted and displayed on the selected region.

For example, in the circumstance shown in FIG. 54, the electronic device 100 may move and display the item I on the first region R1 associated with the item I as shown in (b) of FIG. 54. At this time, preferably, the item I is not displayed on the second item R2.

As another example, under the situation shown in FIG. 55, the electronic device 100 may move and display the item I1 on the second region R2 and the item I2 on the first region R1 as shown in (b) of FIG. 55.

As still another example, under the situation shown in FIG. 56, the electronic device 100 may move and display the first webpage screen on the first region R1 as shown in (b) of FIG. 56.

As yet still another example, under the situation shown in FIG. 57, the electronic device 100 may move and display the music player on the second region R2 as shown in (b) of FIG. 57, and under the situation shown in FIG. 58, the electronic device 100 may move and display the video player on the second region R2.

As such, the electronic device 100 may allow the screen displayed on the display unit 151 when the display unit 151 is in the flat state to be moved and displayed on a region when the display unit 151 is bent, thereby eliminating user inconvenience. Accordingly, user convenience is increased.

In the method of controlling an electronic device according to the present invention, each step in each embodiment is not inevitable, and each embodiment may selectively include the steps therein. The steps in each embodiment are not necessarily performed in the order described above, and for example, a later step may be performed earlier than an earlier step.

In the method of controlling an electronic device according to the present invention, the embodiments may be performed alone or in combination. Further, the steps constituting an embodiment may be performed separately or in combination with the steps constituting another embodiment.

The control method may be stored in a computer readable recording medium in the form of a code or program.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. An electronic device comprising:
   a touch sensitive display unit including a bent state and a flat state that are distinguished from each other depending on a degree of bending, wherein the touch sensitive display unit is divided into at least two regions in the bent state by the bending; and
   a control unit configured to:
      display first and second screens on first and second regions, respectively, of the at least two regions when the touch sensitive display unit is in the bent state,
      detect a first touch input on the first region and a second touch input on the second region of the touch sensitive display unit while the touch sensitive display unit is switched from the bent state to the flat state, and
      when the first touch input is maintained and the second touch input is released in the flat state of the touch sensitive display unit, expand and display the first screen on the first and second regions.

2. The electronic device of claim 1, wherein the control unit is further configured to determine a touch state of the touch sensitive display unit based on at least one of a pattern of a touch input on the touch sensitive display unit, a lasting time of the touch input, a number of times that the touch input is detected, and a position of the touch input.

3. The electronic device of claim 1, wherein the control unit is further configured to determine one touch input that is maintained longer among the detected touch inputs, and to select the first screen corresponding to the determined touch input.

4. The electronic device of claim 1, wherein the control unit is further configured to identify a number of times that touch inputs are detected from substantially a same position of the touch sensitive display unit and to select the first screen corresponding to the substantially same position of the touch sensitive display unit when the number of times that the touch inputs are detected is a predetermined number.

5. A method of controlling an electronic device, the method comprising:
   detecting a state of a touch sensitive display unit including a bent state and a flat state that are distinguished from each other depending on a degree of bending, wherein the touch sensitive display unit is divided into at least two regions in the bent state by the bending;
   displaying first and second screens on first and second regions, respectively, of the at least two regions when the touch sensitive display unit is in the bent state;
   detecting a first touch input on the first region and a second touch input on the second region of the touch sensitive display unit while the touch sensitive display unit is switched from the bent state to the flat state; and
   when the first touch input is maintained and the second touch input is released in the flat state of the touch sensitive display unit, expanding and displaying the first screen on the first and second regions.

6. The method of claim 5, wherein a touch state of the touch sensitive display unit is determined based on at least one of a pattern of a touch input on the touch sensitive display, a lasting time of the touch input, a number of times that the touch input is detected, and a position of the touch input.

7. The method of claim 5, further comprising:
   determining one touch input that is maintained longer among the detected touch inputs; and
   selecting the first screen corresponding to the determined touch input.

8. The method of claim 5, further comprising:
   identifying a number of times that touch inputs are detected from substantially a same position of the touch sensitive display unit; and
   selecting the first screen corresponding to the substantially same position of the touch sensitive display unit when the number of times that the touch inputs are detected is a predetermined number.

* * * * *